United States Patent

Nakaki et al.

[11] Patent Number: 5,512,366
[45] Date of Patent: *Apr. 30, 1996

[54] MAGNETO-OPTIC RECORDING MEDIUM AND APPARATUS

[75] Inventors: Yoshiyuki Nakaki; Takashi Tokunaga; Tatsuya Fukami; Motohisa Taguchi; Kazuhiko Tsutsumi, all of Amagasaki, Japan

[73] Assignee: Mitsubishi Denki Kabushiki Kaisha, Tokyo, Japan

[*] Notice: The term of this patent shall not extend beyond the expiration date of Pat. No. 5,258,237.

[21] Appl. No.: 615,024

[22] Filed: Nov. 13, 1990

Related U.S. Application Data

[63] Continuation-in-part of Ser. No. 474,104, Apr. 20, 1990, Pat. No. 5,216,663.

[30] Foreign Application Priority Data

Nov. 14, 1989 [JP] Japan ................................. 1-296858
Feb. 22, 1990 [JP] Japan ................................. 2-43235

[51] Int. Cl.⁶ ........................................ G11B 5/66
[52] U.S. Cl. ............... 428/332; 428/336; 428/694 ML; 428/694 SC; 428/694 RE; 428/694 MM; 428/694 EC; 428/900; 369/13; 369/14
[58] Field of Search ..................... 428/694, 900, 428/332, 336, 694 ML, 694 SC, 694 RE, 694 MM, 694 EC; 369/13, 14

[56] References Cited

U.S. PATENT DOCUMENTS

| | | | |
|---|---|---|---|
| 4,649,519 | 3/1987 | Sun et al. | 365/122 |
| 4,794,560 | 12/1988 | Bell et al. | 365/122 |
| 4,878,132 | 10/1989 | Aratani et al. | 360/59 |
| 4,955,007 | 9/1990 | Aratani | 369/13 |
| 5,187,694 | 2/1993 | Ichihara et al. | 369/13 |

FOREIGN PATENT DOCUMENTS

| | | | |
|---|---|---|---|
| 0217096 | 4/1987 | European Pat. Off. | G11B 5/62 |
| 258978 | 3/1988 | European Pat. Off. | |
| 0257530 | 3/1988 | European Pat. Off. | G11B 13/04 |
| 288069 | 10/1988 | European Pat. Off. | |
| 285241 | 10/1988 | European Pat. Off. | |
| 319004 | 6/1989 | European Pat. Off. | |
| 352548 | 1/1990 | European Pat. Off. | |
| 382859 | 8/1990 | European Pat. Off. | |
| 62-175948 | 8/1987 | Japan . | |
| 63-205835 | 8/1988 | Japan . | |
| 63-237238 | 10/1988 | Japan . | |
| 63-304448 | 12/1988 | Japan . | |
| 64-76549 | 3/1989 | Japan . | |
| 1-113940 | 5/1989 | Japan . | |

*Primary Examiner*—Leszek Kiliman
*Attorney, Agent, or Firm*—Wolf, Greenfield & Sacks

[57] ABSTRACT

This invention relates to a multi-layer magneto-optic recording medium having an information recording layer and an initializing layer that can be overwritten by light modulation, and in which adjacent layers, including auxiliary layers provided for more efficient transfer from the initializing layer to the recording layer, are coupled by an exchange force. This structure enables high-density, high-speed recording of audio information, visual information, and computer data.

20 Claims, 126 Drawing Sheets

FIG. 1(a)
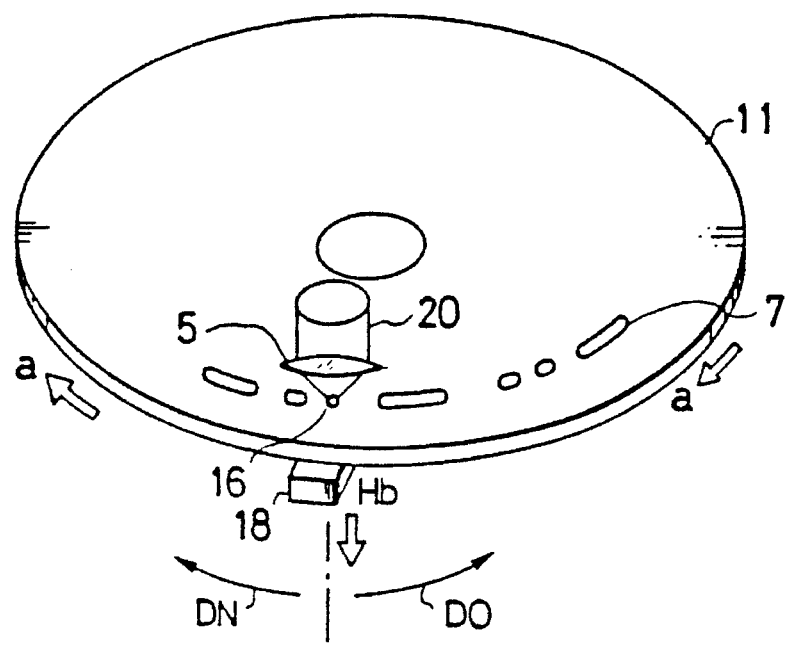
FIG. 1(b)
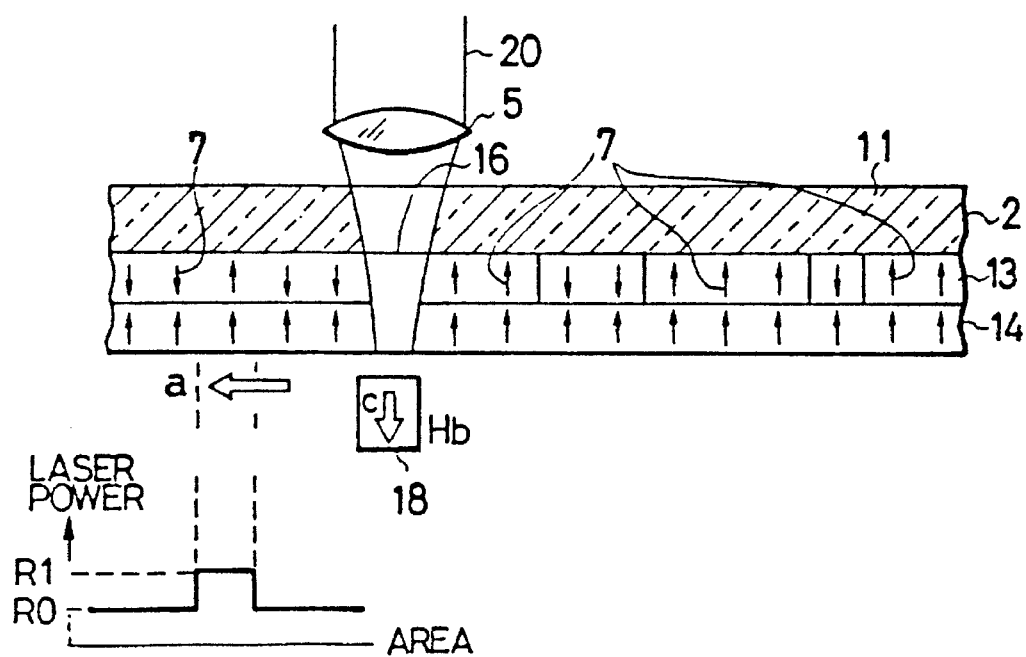
FIG. 1(c)

FIG. 4
(1) ROOM TEMP.
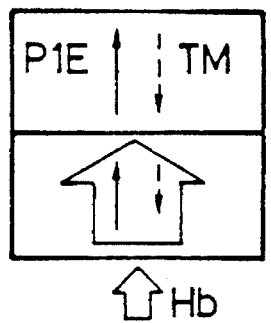
(2) $Tc2 > Tr1 > Tc1$
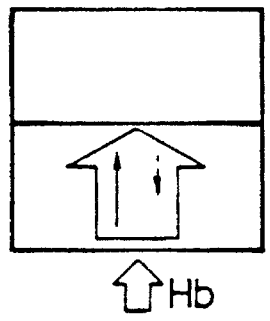
(3) $Tp$
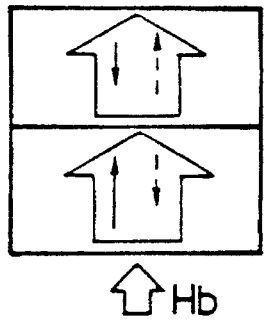
(4) ROOM TEMP.
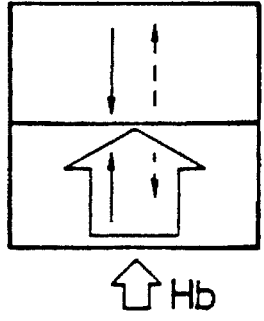
(5) ROOM TEMP.
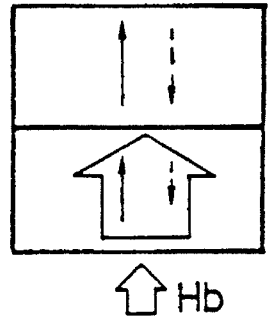
(6) $Tr0 < Tc1$
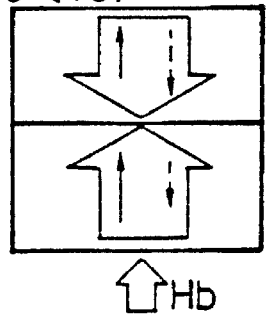
(7) $Tp$
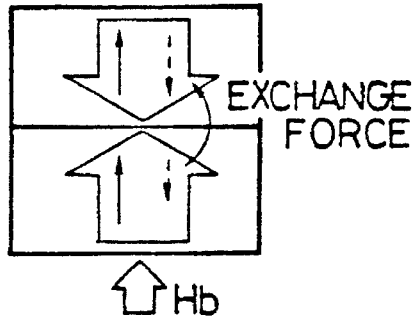
(8) ROOM TEMP.
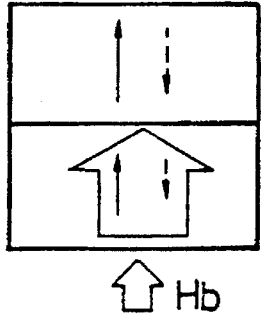

$M_S = |M_R - M_T|$
$M_R$: MAGNETIZATION OF RE SUBLATTICE
$M_T$: MAGNETIZATION OF TM SUBLATTICE

FIG. 10
(1) 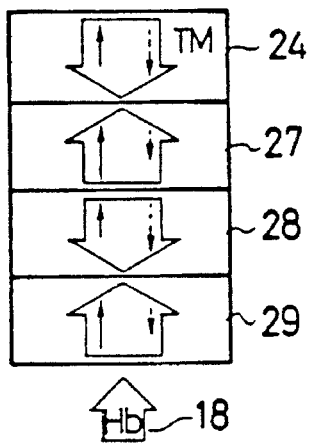
(2) 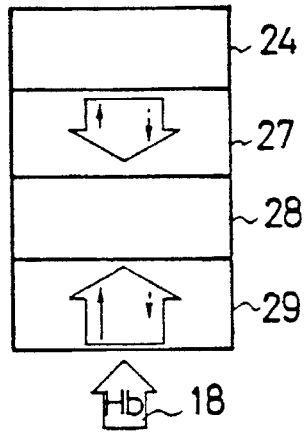
(3) 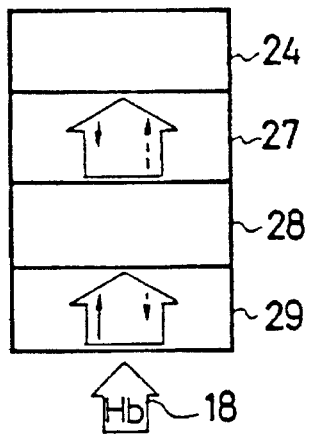
(4) 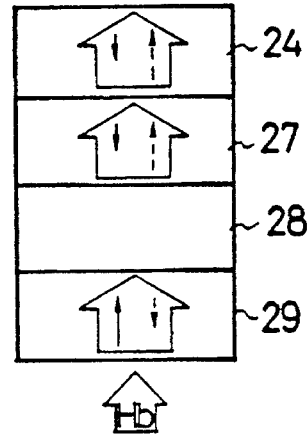
(5) 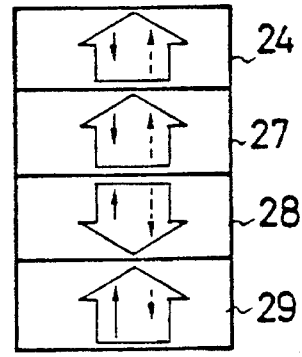
(6) 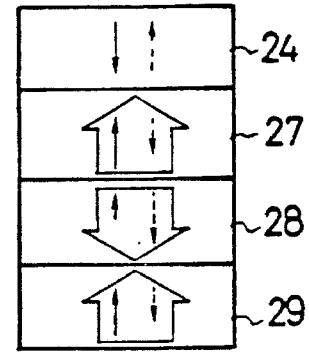

| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{22}Fe_{65}Co_8$ | 450 | 90 | 2000 | 230 | 1700 | 2 |
| $Tb_{16}Dy_4Fe_{80}$ | 200 | 70 | 2200 | 115 | 7100 | 3.4 |
| $Tb_{24}Co_{76}$ | 2000 | 240 | 2000 | >300 | 560 | 5.4 |

LAYER-1
[1] Tstor : Hc1 > Hw1(2)
[2] Tread : Hc1 > Hw1(2)
[3] TL    : Hc1 < Hw1(2) − Hb
LAYER-2
[4] Tin1  : Hc2 < Hw2(3) − Hw2(1) + Hb
[5] TL    : Hc2 > Hw2(3) − Hw2(1) + Hb
         Hc2 > Hw2(1) − Hw2(3) − Hb
[6] Tc1 < : Hc2 < Hb
LAYER-3
[7] Tin1  : Hc3 < Hw3(4) − Hw3(2) + Hb
LAYER-4
[8] Tstor : Hc4 > −Hw4(3)
[9] Tall. : Hc4 > Hw4(3) + Hb Hb

FIG.12

| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{15}Fe_{72}Co_8$ | 450 | 80 | 2000 | 220 | 2200 | 2 |
| $Tb_{16}Dy_4Fe_{80}$ | 200 | 70 | 2200 | 115 | 6800 | 3.6 |
| $Tb_{20}Co_{80}$ | 2000 | 250 | 3000 | >300 | 550 | 5.5 |

LAYER-1
[1] Tstor : Hc1 > Hw1(2)
[2] Tread : Hc1 > Hw1(2)
[3] TL    : Hc1 < Hw1(2) − Hb LAYER-2
[4] Tin1  : Hc2 < Hw2(3) − Hw2(1)
[5] TL <  : Hc2 > Hw2(1) − Hw2(3) + Hb
           Hc2 > Hw2(3) − Hw2(1) − Hb
[6] Tc1 < : Hc2 < Hb LAYER-3
[7] Tin1  : Hc3 < Hw3(4) − Hw3(2)

LAYER-4
[8] Tstor : Hc4 > Hw4(3)
[9] Tall  : Hc4 > Hw4(3)

| | | t | Ms | Hc | Tc | Hw1 | Sw |
|---|---|---|---|---|---|---|---|
| RE | $Gd_{12}Dy_{12}Fe_{76}$ | 400 | 100 | 5000 | 145 | 2500 | |
| TM | $Gd_5Dy_{15}Fe_{72}Co_8$ | 450 | 80 | 2000 | 220 | 2100 | 2 |
| TM | $Tb_{16}Dy_4Fe_{80}$ | 200 | 70 | 2200 | 115 | 7100 | 3.5 |
| TM | $Tb_{20}Co_{80}$ | 2000 | 250 | 3000 | >300 | 550 | 5.5 |

LAYER-1
[1] Tstor : Hc1 > Hw1(2)
[2] Tread : Hc1 > Hw1(2) + Hb
[3] TL  : Hc1 < Hw1(2) + Hb
LAYER-2
[4] Tin1 : Hc2 < Hw2(3) − Hw2(1)
[5] TL  : Hc2 > Hw2(1) − Hw2(3) + Hb
         Hc2 > Hw2(3) − Hw2(1) − Hb
[6] Tc1  : Hc2 < Hb
LAYER-3
[7] Tin1 : Hc3 < Hw3(4) − Hw3(2)
LAYER-4
[8] Tstor : Hc4 > Hw4(3)
[9] Tall  : Hc4 > Hw4(3)

|  | t | Ms | Hc | Tc | Hw1 | Sw |
|---|---|---|---|---|---|---|
| $Tb_{21}Fe_{79}$ | 400 | 70 | 7000 | 135 | 3600 |  |
| $Gd_5Dy_{22}Fe_{65}Co_8$ | 450 | 90 | 2000 | 230 | 1700 | 2 |
| $Tb_{16}Dy_4Fe_{80}$ | 200 | 70 | 2200 | 115 | 7100 | 3.4 |
| $Tb_{20}Co_{80}$ | 2000 | 250 | 3000 | >300 | 540 | 5.4 |

LAYER-1
[1] Tstor : Hc1 > Hw1(2)
[2] Tread : Hc1 > Hw1(2)
[3] TL    : Hc1 < Hw1(2) − Hb
LAYER-2
[4] Tini  : Hc2 < Hw2(3) − Hw2(1) + Hb
[5] TL ∨  : Hc2 > Hw2(3) − Hw2(1) + Hb
          : Hc2 > Hw2(1) − Hw2(3) − Hb
[6] Tc1 ∨ : Hc2 < Hb
LAYER-3
[7] Tini  : Hc3 < Hw3(4) − Hw3(2) + Hb
LAYER-4
[8] Tstor : Hc4 > Hw4(3)
[9] Tall  : Hc4 > Hw4(3)

|  | t | Ms | Hc | Tc | Hw1 | Sw |
|---|---|---|---|---|---|---|
| $Gd_{12}Dy_{12}Fe_{76}$ | 400 | 100 | 5000 | 145 | 2500 |  |
| $Gd_5Dy_{22}Fe_{65}Co_8$ | 450 | 90 | 2000 | 230 | 1700 | 2 |
| $Tb_{16}Dy_4Fe_{80}$ | 200 | 70 | 2200 | 115 | 7100 | 3.4 |
| $Tb_{20}Co_{80}$ | 2000 | 250 | 3000 | >300 | 540 | 5.4 |

LAYER-1
[1] Tstor : Hc1 > Hw1(2)
[2] Tread : Hc1 > Hw1(2) + Hb
[3] TL : Hc1 < Hw1(2) + Hb
LAYER-2
[4] Tini : Hc2 < Hw2(3) − Hw2(1) + Hb
[5] TL ∨ : Hc2 > Hw2(3) − Hw2(1) + Hb
      Hc2 > Hw2(1) − Hw2(3) − Hb
[6] Tc1 ∨ : Hc2 < Hb
LAYER-3
[7] Tini : Hc3 < Hw3(4) − Hw3(2) + Hb
LAYER-4
[8] Tstor : Hc4 > Hw4(3)
[9] Tall : Hc4 > Hw4(3)

| | t | Ms | Hc | Tc | Hw1 | Sw |
|---|---|---|---|---|---|---|
| $Tb_{27}Fe_{73}$ | 400 | 90 | 4500 | 135 | 2500 | 1.8 |
| $Gd_5Dy_{22}Fe_{65}Co_8$ | 450 | 90 | 2000 | 230 | 1900 | 3.3 |
| $Tb_{16}Dy_4Fe_{80}$ | 200 | 70 | 2200 | 115 | 7500 | 5.4 |
| $Tb_{20}Co_{80}$ | 2000 | 250 | 3000 | >300 | 540 | |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tin1  : Hc2 < Hw2(3) − Hw2(1) + Hb
[5] TL ∨  : Hc2 > Hw2(3) − Hw2(1) + Hb
           Hc2 > Hw2(1) − Hw2(3) − Hb
[6] Tc1 ∨ : Hc2 < Hb
LAYER-3
[7] Tin1  : Hc3 < Hw3(4) − Hw3(2) + Hb
LAYER-4
[8] Tstor : Hc4 > Hw4(3)
[9] Tall  : Hc4 > Hw4(3)

| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{25}Fe_{62}Co_8$ | 450 | 80 | 1700 | 220 | 1800 | 2 |
| $Tb_{16}Dy_4Fe_{80}$ | 200 | 70 | 2200 | 115 | 6400 | 3.3 |
| $Tb_{20}Co_{80}$ | 2000 | 250 | 3000 | >300 | 510 | 5.1 |

LAYER-1
[1] Tstor : Hc1 > Hw1(2)
[2] Tread : Hc1 > Hw1(2) − Hb (>0)
[3] TL    : Hc1 < Hw1(2) + Hb
LAYER-2
[4] Tin1  : Hc2 < Hw2(3) − Hw2(1)
[5] TL    : Hc2 > Hw2(1) − Hw2(3) − Hb (>0)
            Hc2 > Hw2(3) − Hw2(1) + Hb (<0)
[6] Tc1 < : Hc2 < −Hb (>0)
LAYER-3
[7] Tin1  : Hc3 < Hw3(4) − Hw3(2)
LAYER-4
[8] Tstor : Hc4 > Hw4(3)
[9] Ta11  : Hc4 > Hw4(3) − Hb (>0)

Hb ⇒

| | t | Ms | Hc | Tc | Hw1 | Sw |
|---|---|---|---|---|---|---|
| $Gd_{12}Dy_{12}Fe_{76}$ | 400 | 100 | 5000 | 145 | 2500 | |
| $Gd_5Dy_{25}Fe_{62}Co_8$ | 450 | 80 | 1700 | 220 | 1800 | 2 |
| $Tb_{16}Dy_4Fe_{80}$ | 200 | 70 | 2200 | 115 | 6400 | 3.3 |
| $Tb_{20}Co_{80}$ | 2000 | 250 | 3000 | >300 | 510 | 5.1 |

LAYER-1
[1] Tstor : Hc1 > Hw1(2)
[2] Tread : Hc1 > Hw1(2)
[3] TL : Hc1 < Hw1(2) − Hb
LAYER-2
[4] Tin1 : Hc2 < Hw2(3) − Hw2(1) − Hb (>0)
[5] TL : Hc2 > Hw2(1) − Hw2(3) − Hb (>0)
   : Hc2 > Hw2(3) − Hw2(1) + Hb (<0)
[6] Tc1 < : Hc2 < −Hb (>0)
LAYER-3
[7] Tin1 : Hc3 < Hw3(4) − Hw3(2)
LAYER-4
[8] Tstor : Hc4 > Hw4(3)
[9] Tall : Hc4 > Hw4(3) − Hb (>0)

| | | t | Ms | Hc | Tc | Hw1 | Sw |
|---|---|---|---|---|---|---|---|
| | $Tb_{27}Fe_{73}$ | 400 | 90 | 4500 | 135 | 2500 | |
| | $Gd_5Dy_{25}Fe_{62}Co_8$ | 450 | 80 | 1700 | 220 | 2100 | 1.8 |
| | $Tb_{16}Dy_4Fe_{80}$ | 200 | 70 | 2200 | 115 | 6400 | 3.3 |
| | $Tb_{20}Co_{80}$ | 2000 | 250 | 3000 | >300 | 510 | 5.1 |

LAYER-1
[1] Tstor : Hc1 > Hw1(2)
[2] Tread : Hc1 > Hw1(2)
[3] TL    : Hc1 < Hw1(2) — Hb
LAYER-2
[4] Tin1  : Hc2 < Hw2(3) — Hw2(1)
[5] TL ∨  : Hc2 > Hw2(1) — Hw2(3) — Hb (>0)
           Hc2 > Hw2(3) — Hw2(1) + Hb (<0)
[6] Tc1 ∨ : Hc2 < −Hb (>0)
LAYER-3
[7] Tin1  : Hc3 < Hw3(4) — Hw3(2)
LAYER-4
[8] Tstor : Hc4 > Hw4(3)
[9] Tall  : Hc4 > Hw4(3) — Hb (>0)

| | | t | Ms | Hc | Tc | Hw1 | Sw |
|---|---|---|---|---|---|---|---|
| TM | $Tb_{21}Fe_{79}$ | 400 | 70 | 7000 | 135 | 3600 | |
| TM | $Gd_5Dy_{15}Fe_{72}Co_8$ | 450 | 80 | 2000 | 220 | 2200 | 2 |
| RE | $Tb_{20}Dy_4Fe_{76}$ | 150 | 90 | 2000 | 115 | 6700 | 3.6 |
| TM | $Tb_{20}Co_{80}$ | 2000 | 250 | 3000 | >300 | 540 | 5.4 |

LAYER-1
[1] Tstor : Hc1 > Hw1(2)
[2] Tread : Hc1 > Hw1(2)
[3] TL    : Hc1 < Hw1(2) − Hb
LAYER-2
[4] Tin1  : Hc2 < Hw2(3) − Hw2(1)
[5] TL <  : Hc2 > Hw2(1) − Hw2(3) + Hb
           Hc2 > Hw2(3) − Hw2(1) − Hb
[6] Tc1 < : Hc2 < Hb
LAYER-3
[7] Tin1  : Hc3 < Hw3(4) − Hw3(2)
LAYER-4
[8] Tstor : Hc4 > −Hw4(3)
[9] Tall  : Hc4 > Hw4(3)

| | t | Ms | Hc | Tc | Hw1 | Sw |
|---|---|---|---|---|---|---|
| $Gd_{12}Dy_{12}Fe_{76}$ | 400 | 100 | 5000 | 145 | 2500 | |
| $Gd_5Dy_{15}Fe_{72}Co_8$ | 450 | 80 | 2000 | 220 | 2100 | 2 |
| $Tb_{20}Dy_4Fe_{76}$ | 150 | 90 | 2000 | 115 | 7000 | 3.5 |
| $Tb_{20}Co_{80}$ | 2000 | 250 | 3000 | >300 | 540 | 5.4 |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tini  : Hc2 < Hw2(3) − Hw2(1)
[5] TL <  : Hc2 > Hw2(1) − Hw2(3) + Hb
           Hc2 > Hw2(3) − Hw2(1) − Hb
[6] Tc1 < : Hc2 < Hb
[7] Tini  : Hc3 < Hw3(4) − Hw3(2)
LAYER-4
[8] Tstor : Hc4 > −Hw4(3)
[9] Tall  : Hc4 > Hw4(3)

|  | | t | Ms | Hc | Tc | Hw1 | Sw |
|---|---|---|---|---|---|---|---|
| re | $Tb_{27}Fe_{73}$ | 400 | 90 | 4500 | 135 | 2500 |  |
| TM | $Gd_5Dy_{15}Fe_{72}Co_8$ | 450 | 80 | 2000 | 220 | 2400 | 1.8 |
| RE | $Tb_{20}Dy_4Fe_{76}$ | 150 | 90 | 2000 | 115 | 7000 | 3.5 |
| TM | $Tb_{20}Co_{80}$ | 2000 | 250 | 3000 | >300 | 540 | 5.4 |

LAYER-1
[1] Tstor : Hc1 > Hw1(2)
[2] Tread : Hc1 > Hw1(2) + Hb
[3] TL   : Hc1 < Hw1(2) + Hb
LAYER-2
[4] Tin1 : Hc2 < Hw2(3) − Hw2(1)
[5] TL < : Hc2 > Hw2(1) − Hw2(3) + Hb
         : Hc2 > Hw2(3) − Hw2(1) − Hb
[6] Tc1 < : Hc2 < Hb
LAYER-3
[7] Tin1 : Hc3 < Hw3(4) − Hw3(2)
LAYER-4
[8] Tstor : Hc4 > −Hw4(3)
[9] Tall  : Hc4 > Hw4(3)

| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{22}Fe_{65}Co_8$ | 450 | 90 | 2000 | 230 | 1700 | 2 |
| $Tb_{20}Dy_4Fe_{76}$ | 150 | 90 | 2000 | 115 | 6700 | 3.4 |
| $Tb_{20}Co_{80}$ | 2000 | 250 | 3000 | >300 | 520 | 5.2 |

LAYER-1
[1] Tstor : Hc1 > Hw1(2)
[2] Tread : Hc1 > Hw1(2)
[3] TL    : Hc1 < Hw1(2) − Hb
LAYER-2
[4] Tin1  : Hc2 < Hw2(3) − Hw2(1) + Hb
[5] TL ∨  : Hc2 > Hw2(3) − Hw2(1) + Hb
           Hc2 > Hw2(1) − Hw2(3) − Hb
[6] Tc1 ∨ : Hc2 < Hb
LAYER-3
[7] Tin1  : Hc3 < Hw3(4) − Hw3(2) + Hb
LAYER-4
[8] Tstor : Hc4 > −Hw4(3)
[9] Tall  : Hc4 > Hw4(3)

| | t | Ms | Hc | Tc | Hw1 | Sw |
|---|---|---|---|---|---|---|
| RE $Gd_{12}Dy_{12}Fe_{76}$ | 400 | 100 | 5000 | 145 | 2500 | |
| RE $Gd_5Dy_{22}Fe_{65}Co_8$ | 450 | 90 | 2000 | 230 | 1700 | 2 |
| RE $Tb_{20}Dy_4Fe_{76}$ | 150 | 90 | 2000 | 115 | 6700 | 3.4 |
| TM $Tb_{20}Co_{80}$ | 2000 | 250 | 3000 | >300 | 520 | 5.2 |

LAYER-1
[1] Tstor : $Hc1 > Hw1(2)$
[2] Tread : $Hc1 > Hw1(2) + Hb$
[3] TL : $Hc1 < Hw1(2) + Hb$ LAYER-2
[4] Tin1 : $Hc2 < Hw2(3) - Hw2(1) + Hb$
[5] TL < : $Hc2 > Hw2(3) - Hw2(1) + Hb$
          $Hc2 > Hw2(1) - Hw2(3) - Hb$
[6] Tc1 < : $Hc2 < Hb$ LAYER-3
[7] Tin1 : $Hc3 < Hw3(4) - Hw3(2) + Hb$ LAYER-4
[8] Tstor : $Hc4 > -Hw4(3)$
[9] Tall : $Hc4 > Hw4(3)$

| | | t | Ms | Hc | Tc | Hw1 | Sw |
|---|---|---|---|---|---|---|---|
| re | $Tb_{27}Fe_{73}$ | 400 | 90 | 4500 | 135 | 2500 | |
| RE | $Gd_5Dy_{22}Fe_{65}Co_8$ | 450 | 90 | 2000 | 230 | 1900 | 1.8 |
| RE | $Tb_{20}Dy_4Fe_{76}$ | 150 | 90 | 2000 | 115 | 7000 | 3.3 |
| TM | $Tb_{20}Co_{80}$ | 2000 | 250 | 3000 | >300 | 520 | 5.2 |

LAYER-1
[1] Tstor : Hc1 > Hw1(2)
[2] Tread : Hc1 > Hw1(2) + Hb
[3] TL   : Hc1 < Hw1(2) + Hb
LAYER-2
[4] Tin1 : Hc2 < Hw2(3) − Hw2(1) + Hb
[5] TL <  : Hc2 > Hw2(3) − Hw2(1) + Hb
         Hc2 > Hw2(1) − Hw2(3) − Hb
[6] Tc1 < : Hc2 < Hb
LAYER-3
[7] Tin1 : Hc3 < Hw3(4) − Hw3(2) + Hb
LAYER-4
[8] Tstor : Hc4 > −Hw4(3)
[9] Tall : Hc4 > Hw4(3)

| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{25}Fe_{62}Co_8$ | 450 | 80 | 1700 | 220 | 1800 | 2 |
| $Tb_{20}Dy_4Fe_{76}$ | 150 | 90 | 2000 | 115 | 6300 | 3.3 |
| $Tb_{20}Co_{80}$ | 2000 | 250 | 3000 | >300 | 500 | 5 |

LAYER-1
[1] Tstor : Hc1 > Hw1(2)
[2] Tread : Hc1 > Hw1(2) − Hb (>0)
[3] TL : Hc1 < Hw1(2) + Hb
LAYER-2
[4] Tin1 : Hc2 < Hw2(3) − Hw2(1)
[5] TL < : Hc2 > Hw2(1) − Hw2(3) − Hb (>0)
      Hc2 > Hw2(3) − Hw2(1) + Hb (<0)
[6] Tc1 < : Hc2 < −Hb (>0)
LAYER-3
[7] Tin1 : Hc3 < Hw3(4) − Hw3(2)
LAYER-4
[8] Tstor : Hc4 > −Hw4(3)
[9] Tall : Hc4 > Hw4(3) − Hb (>0)

Hb

| | t | Ms | Hc | Tc | Hw1 | Sw |
|---|---|---|---|---|---|---|
| $Gd_{12}Dy_{12}Fe_{76}$ | 400 | 100 | 5000 | 145 | 2500 | |
| $Gd_5Dy_{25}Fe_{62}Co_8$ | 450 | 80 | 1700 | 220 | 1800 | 2 |
| $Tb_{20}Dy_4Fe_{76}$ | 150 | 90 | 2000 | 115 | 6300 | 3.3 |
| $Tb_{20}Co_{80}$ | 2000 | 250 | 3000 | >300 | 500 | 5 |

LAYER-1
[1] Tstor : Hc1 > Hw1(2)
[2] Tread : Hc1 > Hw1(2)
[3] TL    : Hc1 < Hw1(2) − Hb
LAYER-2
[4] Tini  : Hc2 < Hw2(3) − Hw2(1)
[5] TL <  : Hc2 > Hw2(1) − Hw2(3) − Hb (>0)
          : Hc2 > Hw2(3) − Hw2(1) + Hb (<0)
[6] Tc1 < : Hc2 < −Hb (>0)
LAYER-3
[7] Tini  : Hc3 < Hw3(4) − Hw3(2)
LAYER-4
[8] Tstor : Hc4 > −Hw4(3)
[9] Tall  : Hc4 > Hw4(3) − Hb (>0)

| a1 | a2 | |
|---|---|---|
| ⇐ | ⇒ | RE |
| ⇐ | ⇐ | re |
| ⇐ | ⇐ | RE |
| ⇒ | ⇒ | TM |

|  | t | Ms | Hc | Tc | Hw1 | Sw |
|---|---|---|---|---|---|---|
| $Tb_{27}Fe_{73}$ | 400 | 90 | 4500 | 135 | 2500 | |
| $Gd_5Dy_{25}Fe_{62}Co_8$ | 450 | 80 | 1700 | 220 | 2100 | 1.8 |
| $Tb_{20}Dy_4Fe_{76}$ | 150 | 90 | 2000 | 115 | 6300 | 3.3 |
| $Tb_{20}Co_{80}$ | 2000 | 250 | 3000 | >300 | 500 | 5 |

LAYER-1
[1] Tstor : Hc1 > Hw1(2)
[2] Tread : Hc1 > Hw1(2)
[3] TL : Hc1 < Hw1(2) – Hb
LAYER-2
[4] Tini : Hc2 < Hw2(3) – Hw2(1) – Hb (>0)
[5] TL < : Hc2 > Hw2(1) – Hw2(3) – Hb (>0)
           Hc2 > Hw2(3) – Hw2(1) + Hb (<0)
[6] Tc1 < : Hc2 < –Hb (>0)
LAYER-3
[7] Tini : Hc3 < Hw3(4) – Hw3(2)
LAYER-4
[8] Tstor : Hc4 > –Hw4(3)
[9] Tall : Hc4 > Hw4(3) – Hb (>0)

| | t | Ms | Hc | Tc | Hw1 | Sw |
|---|---|---|---|---|---|---|
| $Gd_{12}Dy_{12}Fe_{76}$ | 400 | 100 | 5000 | 145 | 2500 | |
| $Gd_5Dy_{15}Fe_{72}Co_8$ | 450 | 80 | 2000 | 220 | 2100 | 2 |
| $Tb_{23}Dy_4Fe_{73}$ | 150 | 170 | 700 | 115 | 3100 | 3.5 |
| $Tb_{20}Co_{80}$ | 2000 | 250 | 3000 | >300 | 510 | 5.1 |

```
LAYER-1
 [1] Tstor : Hc1 > Hw1(2)
 [2] Tread : Hc1 > Hw1(2) + Hb
 [3] TL    : Hc1 < Hw1(2) + Hb
LAYER-2
 [4] Tin1  : Hc2 < Hw2(3) - Hw2(1)
 [5] TL <  : Hc2 > Hw2(1) - Hw2(3) + Hb
           : Hc2 > Hw2(3) - Hw2(1) - Hb
 [6] Tc1 < : Hc2 < Hb
LAYER-3
 [7] Tin1  : Hc3 < Hw3(4) - Hw3(2)
LAYER-4
 [8] Tstor : Hc4 > -Hw4(3)
 [9] Tall  : Hc4 > Hw4(3)
```

FIG. 32
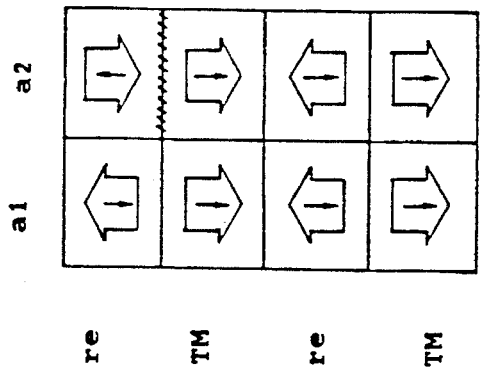
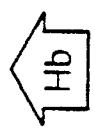
| | t | Ms | Hc | Tc | Hw1 | Sw |
|---|---|---|---|---|---|---|
| $Tb_{27}Fe_{73}$ | 400 | 90 | 4500 | 135 | 2500 | |
| $Gd_5Dy_{15}Fe_{72}Co_8$ | 450 | 80 | 2000 | 220 | 2400 | 1.8 |
| $Tb_{23}Dy_4Fe_{73}$ | 150 | 170 | 700 | 115 | 3100 | 3.5 |
| $Tb_{20}Co_{80}$ | 2000 | 250 | 3000 | >300 | 510 | 5.1 |
LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tin1  : Hc2 < Hw2(3) − Hw2(1)
[5] TL ∨  : Hc2 > Hw2(1) − Hw2(3) + Hb
           Hc2 > Hw2(3) − Hw2(1) − Hb
[6] Tc1 ∨ : Hc2 < Hb
LAYER-3
[7] Tin1  : Hc3 < Hw3(4) − Hw3(2)
LAYER-4
[8] Tstor : Hc4 > −Hw4(3)
[9] Tall  : Hc4 > Hw4(3)

| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{22}Fe_{65}Co_8$ | 450 | 90 | 2000 | 230 | 1700 | 2 |
| $Tb_{23}Dy_4Fe_{73}$ | 150 | 170 | 700 | 115 | 3100 | 3.4 |
| $Tb_{20}Co_{80}$ | 2000 | 250 | 3000 | >300 | 500 | 5 |

LAYER-1
[1] Tstor : Hc1 > Hw1(2)
[2] Tread : Hc1 > Hw1(2)
[3] TL   : Hc1 < Hw1(2) − Hb
LAYER-2
[4] Tini1 : Hc2 < Hw2(3) − Hw2(1) + Hb
[5] TL ∨ : Hc2 > Hw2(3) − Hw2(1) + Hb
         Hc2 > Hw2(1) − Hw2(3) − Hb
[6] Tc1 ∨ : Hc2 < Hb
LAYER-3
[7] Tini1 : Hc3 < Hw3(4) − Hw3(2) + Hb
LAYER-4
[8] Tstor : Hc4 > −Hw4(3)
[9] Tall  : Hc4 > Hw4(3)

FIG. 34
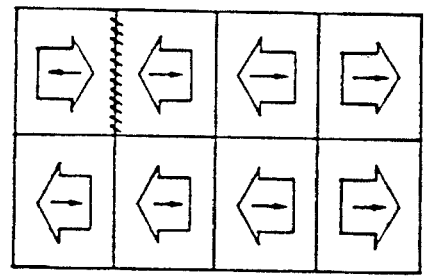
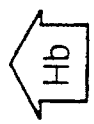
| | t | Ms | Hc | Tc | Hw1 | Sw |
|---|---|---|---|---|---|---|
| $Gd_{12}Dy_{12}Fe_{76}$ | 400 | 100 | 5000 | 145 | 2500 | |
| $Gd_5Dy_{22}Fe_{65}Co_8$ | 450 | 90 | 2000 | 230 | 1700 | 2 |
| $Tb_{23}Dy_4Fe_{73}$ | 150 | 170 | 70 | 115 | 3100 | 3.4 |
| $Tb_{20}Co_{80}$ | 2000 | 250 | 3000 | >300 | 500 | 5 |
LAYER-1
[1] Tstor : Hc1 > Hw1(2)
[2] Tread : Hc1 > Hw1(2) − Hw2(1) + Hb
[3] TL    : Hc1 < Hw1(2) + Hb
LAYER-2
[4] Tini1 : Hc2 < Hw2(3) − Hw2(1) + Hb
[5] TL <  : Hc2 > Hw2(3) − Hw2(1) + Hb
           Hc2 > Hw2(1) − Hw2(3) − Hb
[6] Tc1 < : Hc2 < Hb
LAYER-3
[7] Tini1 : Hc3 <´Hw3(4) − Hw3(2) + Hb
LAYER-4
[8] Tstor : Hc4 > −Hw4(3)
[9] Tall  : Hc4 > Hw4(3)

FIG. 36
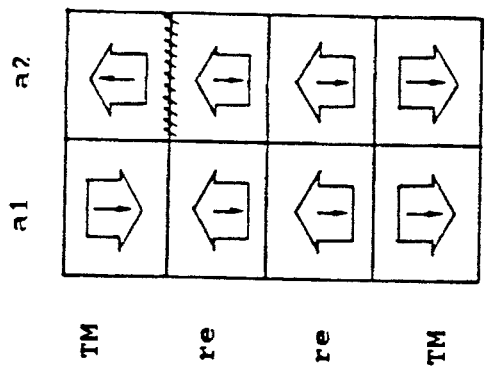
| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{25}Fe_{62}Co_8$ | 450 | 80 | 1700 | 220 | 1800 | 2 |
| $Tb_{23}Dy_4Fe_{73}$ | 150 | 170 | 700 | 115 | 3300 | 3.3 |
| $Tb_{20}Co_{80}$ | 2000 | 250 | 3000 | >300 | 500 | 5 |
LAYER-1
[1] Tstor : Hc1 > Hw1(2)
[2] Tread : Hc1 > Hw1(2) - Hb
[3] TL   : Hc1 < Hw1(2) + Hb
LAYER-2
[4] Tin1  : Hc2 < Hw2(3) - Hw2(1)
[5] TL  v : Hc2 > Hw2(1) - Hw2(3) - Hb (>0)
           Hc2 > Hw2(3) - Hw2(1) + Hb (<0)
[6] Tc1 v : Hc2 v -Hb (>0)
LAYER-3
[7] Tin1 : Hc3 < Hw3(4) - Hw3(2)
LAYER-4
[8] Tstor : Hc4 > -Hw4(3)
[9] Tall : Hc4 > Hw4(3) - Hb (>0)
 Hb

FIG.37

| | t | Ms | Hc | Tc | Hw1 | Sw |
|---|---|---|---|---|---|---|
| $Gd_{12}Dy_{12}Fe_{76}$ | 400 | 100 | 5000 | 145 | 2500 | |
| $Gd_5Dy_{25}Fe_{62}Co_8$ | 450 | 80 | 1700 | 220 | 1800 | 2 |
| $Tb_{23}Dy_4Fe_{73}$ | 150 | 170 | 700 | 115 | 3300 | 3.3 |
| $Tb_{20}Co_{80}$ | 2000 | 250 | 3000 | >300 | 500 | 5 |

LAYER-1
[1] Tstor : Hc1 > Hw1(2)
[2] Tread : Hc1 > Hw1(2)
[3] TL : Hc1 < Hw1(2) − Hb
LAYER-2
[4] Tini : Hc2 < Hw2(3) − Hw2(1)
[5] TL < : Hc2 > Hw2(1) − Hw2(3) − Hb (>0)
  Hc2 > Hw2(3) − Hw2(1) + Hb (<0)
[6] Tc1 < : Hc2 < −Hb (>0)
LAYER-3
[7] Tini : Hc3 < Hw3(4) − Hw3(2)
LAYER-4
[8] Tstor : Hc4 > −Hw4(3)
[9] Tall : Hc4 > Hw4(3) − Hb (>0)

| | | t | Ms | Hc | Tc | Hw1 | Sw |
|---|---|---|---|---|---|---|---|
| re | $Tb_{27}Fe_{73}$ | 400 | 90 | 4500 | 135 | 2500 | 1.8 |
| re | $Gd_5Dy_{25}Fe_{62}Co_8$ | 450 | 80 | 1700 | 220 | 2100 | 3.3 |
| re | $Tb_{23}Dy_4Fe_{73}$ | 150 | 170 | 700 | 115 | 3300 | 5 |
| TM | $Tb_{20}Co_{80}$ | 2000 | 250 | 3000 | >300 | 500 | |

LAYER-1
[1] Tstor : Hc1 > Hw1(2)
[2] Tread : Hc1 > Hw1(2)
[3] TL    : Hc1 < Hw1(2) − Hb
LAYER-2
[4] Tin1 : Hc2 < Hw2(3) − Hw2(1)
[5] TL   : Hc2 > Hw2(1) − Hw2(3) − Hb (>0)
         : Hc2 > Hw2(3) − Hw2(1) + Hb (<0)
[6] Tc1 < : Hc2 < −Hb (>0)
LAYER-3
[7] Tin1 : Hc3 < Hw3(4) − Hw3(2)
LAYER-4
[8] Tstor : Hc4 > −Hw4(3)
[9] Tall  : Hc4 > Hw4(3) − Hb (>0)

FIG. 39
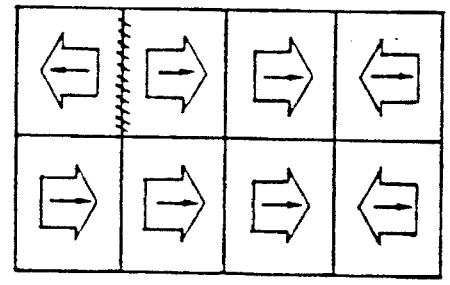
| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{15}Fe_{72}Co_8$ | 450 | 80 | 2000 | 220 | 2200 | 2 |
| $Tb_{16}Dy_4Fe_{80}$ | 200 | 70 | 2200 | 115 | 6800 | 3.6 |
| $Tb_{24}Co_{76}$ | 2000 | 240 | 2000 | >300 | 570 | 5.5 |
```
LAYER-1
[1] Tstor : Hc1 > Hw1(2)
[2] Tread : Hc1 > Hw1(2)
[3] TL    : Hc1 < Hw1(2) - Hb
LAYER-2
[4] Tini  : Hc2 < Hw2(3) - Hw2(1)
[5] TL <  : Hc2 > Hw2(1) - Hw2(3) + Hb
          : Hc2 > Hw2(3) - Hw2(1) - Hb
    [6] Tc1 < : Hc2 < Hb
LAYER-3
[7] Tini  : Hc3 < Hw3(4) - Hw3(2)
LAYER-4
[8] Tstor : Hc4 > -Hw4(3)
[9] Tall  : Hc4 > Hw4(3) + Hb
```
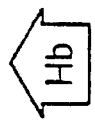
Hb

|    |    | t | Ms | Hc | Tc | Hw1 | Sw |
|----|----|---|----|----|----|-----|-----|
| RE | $Gd_{12}Dy_{12}Fe_{76}$ | 400 | 100 | 5000 | 145 | 2500 | |
| TM | $Gd_5Dy_{15}Fe_{72}Co_8$ | 450 | 80 | 2000 | 220 | 2100 | 2 |
| TM | $Tb_{16}Dy_4Fe_{80}$ | 200 | 70 | 2200 | 115 | 7100 | 3.5 |
| RE | $Tb_{24}Co_{76}$ | 2000 | 240 | 2000 | >300 | 570 | 5.5 |

```
LAYER-1
 [1] Tstor  : Hc1 > Hw1(2)
 [2] Tread  : Hc1 > Hw1(2) + Hb
 [3] TL     : Hc1 < Hw1(2) + Hb
LAYER-2
 [4] Tin1   : Hc2 < Hw2(3) - Hw2(1)
 [5] TL <   : Hc2 > Hw2(1) - Hw2(3) + Hb
              Hc2 > Hw2(3) - Hw2(1) - Hb
 [6] Tc1 <  : Hc2 < Hb
LAYER-3
 [7] Tin1   : Hc3 < Hw3(4) - Hw3(2)
LAYER-4
 [8] Tstor  : Hc4 > -Hw4(3)
 [9] Tall   : Hc4 > Hw4(3) + Hb
```

| | | t | Ms | Hc | Tc | Hw1 | Sw |
|---|---|---|---|---|---|---|---|
| re | $Tb_{27}Fe_{73}$ | 400 | 90 | 4500 | 135 | 2500 | |
| TM | $Gd_5Dy_{15}Fe_{72}Co_8$ | 450 | 80 | 2000 | 220 | 2400 | 1.8 |
| TM | $Tb_{16}Dy_4Fe_{80}$ | 200 | 70 | 2200 | 115 | 7100 | 3.5 |
| RE | $Tb_{24}Co_{76}$ | 2000 | 240 | 2000 | >300 | 570 | 5.5 |

LAYER-1
[1] Tstor : Hc1 > Hw1(2)
[2] Tread : Hc1 > Hw1(2) + Hb
[3] TL : Hc1 < Hw1(2) + Hb
LAYER-2
[4] Tin1 : Hc2 < Hw2(3) – Hw2(1)
[5] TL < : Hc2 > Hw2(1) – Hw2(3) + Hb
    Hc2 > Hw2(3) – Hw2(1) – Hb
[6] Tc1 < : Hc2 < Hb
LAYER-3
[7] Tin1 : Hc3 < Hw3(4) – Hw3(2)
LAYER-4
[8] Tstor : Hc4 > –Hw4(3)
[9] Tall : Hc4 > Hw4(3) + Hb

| | t | Ms | Hc | Tc | Hw1 | Sw |
|---|---|---|---|---|---|---|
| $Gd_{12}Dy_{12}Fe_{76}$ | 400 | 100 | 5000 | 145 | 2500 | |
| $Gd_5Dy_{22}Fe_{65}Co_8$ | 450 | 90 | 2000 | 230 | 1700 | 2 |
| $Tb_{16}Dy_4Fe_{80}$ | 200 | 70 | 2200 | 115 | 7100 | 3.4 |
| $Tb_{24}Co_{76}$ | 2000 | 240 | 2000 | >300 | 560 | 5.4 |

```
LAYER-1
 [1] Tstor  : Hc1 > Hw1(2)
 [2] Tread  : Hc1 > Hw1(2) + Hb
 [3] TL     : Hc1 < Hw1(2) + Hb
LAYER-2
 [4] Tin1   : Hc2 < Hw2(3) − Hw2(1) + Hb
 [5] TL <   : Hc2 > Hw2(3) − Hw2(1) + Hb
            : Hc2 > Hw2(1) − Hw2(3) − Hb
 [6] Tc1 <  : Hc2 < Hb
LAYER-3
 [7] Tin1   : Hc3 < Hw3(4) − Hw3(2) + Hb
LAYER-4
 [8] Tstor  : Hc4 > −Hw4(3)
 [9] Tall   : Hc4 > Hw4(3) + Hb
```

|  |  | t | Ms | Hc | Tc | Hw1 | Sw |
|---|---|---|---|---|---|---|---|
| a1 a2 | | | | | | | |
| → ← | re | $Tb_{27}Fe_{73}$ | 400 | 90 | 4500 | 135 | 2500 | 1.8 |
| ← ← | RE | $Gd_5Dy_{22}Fe_{65}Co_8$ | 450 | 90 | 2000 | 230 | 1900 | 3.3 |
| → → | TM | $Tb_{16}Dy_4Fe_{80}$ | 200 | 70 | 2200 | 115 | 7500 | 5.4 |
| ← ← | RE | $Tb_{24}Co_{76}$ | 2000 | 240 | 2000 | >300 | 560 | |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tin1  : Hc2 < Hw2(3) − Hw2(1) + Hb
[5] TL <  : Hc2 > Hw2(3) − Hw2(1) + Hb
          : Hc2 > Hw2(1) − Hw2(3) − Hb
[6] Tc1 < : Hc2 < Hb
LAYER-3
[7] Tin1  : Hc3 < Hw3(4) − Hw3(2) + Hb
LAYER-4
[8] Tstor : Hc4 > −Hw4(3)
[9] Tall  : Hc4 > Hw4(3) + Hb

|  |  | t | Ms | Hc | Tc | Hw1 | Sw |
|---|---|---|---|---|---|---|---|
| $Tb_{21}Fe_{79}$ |  | 400 | 70 | 7000 | 135 | 3600 | 2 |
| $Gd_5Dy_{25}Fe_{62}Co_8$ |  | 450 | 80 | 1700 | 220 | 1800 | 3.3 |
| $Tb_{16}Dy_4Fe_{80}$ |  | 200 | 70 | 2200 | 115 | 6400 | 5.1 |
| $Tb_{24}Co_{76}$ |  | 2000 | 240 | 2000 | >300 | 530 |  |

LAYER-1
[1] Tstor : Hc1 > Hw1(2)
[2] Tread : Hc1 > Hw1(2) − Hb (>0)
[3] TL : Hc1 < Hw1(2) + Hb LAYER-2
[4] Tin1 : Hc2 < Hw2(3) − Hw2(1)
[5] TL < : Hc2 > Hw2(1) − Hw2(3) − Hb (>0)
        Hc2 > Hw2(3) − Hw2(1) + Hb (<0)
[6] Tc1 < : Hc2 < −Hb (>0)

LAYER-3
[7] Tin1 : Hc3 < Hw3(4) − Hw3(2)

LAYER-4
[8] Tstor : Hc4 > −Hw4(3)
[9] Tall : Hc4 > Hw4(3)

|  | t | Ms | Hc | Tc | Hw1 | Sw |
|---|---|---|---|---|---|---|
| $Gd_{12}Dy_{12}Fe_{76}$ | 400 | 100 | 5000 | 145 | 2500 |  |
| $Gd_5Dy_{25}Fe_{62}Co_8$ | 450 | 80 | 1700 | 220 | 1800 | 2 |
| $Tb_{16}Dy_4Fe_{80}$ | 200 | 70 | 2200 | 115 | 6400 | 3.3 |
| $Tb_{24}Co_{76}$ | 2000 | 240 | 2000 | >300 | 530 | 5.1 |

LAYER-1
[1] Tstor : Hc1 > Hw1(2)
[2] Tread : Hc1 > Hw1(2)
[3] TL    : Hc1 < Hw1(2) − Hb
LAYER-2
[4] Tin1  : Hc2 < Hw2(3) − Hw2(1)
[5] TL  < : Hc2 > Hw2(1) − Hw2(3) − Hb (>0)
           Hc2 > Hw2(3) − Hw2(1) + Hb (<0)
[6] Tc1 < : Hc2 < −Hb (>0)
LAYER-3
[7] Tin1  : Hc3 < Hw3(4) − Hw3(2)
LAYER-4
[8] Tstor : Hc4 > −Hw4(3)
[9] Tall  : Hc4 > Hw4(3)

| | | t | Ms | Hc | Tc | Hw1 | Sw |
|---|---|---|---|---|---|---|---|
| re | $Tb_{27}Fe_{73}$ | 400 | 90 | 4500 | 135 | 2500 | |
| re | $Gd_5Dy_{25}Fe_{62}Co_8$ | 450 | 80 | 1700 | 220 | 2100 | 1.8 |
| TM | $Tb_{16}Dy_4Fe_{80}$ | 200 | 70 | 2200 | 115 | 6400 | 3.3 |
| RE | $Tb_{24}Co_{76}$ | 2000 | 240 | 2000 | >300 | 530 | 5.1 |

LAYER-1
[1] Tstor : Hc1 > Hw1(2)
[2] Tread : Hc1 > Hw1(2)
[3] TL    : Hc1 < Hw1(2) − Hb LAYER-2
[4] Tin1  : Hc2 < Hw2(3) − Hw2(1)
[5] TL <  : Hc2 > Hw2(1) − Hw2(3) − Hb (>0)
           Hc2 > Hw2(3) − Hw2(1) + Hb (<0)
[6] Tc1 < : Hc2 < −Hb (>0)

LAYER-3
[7] Tin1  : Hc3 < Hw3(4) − Hw3(2)

LAYER-4
[8] Tstor : Hc4 > −Hw4(3)
[9] Tall  : Hc4 > Hw4(3)

Hb →

FIG. 47
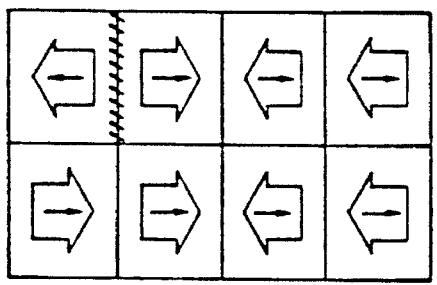
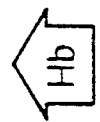
|  | t | Ms | Hc | Tc | Hw1 | Sw |
|---|---|---|---|---|---|---|
| $Tb_{21}Fe_{79}$ | 400 | 70 | 7000 | 135 | 3600 |  |
| $Gd_5Dy_{15}Fe_{72}Co_8$ | 450 | 80 | 2000 | 220 | 2200 | 2 |
| $Tb_{20}Dy_4Fe_{76}$ | 150 | 90 | 2000 | 115 | 6700 | 3.6 |
| $Tb_{24}Co_{76}$ | 2000 | 240 | 2000 | >300 | 560 | 5.4 |
LAYER-1
[1] Tstor : Hc1 > Hw1(2)
[2] Tread : Hc1 > Hw1(2)
[3] TL    : Hc1 < Hw1(2) − Hb
LAYER-2
[4] Tin1  : Hc2 < Hw2(3) − Hw2(1)
[5] TL <  : Hc2 > Hw2(1) − Hw2(3) + Hb
[6] Tc1 < : Hc2 > Hw2(3) − Hw2(1) − Hb
           Hc2 < Hb
LAYER-3
[7] Tin1  : Hc3 < Hw3(4) − Hw3(2)
LAYER-4
[8] Tstor : Hc4 > Hw4(3)
[9] Tall  : Hc4 > Hw4(3) + Hb

| | | t | Ms | Hc | Tc | Hw1 | Sw |
|---|---|---|---|---|---|---|---|
| RE | $Gd_{12}Dy_{12}Fe_{76}$ | 400 | 100 | 5000 | 145 | 2500 | |
| TM | $Gd_5Dy_{15}Fe_{72}Co_8$ | 450 | 80 | 2000 | 220 | 2100 | 2 |
| RE | $Tb_{20}Dy_4Fe_{76}$ | 150 | 90 | 2000 | 115 | 7000 | 3.5 |
| RE | $Tb_{24}Co_{76}$ | 2000 | 240 | 2000 | >300 | 560 | 5.4 |

LAYER-1
[1] Tstor : Hc1 > Hw1(2)
[2] Tread : Hc1 > Hw1(2) + Hb
[3] TL : Hc1 < Hw1(2) + Hb
LAYER-2
[4] Tini : Hc2 < Hw2(3) − Hw2(1)
[5] TL < : Hc2 > Hw2(1) − Hw2(3) + Hb
  : Hc2 > Hw2(3) − Hw2(1) − Hb
[6] Tc1 < : Hc2 < Hb
LAYER-3
[7] Tini : Hc3 < Hw3(4) − Hw3(2)
LAYER-4
[8] Tstor : Hc4 > Hw4(3)
[9] Tall : Hc4 > Hw4(3) + Hb

| | t | Ms | Hc | Tc | Hw1 | Sw |
|---|---|---|---|---|---|---|
| $Tb_{27}Fe_{73}$ | 400 | 90 | 4500 | 135 | 2500 | |
| $Gd_5Dy_{15}Fe_{72}Co_8$ | 450 | 80 | 2000 | 220 | 2400 | 1.8 |
| $Tb_{20}Dy_4Fe_{76}$ | 150 | 90 | 2000 | 115 | 7000 | 3.5 |
| $Tb_{24}Co_{76}$ | 2000 | 240 | 2000 | >300 | 560 | 5.4 |

LAYER-1
[1] Tstor : Hc1 > Hw1(2)
[2] Tread : Hc1 > Hw1(2) + Hb
[3] TL     : Hc1 < Hw1(2) + Hb
LAYER-2
[4] Tin1 : Hc2 < Hw2(3) − Hw2(1)
[5] TL    : Hc2 > Hw2(1) − Hw2(3) + Hb
           Hc2 > Hw2(3) − Hw2(1) − Hb
[6] Tc1 < : Hc2 < Hb
LAYER-3
[7] Tin1 : Hc3 < Hw3(4) − Hw3(2)
LAYER-4
[8] Tstor : Hc4 > Hw4(3)
[9] Ta11  : Hc4 > Hw4(3) + Hb

|  | a1 | a2 |
|---|---|---|
| re | ⇐ | ⇒ |
| TM | → | → |
| RE | ⇐ | ⇐ |
| RE | ⇐ | ⇐ |

Hb

|  |  | t | Ms | Hc | Tc | Hw1 | Sw |
|---|---|---|---|---|---|---|---|
| TM | $Tb_{21}Fe_{79}$ | 400 | 70 | 7000 | 135 | 3600 |  |
| RE | $Gd_5Dy_{22}Fe_{65}Co_8$ | 450 | 90 | 2000 | 230 | 1700 | 2 |
| RE | $Tb_{20}Dy_4Fe_{76}$ | 150 | 90 | 2000 | 115 | 6700 | 3.4 |
| RE | $Tb_{24}Co_{76}$ | 2000 | 240 | 2000 | >300 | 540 | 5.2 |

LAYER-1
[1] Tstor : Hc1 > Hw1(2)
[2] Tread : Hc1 > Hw1(2)
[3] TL    : Hc1 < Hw1(2) − Hb
LAYER-2
[4] Tini1 : Hc2 < Hw2(3) − Hw2(1) + Hb
[5] TL <  : Hc2 > Hw2(3) − Hw2(1) + Hb
          Hc2 > Hw2(1) − Hw2(3) − Hb
[6] Tc1 < : Hc2 < Hb
LAYER-3
[7] Tini1 : Hc3 < Hw3(4) − Hw3(2) + Hb
LAYER-4
[8] Tstor : Hc4 > Hw4(3)
[9] Tall  : Hc4 > Hw4(3) + Hb

|  | t | Ms | Hc | Tc | Hw1 | Sw |
|---|---|---|---|---|---|---|
| $Gd_{12}Dy_{12}Fe_{76}$ | 400 | 100 | 5000 | 145 | 2500 |  |
| $Gd_5Dy_{22}Fe_{65}Co_8$ | 450 | 90 | 2000 | 230 | 1700 | 2 |
| $Tb_{20}Dy_4Fe_{76}$ | 150 | 90 | 2000 | 115 | 6700 | 3.4 |
| $Tb_{24}Co_{76}$ | 2000 | 240 | 2000 | >300 | 540 | 5.2 |

```
LAYER-1
 [1] Tstor : Hc1 > Hw1(2)
 [2] Tread : Hc1 > Hw1(2) + Hb
 [3] TL    : Hc1 < Hw1(2) + Hb
LAYER-2
 [4] Tin1  : Hc2 < Hw2(3) − Hw2(1) + Hb
 [5] TL <  : Hc2 > Hw2(3) − Hw2(1) + Hb
            Hc2 > Hw2(1) − Hw2(3) − Hb
 [6] Tc1 < : Hc2 < Hb
LAYER-3
 [7] Tin1  : Hc3 < Hw3(4) − Hw3(2) + Hb
LAYER-4
 [8] Tstor : Hc4 > Hw4(3)
 [9] Tall  : Hc4 > Hw4(3) + Hb
```

FIG. 52
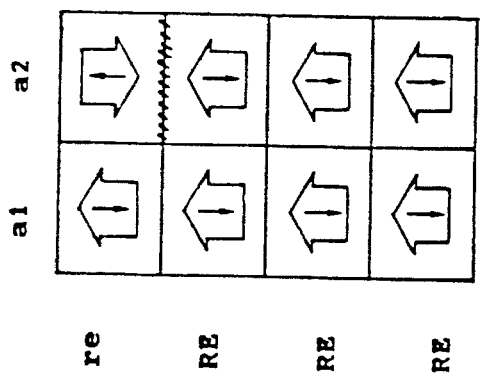
|  |  | t | Ms | Hc | Tc | Hw1 | Sw |
|---|---|---|---|---|---|---|---|
| re | $Tb_{27}Fe_{73}$ | 400 | 90 | 4500 | 135 | 2500 |  |
| RE | $Gd_5Dy_{22}Fe_{65}Co_8$ | 450 | 90 | 2000 | 230 | 1900 | 1.8 |
| RE | $Tb_{20}Dy_4Fe_{76}$ | 150 | 90 | 2000 | 115 | 7000 | 3.3 |
| RE | $Tb_{24}Co_{76}$ | 2000 | 240 | 2000 | >300 | 540 | 5.2 |
```
LAYER-1
 [1] Tstor  : Hc1 > Hw1(2)
 [2] Tread  : Hc1 > Hw1(2) + Hb
 [3] TL     : Hc1 < Hw1(2) + Hb
LAYER-2
 [4] Tin1   : Hc2 < Hw2(3) − Hw2(1) + Hb
 [5] TL <   : Hc2 > Hw2(3) − Hw2(1) + Hb
              Hc2 > Hw2(1) − Hw2(3) − Hb
 [6] Tc1 <  : Hc2 < Hb
LAYER-3
 [7] Tin1   : Hc3 < Hw3(4) − Hw3(2) + Hb
LAYER-4
 [8] Tstor  : Hc4 > Hw4(3)
 [9] Tall   : Hc4 > Hw4(3) + Hb
```

|    |    | t | Ms | Hc | Tc | Hw1 | Sw |
|----|----|---|----|----|----|----|----|
| TM | $Tb_{21}Fe_{79}$ | 400 | 70 | 7000 | 135 | 3600 | |
| re | $Gd_5Dy_{25}Fe_{62}Co_8$ | 450 | 80 | 1700 | 220 | 1800 | 2 |
| RE | $Tb_{20}Dy_4Fe_{76}$ | 150 | 90 | 2000 | 115 | 6300 | 3.3 |
| RE | $Tb_{24}Co_{76}$ | 2000 | 240 | 2000 | >300 | 520 | 5 |

LAYER-1
[1] Tstor : Hc1 > Hw1(2)
[2] Tread : Hc1 > Hw1(2) − Hb (>0)
[3] TL    : Hc1 < Hw1(2) + Hb
LAYER-2
[4] Tin1  : Hc2 < Hw2(3) − Hw2(1)
[5] TL <  : Hc2 > Hw2(1) − Hw2(3) − Hb (>0)
           Hc2 > Hw2(3) − Hw2(1) + Hb (<0)
[6] Tc1 < : Hc2 < −Hb (>0)
LAYER-3
[7] Tin1  : Hc3 < Hw3(4) − Hw3(2)
LAYER-4
[8] Tstor : Hc4 > Hw4(3)
[9] Tall  : Hc4 > Hw4(3)

| | | t | Ms | Hc | Tc | Hw1 | Sw |
|---|---|---|---|---|---|---|---|
| RE | $Gd_{12}Dy_{12}Fe_{76}$ | 400 | 100 | 5000 | 145 | 2500 | |
| re | $Gd_5Dy_{25}Fe_{62}Co_8$ | 450 | 80 | 1700 | 220 | 1800 | 2 |
| RE | $Tb_{20}Dy_4Fe_{76}$ | 150 | 90 | 2000 | 115 | 6300 | 3.3 |
| RE | $Tb_{24}Co_{76}$ | 2000 | 240 | 2000 | >300 | 520 | 5 |

LAYER-1
[1] Tstor : Hc1 > Hw1(2)
[2] Tread : Hc1 > Hw1(2)
[3] TL    : Hc1 < Hw1(2) − Hb LAYER-2
[4] Tin1  : Hc2 < Hw2(3) − Hw2(1)
[5] TL <  : Hc2 > Hw2(1) − Hw2(3) − Hb (>0)
             Hc2 > Hw2(3) − Hw2(1) + Hb (<0)
[6] Tc1 <·· : Hc2 < −Hb (>0)

LAYER-3
[7] Tin1  : Hc3 < Hw3(4) − Hw3(2)

LAYER-4
[8] Tstor : Hc4 > Hw4(3)
[9] Tall  : Hc4 > Hw4(3)

FIG.55
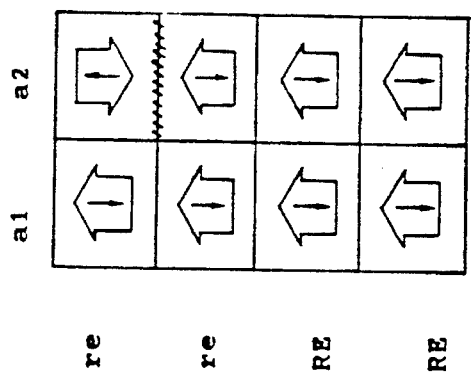
| | t | Ms | Hc | Tc | Hw1 | Sw |
|---|---|---|---|---|---|---|
| $Tb_{27}Fe_{73}$ | 400 | 90 | 4500 | 135 | 2500 | |
| $Gd_5Dy_{25}Fe_{62}Co_8$ | 450 | 80 | 1700 | 220 | 2100 | 1.8 |
| $Tb_{20}Dy_4Fe_{76}$ | 150 | 90 | 2000 | 115 | 6300 | 3.3 |
| $Tb_{24}Co_{76}$ | 2000 | 240 | 2000 | >300 | 520 | 5 |
LAYER-1
[1] Tstor : Hc1 > Hw1(2)
[2] Tread : Hc1 > Hw1(2)
[3] TL    : Hc1 < Hw1(2) - Hb
LAYER-2
[4] Tin1  : Hc2 < Hw2(3) - Hw2(1)
[5] TL <  : Hc2 > Hw2(1) - Hw2(3) - Hb  (>0)
         : Hc2 > Hw2(3) - Hw2(1) + Hb  (<0)
[6] Tc1 < : Hc2 < -Hb  (>0)
LAYER-3
[7] Tin1  : Hc3 < Hw3(4) - Hw3(2)
LAYER-4
[8] Tstor : Hc4 > Hw4(3)
[9] Tall  : Hc4 > Hw4(3)
 Hb

FIG. 56

| | | t | Ms | Hc | Tc | Hw1 | Sw |
|---|---|---|---|---|---|---|---|
| TM | $Tb_{21}Fe_{79}$ | 400 | 70 | 7000 | 135 | 3600 | |
| TM | $Gd_5Dy_{15}Fe_{72}Co_8$ | 450 | 80 | 2000 | 220 | 2200 | 2 |
| re | $Tb_{23}Dy_4Fe_{73}$ | 150 | 170 | 700 | 115 | 2900 | 3.6 |
| RE | $Tb_{24}Co_{76}$ | 2000 | 240 | 2000 | >300 | 530 | 5.1 |

LAYER-1
[1] Tstor : Hc1 > Hw1(2)
[2] Tread : Hc1 > Hw1(2)
[3] TL : Hc1 < Hw1(2) − Hb
LAYER-2
[4] Tin1 : Hc2 < Hw2(3) − Hw2(1) + Hb
[5] TL < : Hc2 > Hw2(1) − Hw2(3) − Hb
       Hc2 > Hw2(3) − Hw2(1) − Hb
[6] Tc1 < : Hc2 < Hb
LAYER-3
[7] Tin1 : Hc3 < Hw3(4) − Hw3(2)
LAYER-4
[8] Tstor : Hc4 > Hw4(3)
[9] Tall : Hc4 > Hw4(3) + Hb

|  | t | Ms | Hc | Tc | Hw1 | Sw |
|---|---|---|---|---|---|---|
| RE $Gd_{12}Dy_{12}Fe_{76}$ | 400 | 100 | 5000 | 145 | 2500 | |
| TM $Gd_5Dy_{15}Fe_{72}Co_8$ | 450 | 80 | 2000 | 220 | 2100 | 2 |
| re $Tb_{23}Dy_4Fe_{73}$ | 150 | 170 | 700 | 115 | 3100 | 3.5 |
| RE $Tb_{24}Co_{76}$ | 2000 | 240 | 2000 | >300 | 530 | 5.1 |

LAYER-1
[1] Tstor : Hc1 > Hw1(2)
[2] Tread : Hc1 > Hw1(2) + Hb
[3] TL   : Hc1 < Hw1(2) + Hb
LAYER-2
[4] Tin1 : Hc2 < Hw2(3) − Hw2(1)
[5] TL <  : Hc2 > Hw2(1) − Hw2(3) + Hb
          : Hc2 > Hw2(3) − Hw2(1) − Hb
[6] Tc1 < : Hc2 < Hb
LAYER-3
[7] Tin1 : Hc3 < Hw3(4) − Hw3(2)
LAYER-4
[8] Tstor : Hc4 > Hw4(3)
[9] Tall : Hc4 > Hw4(3) + Hb

| | | t | Ms | Hc | Tc | Hw1 | Sw |
|---|---|---|---|---|---|---|---|
| re | $Tb_{27}Fe_{73}$ | 400 | 90 | 4500 | 135 | 2500 | |
| TM | $Gd_5Dy_{15}Fe_{72}Co_8$ | 450 | 80 | 2000 | 220 | 2400 | 1.8 |
| re | $Tb_{23}Dy_4Fe_{73}$ | 150 | 170 | 700 | 115 | 3100 | 3.5 |
| RE | $Tb_{24}Co_{76}$ | 2000 | 240 | 2000 | >300 | 530 | 5.1 |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tin1  : Hc2 < Hw2(3) − Hw2(1)
[5] TL ∨  : Hc2 > Hw2(1) − Hw2(3) + Hb
          : Hc2 > Hw2(3) − Hw2(1) − Hb
[6] Tc1 ∨ : Hc2 ∨ Hb
LAYER-3
[7] Tin1  : Hc3 ∨ Hw3(4) − Hw3(2)
LAYER-4
[8] Tstor : Hc4 > Hw4(3)
[9] Tall  : Hc4 > Hw4(3) + Hb

| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{22}Fe_{65}Co_8$ | 450 | 90 | 2000 | 230 | 1700 | 2 |
| $Tb_{23}Dy_4Fe_{73}$ | 150 | 170 | 700 | 115 | 3100 | 3.4 |
| $Tb_{24}Co_{76}$ | 2000 | 240 | 2000 | >300 | 520 | 5 |

LAYER-1
[1] Tstor : Hc1 > Hw1(2)
[2] Tread : Hc1 > Hw1(2)
[3] TL : Hc1 < Hw1(2) − Hb
LAYER-2
[4] Tin1 : Hc2 < Hw2(3) − Hw2(1) + Hb
[5] TL < : Hc2 > Hw2(3) − Hw2(1) + Hb
      Hc2 > Hw2(1) − Hw2(3) − Hb
[6] Tc1 < : Hc2 < Hb
LAYER-3
[7] Tin1 : Hc3 < Hw3(4) − Hw3(2) + Hb
LAYER-4
[8] Tstor : Hc4 > Hw4(3)
[9] Tall : Hc4 > Hw4(3) + Hb Hb

| | t | Ms | Hc | Tc | Hw1 | Sw |
|---|---|---|---|---|---|---|
| $Gd_{12}Dy_{12}Fe_{76}$ | 400 | 100 | 5000 | 145 | 2500 | |
| $Gd_5Dy_{22}Fe_{65}Co_8$ | 450 | 90 | 2000 | 230 | 1700 | 2 |
| $Tb_{23}Dy_4Fe_{73}$ | 150 | 170 | 700 | 115 | 3100 | 3.4 |
| $Tb_{24}Co_{76}$ | 2000 | 240 | 2000 | >300 | 520 | 5 |

LAYER-1
[1] Tstor : Hc1 > Hw1(2)
[2] Tread : Hc1 > Hw1(2) + Hb
[3] TL   : Hc1 < Hw1(2) + Hb
LAYER-2
[4] Tin1 : Hc2 < Hw2(3) − Hw2(1) + Hb
[5] TL ∨ : Hc2 > Hw2(3) − Hw2(1) + Hb
         Hc2 > Hw2(1) − Hw2(3) − Hb
[6] Tc1 ∨ : Hc2 < Hb
LAYER-3
[7] Tin1 : Hc3 < Hw3(4) − Hw3(2) + Hb
LAYER-4
[8] Tstor : Hc4 > Hw4(3)
[9] Tall : Hc4 > Hw4(3) + Hb

| | a1 | a2 |
|---|---|---|
| RE | ⇐ | ⇒ |
| RE | ⇐ | ⇐ |
| re | ⇐ | ⇐ |
| RE | ⇐ | ⇐ |

Hb

FIG.61
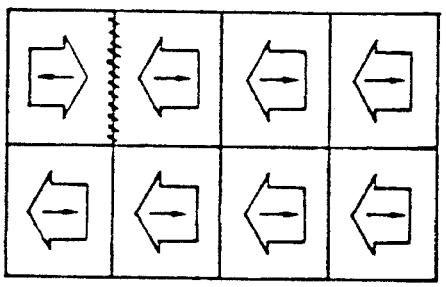
| | t | Ms | Hc | Tc | Hw1 | Sw |
|---|---|---|---|---|---|---|
| $Tb_{27}Fe_{73}$ | 400 | 90 | 4500 | 135 | 2500 | |
| $Gd_5Dy_{22}Fe_{65}Co_8$ | 450 | 90 | 2000 | 230 | 1900 | 1.8 |
| $Tb_{23}Dy_4Fe_{73}$ | 150 | 170 | 700 | 115 | 3300 | 3.3 |
| $Tb_{24}Co_{76}$ | 2000 | 240 | 2000 | >300 | 520 | 5 |
LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tin1 : Hc2 < Hw2(3) − Hw2(1) + Hb
[5] TL <  : Hc2 > Hw2(3) − Hw2(1) + Hb
          : Hc2 > Hw2(1) − Hw2(3) − Hb
[6] Tc1 < : Hc2 < Hb
LAYER-3
[7] Tin1 : Hc3 < Hw3(4) − Hw3(2) + Hb
LAYER-4
[8] Tstor : Hc4 > Hw4(3)
[9] Ta11  : Hc4 > Hw4(3) + Hb
 Hb

|     | t    | Ms  | Hc   | Tc   | Hw1  | Sw  |
|-----|------|-----|------|------|------|-----|
| $Tb_{21}Fe_{79}$ | 400 | 70 | 7000 | 135 | 3600 | |
| $Gd_5Dy_{25}Fe_{62}Co_8$ | 450 | 80 | 1700 | 220 | 1800 | 2 |
| $Tb_{23}Dy_4Fe_{73}$ | 150 | 170 | 700 | 115 | 3300 | 3.3 |
| $Tb_{24}Co_{76}$ | 2000 | 240 | 2000 | >300 | 520 | 5 |

```
LAYER-1
 [1] Tstor : Hc1 > Hw1(2)
 [2] Tread : Hc1 > Hw1(2) - Hb (>0)
 [3] TL    : Hc1 < Hw1(2) + Hb
LAYER-2
 [4] Tin1  : Hc2 < Hw2(3) - Hw2(1)
 [5] TL <  : Hc2 > Hw2(1) - Hw2(3) - Hb (>0)
            Hc2 > Hw2(3) - Hw2(1) + Hb (<0)
 [6] Tc1 < : Hc2 < -Hb (>0)
LAYER-3
 [7] Tin1  : Hc3 < Hw3(4) - Hw3(2)
LAYER-4
 [8] Tstor : Hc4 > Hw4(3)
 [9] Tall  : Hc4 > Hw4(3)
```

| | t | Ms | Hc | Tc | Hw1 | Sw |
|---|---|---|---|---|---|---|
| $Gd_{12}Dy_{12}Fe_{76}$ | 400 | 100 | 5000 | 145 | 2500 | |
| $Gd_5Dy_{25}Fe_{62}Co_8$ | 450 | 80 | 1700 | 220 | 1800 | 2 |
| $Tb_{23}Dy_4Fe_{73}$ | 150 | 170 | 700 | 115 | 3300 | 3.3 |
| $Tb_{24}Co_{76}$ | 2000 | 240 | 2000 | >300 | 520 | 5 |
| | | | >300 | | | |

LAYER-1
[1] Tstor : Hc1 > Hw1(2)
[2] Tread : Hc1 > Hw1(2)
[3] TL   : Hc1 < Hw1(2) − Hb
LAYER-2
[4] Tin1 : Hc2 < Hw2(3) − Hw2(1)
[5] TL  ∨ : Hc2 > Hw2(1) − Hw2(3) − Hb (>0)
          Hc2 > Hw2(3) − Hw2(1) + Hb (<0)
[6] Tc1 ∨ : Hc2 < −Hb (>0)
LAYER-3
[7] Tin1 : Hc3 < Hw3(4) − Hw3(2)
LAYER-4
[8] Tstor : Hc4 > Hw4(3)
[9] Tall : Hc4 > Hw4(3)

| | t | Ms | Hc | Tc | Hw1 | Sw |
|---|---|---|---|---|---|---|
| $Tb_{27}Fe_{73}$ | 400 | 90 | 4500 | 135 | 2500 | |
| $Gd_5Dy_{25}Fe_{62}Co_8$ | 450 | 80 | 1700 | 220 | 2100 | 1.8 |
| $Tb_{23}Dy_4Fe_{73}$ | 150 | 170 | 700 | 115 | 3300 | 3.3 |
| $Tb_{24}Co_{76}$ | 2000 | 240 | 2000 | >300 | 520 | 5 |

LAYER-1
[1] Tstor : Hc1 > Hw1(2)
[2] Tread : Hc1 > Hw1(2)
[3] TL    : Hc1 < Hw1(2) − Hb
LAYER-2
[4] Tin1  : Hc2 < Hw2(3) − Hw2(1)
[5] TL <  : Hc2 > Hw2(1) − Hw2(3) − Hb (>0)
           Hc2 > Hw2(3) − Hw2(1) + Hb (<0)
[6] Tc1 < : Hc2 < −Hb (>0)
LAYER-3
[7] Tin1  : Hc3 < Hw3(4) − Hw3(2)
LAYER-4
[8] Tstor : Hc4 > Hw4(3)
[9] Tall  : Hc4 > Hw4(3)

| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{15}Fe_{72}Co_8$ | 450 | 80 | 2000 | 220 | 2200 | 2 |
| $Tb_{16}Dy_4Fe_{80}$ | 200 | 70 | 2200 | 115 | 6800 | 3.6 |
| $Tb_{27}Co_{73}$ | 2000 | 260 | 1500 | >300 | 530 | 5.5 |

LAYER-1
[1] Tstor : Hc1 > Hw1(2)
[2] Tread : Hc1 > Hw1(2)
[3] TL    : Hc1 < Hw1(2) - Hb
LAYER-2
[4] Tin1  : Hc2 < Hw2(3) - Hw2(1)
[5] TL <  : Hc2 > Hw2(1) - Hw2(3) + Hb
           Hc2 > Hw2(3) - Hw2(1) - Hb
[6] Tc1 < : Hc2 < Hb
LAYER-3
[7] Tin1  : Hc3 < Hw3(4) - Hw3(2)
LAYER-4
[8] Tstor : Hc4 > -Hw4(3)
[9] Tall  : Hc4 > Hw4(3) + Hb (diagram showing magnetic domain arrows for layers a1, a2 with TM, TM, TM, re labels)

FIG.66
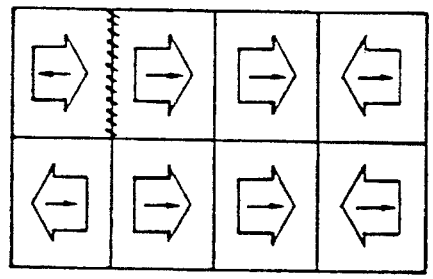
|  |  | t | Ms | Hc | Tc | Hw1 | Sw |
|---|---|---|---|---|---|---|---|
| RE | $Gd_{12}Dy_{12}Fe_{76}$ | 400 | 100 | 5000 | 145 | 2500 | 2 |
| TM | $Gd_5Dy_{15}Fe_{72}Co_8$ | 450 | 80 | 2000 | 220 | 2100 | 3.5 |
| TM | $Tb_{16}Dy_4Fe_{80}$ | 200 | 70 | 2200 | 115 | 7100 | 5.5 |
| re | $Tb_{27}Co_{73}$ | 2000 | 260 | 1500 | >300 | 530 |  |
LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tin1  : Hc2 < Hw2(3) − Hw2(1)
[5] TL  <    : Hc2 > Hw2(1) − Hw2(3) + Hb
              Hc2 > Hw2(3) − Hw2(1) − Hb
[6] Tc1 < : Hc2 < Hb
LAYER-3
[7] Tin1  : Hc3 < Hw3(4) − Hw3(2)
LAYER-4
[8] Tstor : Hc4 > −Hw4(3)
[9] Tall  : Hc4 > Hw4(3) + Hb

| | t | Ms | Hc | Tc | Hw1 | Sw |
|---|---|---|---|---|---|---|
| re | $Tb_{27}Fe_{73}$ | 400 | 90 | 4500 | 135 | 2500 | |
| TM | $Gd_5Dy_{15}Fe_{72}Co_8$ | 450 | 80 | 2000 | 220 | 2400 | 1.8 |
| TM | $Tb_{16}Dy_4Fe_{80}$ | 200 | 70 | 2200 | 115 | 7100 | 3.5 |
| re | $Tb_{27}Co_{73}$ | 2000 | 260 | 1500 | >300 | 530 | 5.5 |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tin1  : Hc2 < Hw2(3) − Hw2(1)
[5] TL    : Hc2 > Hw2(1) − Hw2(3) + Hb
         : Hc2 > Hw2(3) − Hw2(1) − Hb
[6] Tc1 < : Hc2 < Hb
LAYER-3
[7] Tin1  : Hc3 < Hw3(4) − Hw3(2)
LAYER-4
[8] Tstor : Hc4 > −Hw4(3)
[9] Tall  : Hc4 > Hw4(3) + Hb

FIG.68
| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{22}Fe_{65}Co_8$ | 450 | 90 | 2000 | 230 | 1700 | 2 |
| $Tb_{16}Dy_4Fe_{80}$ | 200 | 70 | 2200 | 115 | 7100 | 3.4 |
| $Tb_{27}Co_{73}$ | 2000 | 260 | 1500 | >300 | 520 | 5.4 |
LAYER-1
[1] Tstor : Hc1 > Hw1(2)
[2] Tread : Hc1 > Hw1(2)
[3] TL   : Hc1 < Hw1(2) − Hb
LAYER-2
[4] Tin1 : Hc2 < Hw2(3) − Hw2(1) + Hb
[5] TL <  : Hc2 > Hw2(3) − Hw2(1) + Hb
           Hc2 > Hw2(1) − Hb
[6] Tc1 < : Hc2 < Hb
LAYER-3
[7] Tin1 : Hc3 < Hw3(4) − Hw3(2) + Hb
LAYER-4
[8] Tstor : Hc4 > −Hw4(3)
[9] Tall  : Hc4 > Hw4(3) + Hb
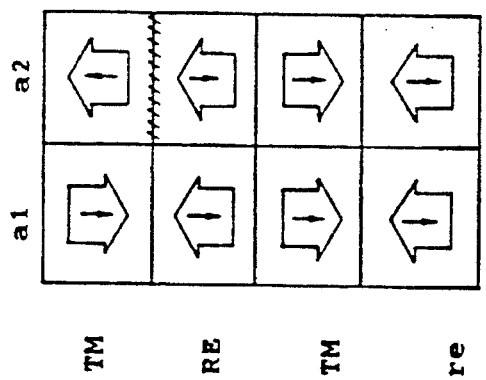
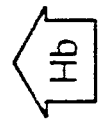
Hb

| | | t | Ms | Hc | Tc | Hw1 | Sw |
|---|---|---|---|---|---|---|---|
| RE | $Gd_{12}Dy_{12}Fe_{76}$ | 400 | 100 | 5000 | 145 | 2500 | |
| RE | $Gd_5Dy_{22}Fe_{65}Co_8$ | 450 | 90 | 2000 | 230 | 1700 | 2 |
| TM | $Tb_{16}Dy_4Fe_{80}$ | 200 | 70 | 2200 | 115 | 7100 | 3.4 |
| re | $Tb_{27}Co_{73}$ | 2000 | 260 | 1500 | >300 | 520 | 5.4 |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tini1 : Hc2 < Hw2(3) – Hw2(1) + Hb
[5] TL    : Hc2 > Hw2(3) – Hw2(1) + Hb
         Hc2 > Hw2(1) – Hw2(3) – Hb
[6] Tc1 < : Hc2 < Hb
LAYER-3
[7] Tini1 : Hc3 < Hw3(4) – Hw3(2) + Hb
LAYER-4
[8] Tstor : Hc4 > –Hw4(3)
[9] Tail  : Hc4 > Hw4(3) + Hb

| | t | Ms | Hc | Tc | Hw1 | Sw |
|---|---|---|---|---|---|---|
| $Tb_{27}Fe_{73}$ | 400 | 90 | 4500 | 135 | 2500 | |
| $Gd_5Dy_{22}Fe_{65}Co_8$ | 450 | 90 | 2000 | 230 | 1900 | 1.8 |
| $Tb_{16}Dy_4Fe_{80}$ | 200 | 70 | 2200 | 115 | 7500 | 3.3 |
| $Tb_{27}Co_{73}$ | 2000 | 260 | 1500 | >300 | 520 | 5.4 |

LAYER-1
[1] Tstor : Hc1 > Hw1(2)
[2] Tread : Hc1 > Hw1(2) + Hb
[3] TL   : Hc1 < Hw1(2) + Hb
LAYER-2
[4] Tin1  : Hc2 < Hw2(3) − Hw2(1) + Hb
[5] TL <  : Hc2 > Hw2(3) − Hw2(1) + Hb
         Hc2 > Hw2(1) − Hw2(3) − Hb
[6] Tc1 < : Hc2 < Hb
LAYER-3
[7] Tin1  : Hc3 < Hw3(4) − Hw3(2) + Hb
LAYER-4
[8] Tstor : Hc4 > −Hw4(3)
[9] Tall  : Hc4 > Hw4(3) + Hb

| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{25}Fe_{62}Co_8$ | 450 | 80 | 1700 | 220 | 1800 | 2 |
| $Tb_{16}Dy_4Fe_{80}$ | 200 | 70 | 2200 | 115 | 6400 | 3.3 |
| $Tb_{27}Co_{73}$ | 2000 | 260 | 1500 | >300 | 490 | 5.1 |

```
LAYER-1
 [1] Tstor  : Hc1 > Hw1(2)
 [2] Tread  : Hc1 > Hw1(2) - Hb
 [3] TL     : Hc1 < Hw1(2) + Hb
LAYER-2
 [4] Tin1   : Hc2 < Hw2(3) - Hw2(1)
 [5] TL  v  : Hc2 > Hw2(1) - Hw2(3) - Hb (>0)
            : Hc2 > Hw2(3) - Hw2(1) + Hb (<0)
 [6] Tc1 v  : Hc2 < -Hb (>0)
LAYER-3
 [7] Tin1   : Hc3 < Hw3(4) - Hw3(2)
LAYER-4
 [8] Tstor  : Hc4 > -Hw4(3)
 [9] Tall   : Hc4 > Hw4(3)
```

| | t | Ms | Hc | Tc | Hw1 | Sw |
|---|---|---|---|---|---|---|
| $Gd_{12}Dy_{12}Fe_{76}$ | 400 | 100 | 5000 | 145 | 2500 | |
| $Gd_5Dy_{25}Fe_{62}Co_8$ | 450 | 80 | 1700 | 220 | 1800 | 2 |
| $Tb_{16}Dy_4Fe_{80}$ | 200 | 70 | 2200 | 115 | 6400 | 3.3 |
| $Tb_{27}Co_{73}$ | 2000 | 260 | 1500 | >300 | 490 | 5.1 |

```
LAYER-1
[1] Tstor : Hc1 > Hw1(2)
[2] Tread : Hc1 > Hw1(2)
[3] TL    : Hc1 < Hw1(2) - Hb
LAYER-2
[4] Tin1  : Hc2 < Hw2(3) - Hw2(1)
[5] TL <  : Hc2 > Hw2(1) - Hw2(3) - Hb (>0)
            Hc2 > Hw2(3) - Hw2(1) + Hb (<0)
[6] Tc1 < : Hc2 < -Hb (>0)
LAYER-3
[7] Tin1  : Hc3 < Hw3(4) - Hw3(2)
LAYER-4
[8] Tstor : Hc4 > -Hw4(3)
[9] Tall  : Hc4 > Hw4(3)
```

|  |  | t | Ms | Hc | Tc | Hw1 | Sw |
|---|---|---|---|---|---|---|---|
| TM | $Tb_{21}Fe_{79}$ | 400 | 70 | 7000 | 135 | 3600 | |
| TM | $Gd_5Dy_{15}Fe_{72}Co_8$ | 450 | 80 | 2000 | 220 | 2200 | 2 |
| RE | $Tb_{20}Dy_4Fe_{76}$ | 150 | 90 | 2000 | 115 | 6700 | 3.6 |
| re | $Tb_{27}Co_{73}$ | 2000 | 260 | 1500 | >300 | 520 | 5.4 |

```
LAYER-1
 [1] Tstor  : Hc1 > Hw1(2)
 [2] Tread  : Hc1 > Hw1(2)
 [3] TL     : Hc1 < Hw1(2) - Hb
LAYER-2
 [4] Tin1   : Hc2 < Hw2(3) - Hw2(1)
 [5] TL ∨   : Hc2 > Hw2(1) - Hw2(3) + Hb
            : Hc2 > Hw2(3) - Hw2(1) - Hb
 [6] Tc1 ∨  : Hc2 < Hb
LAYER-3
 [7] Tin1   : Hc3 < Hw3(4) - Hw3(2)
LAYER-4
 [8] Tstor  : Hc4 > Hw4(3)
 [9] Tall   : Hc4 > Hw4(3) + Hb
```

|  | | t | Ms | Hc | Tc | Hw1 | Sw |
|---|---|---|---|---|---|---|---|
| RE | $Gd_{12}Dy_{12}Fe_{76}$ | 400 | 100 | 5000 | 145 | 2500 | |
| TM | $Gd_5Dy_{15}Fe_{72}Co_8$ | 450 | 80 | 2000 | 220 | 2100 | 2 |
| RE | $Tb_{20}Dy_4Fe_{76}$ | 150 | 90 | 2000 | 115 | 7000 | 3.5 |
| re | $Tb_{27}Co_{73}$ | 2000 | 260 | 1500 | >300 | 520 | 5.4 |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tin1  : Hc2 < Hw2(3) - Hw2(1)
[5] TL <  : Hc2 > Hw2(1) - Hw2(3) + Hb
           Hc2 > Hw2(3) - Hw2(1) - Hb
[6] Tc1 < : Hc2 < Hb
LAYER-3
[7] Tin1  : Hc3 < Hw3(4) - Hw3(2)
LAYER-4
[8] Tstor : Hc4 > Hw4(3)
[9] Tall  : Hc4 > Hw4(3) + Hb

|  |  | t | Ms | Hc | Tc | Hw1 | Sw |
|---|---|---|---|---|---|---|---|
| re | $Tb_{27}Fe_{73}$ | 400 | 90 | 4500 | 135 | 2500 |  |
| TM | $Gd_5Dy_{15}Fe_{72}Co_8$ | 450 | 80 | 2000 | 220 | 2400 | 1.8 |
| RE | $Tb_{20}Dy_4Fe_{76}$ | 150 | 90 | 2000 | 115 | 7000 | 3.5 |
| re | $Tb_{27}Co_{73}$ | 2000 | 260 | 1500 | >300 | 520 | 5.4 |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tin1  : Hc2 < Hw2(3) − Hw2(1)
[5] TL <  : Hc2 > Hw2(1) − Hw2(3) + Hb
         : Hc2 > Hw2(3) − Hw2(1) − Hb
[6] Tc1 < : Hc2 < Hb
LAYER-3
[7] Tin1  : Hc3 < Hw3(4) − Hw3(2)
LAYER-4
[8] Tstor : Hc4 > Hw4(3)
[9] Tall  : Hc4 > Hw4(3) + Hb

|  | a1 | a2 |
|---|---|---|
| TM | → | ← |
| RE | ← | ← |
| RE | ← | ← |
| re | → | → |

Hb

|  | t | Ms | Hc | Tc | Hw1 | Sw |
|---|---|---|---|---|---|---|
| $Tb_{21}Fe_{79}$ | 400 | 70 | 7000 | 135 | 3600 |  |
| $Gd_5Dy_{22}Fe_{65}Co_8$ | 450 | 90 | 2000 | 230 | 1700 | 2 |
| $Tb_{20}Dy_4Fe_{76}$ | 150 | 90 | 2000 | 115 | 6700 | 3.4 |
| $Tb_{27}Co_{73}$ | 2000 | 260 | 1500 | >300 | 500 | 5.2 |

```
LAYER-1
 [1] Tstor : Hc1 > Hw1(2)
 [2] Tread : Hc1 > Hw1(2)
 [3] TL    : Hc1 < Hw1(2) - Hb
LAYER-2
 [4] Tin1  : Hc2 < Hw2(3) - Hw2(1) + Hb
 [5] TL  < : Hc2 > Hw2(3) - Hw2(1) + Hb
            Hc2 > Hw2(1) - Hw2(3) - Hb
 [6] Tc1 < : Hc2 < Hb
LAYER-3
 [7] Tin1  : Hc3 < Hw3(4) - Hw3(2) + Hb
LAYER-4
 [8] Tstor : Hc4 > Hw4(3)
 [9] Tall  : Hc4 > Hw4(3) + Hb
```

| | t | Ms | Hc | Tc | Hw1 | Sw |
|---|---|---|---|---|---|---|
| $Gd_{12}Dy_{12}Fe_{76}$ | 400 | 100 | 5000 | 145 | 2500 | |
| $Gd_5Dy_{22}Fe_{65}Co_8$ | 450 | 90 | 2000 | 230 | 1700 | 2 |
| $Tb_{20}Dy_4Fe_{76}$ | 150 | 90 | 2000 | 115 | 6700 | 3.4 |
| $Tb_{27}Co_{73}$ | 2000 | 260 | 1500 | >300 | 500 | 5.2 |

LAYER-1
[1] Tstor : Hc1 > Hw1(2)
[2] Tread : Hc1 > Hw1(2)
[3] TL   : Hc1 < Hw1(2)
LAYER-2
[4] Tin1  : Hc2 < Hw2(3) − Hw2(1) + Hb
[5] TL <  : Hc2 > Hw2(3) − Hw2(1) + Hb
           Hc2 > Hw2(1) − Hw2(3) − Hb
[6] Tc1 < : Hc2 < Hb
LAYER-3
[7] Tin1  : Hc3 < Hw3(4) − Hw3(2) + Hb
LAYER-4
[8] Tstor : Hc4 > Hw4(3)
[9] Tall  : Hc4 > Hw4(3) + Hb

| | a1 | a2 | |
|---|---|---|---|
| RE | ← | → | |
| RE | ← | ← | (with barrier) |
| RE | ← | ← | |
| re | ← | ← | |

| | | t | Ms | Hc | Tc | Hw1 | Sw |
|---|---|---|---|---|---|---|---|
| re | $Tb_{27}Fe_{73}$ | 400 | 90 | 4500 | 135 | 2500 | |
| RE | $Gd_5Dy_{22}Fe_{65}Co_8$ | 450 | 90 | 2000 | 230 | 1900 | 1.8 |
| RE | $Tb_{20}Dy_4Fe_{76}$ | 150 | 90 | 2000 | 115 | 7000 | 3.3 |
| re | $Tb_{27}Co_{73}$ | 2000 | 260 | 1500 | >300 | 500 | 5.2 |

LAYER-1
[1] Tstor : Hc1 > Hw1(2)
[2] Tread : Hc1 > Hw1(2) + Hb
[3] TL   : Hc1 < Hw1(2) + Hb
LAYER-2
[4] Tin1  : Hc2 < Hw2(3) − Hw2(1) + Hb
[5] TL <  : Hc2 > Hw2(3) − Hw2(1) + Hb
         : Hc2 > Hw2(1) − Hw2(3) − Hb
[6] Tc1 < : Hc2 < Hb
LAYER-3
[7] Tin1  : Hc3 < Hw3(4) − Hw3(2) + Hb
LAYER-4
[8] Tstor : Hc4 > Hw4(3)
[9] Tall  : Hc4 > Hw4(3) + Hb

| | t | Ms | Hc | Tc | Hw1 | Sw |
|---|---|---|---|---|---|---|
| TM  $Tb_{21}Fe_{79}$ | 400 | 70 | 7000 | 135 | 3600 | |
| re  $Gd_5Dy_{25}Fe_{62}Co_8$ | 450 | 80 | 1700 | 220 | 1800 | 2 |
| RE  $Tb_{20}Dy_4Fe_{76}$ | 150 | 90 | 2000 | 115 | 6300 | 3.3 |
| re  $Tb_{27}Co_{73}$ | 2000 | 260 | 1500 | >300 | 480 | 5 |

LAYER-1
[1] Tstor : Hc1 > Hw1(2)
[2] Tread : Hc1 > Hw1(2) − Hb (>0)
[3] TL    : Hc1 < Hw1(2) + Hb
LAYER-2
[4] Tin1  : Hc2 < Hw2(3) − Hw2(1)
[5] TL <  : Hc2 > Hw2(1) − Hw2(3) − Hb (>0)
          : Hc2 > Hw2(3) − Hw2(1) + Hb (<0)
[6] Tc1 < : Hc2 < −Hb (>0)
LAYER-3
[7] Tin1  : Hc3 < Hw3(4) − Hw3(2)
LAYER-4
[8] Tstor : Hc4 > Hw4(3)
[9] Tall  : Hc4 > Hw4(3)

| | | t | Ms | Hc | Tc | Hw1 | Sw |
|---|---|---|---|---|---|---|---|
| RE | $Gd_{12}Dy_{12}Fe_{76}$ | 400 | 100 | 5000 | 145 | 2500 | |
| re | $Gd_5Dy_{25}Fe_{62}Co_8$ | 450 | 80 | 1700 | 220 | 1800 | 2 |
| RE | $Tb_{20}Dy_4Fe_{76}$ | 150 | 90 | 2000 | 115 | 6300 | 3.3 |
| re | $Tb_{27}Co_{73}$ | 2000 | 260 | 1500 | >300 | 480 | 5 |

LAYER-1
[1] Tstor : Hc1 > Hw1(2)
[2] Tread : Hc1 > Hw1(2)
[3] TL    : Hc1 < Hw1(2) − Hb
LAYER-2
[4] Tin1  : Hc2 < Hw2(3) − Hw2(1)
[5] TL    : Hc2 > Hw2(1) − Hw2(3) − Hb (>0)
             Hc2 > Hw2(3) − Hw2(1) + Hb (<0)
[6] Tc1 < : Hc2 < −Hb (>0)
LAYER-3
[7] Tin1  : Hc3 < Hw3(4) − Hw3(2)
LAYER-4
[8] Tstor : Hc4 > Hw4(3)
[9] Tall  : Hc4 > Hw4(3)

FIG. 82
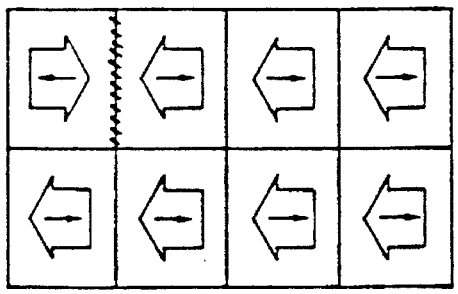
|  |  | t | Ms | Hc | Tc | Hw1 | Sw |
|---|---|---|---|---|---|---|---|
| re | $Tb_{27}Fe_{73}$ | 400 | 90 | 4500 | 135 | 2500 |  |
| re | $Gd_5Dy_{25}Fe_{62}Co_8$ | 450 | 80 | 1700 | 220 | 2100 | 1.8 |
| RE | $Tb_{20}Dy_4Fe_{76}$ | 150 | 90 | 2000 | 115 | 6300 | 3.3 |
| re | $Tb_{27}Co_{73}$ | 2000 | 260 | 1500 | >300 | 480 | 5 |
LAYER-1
[1] Tstor : Hc1 > Hw1(2)
[2] Tread : Hc1 > Hw1(2)
[3] TL    : Hc1 < Hw1(2) − Hb
LAYER-2
[4] Tin1  : Hc2 < Hw2(3) − Hw2(1)
[5] TL  <  : Hc2 > Hw2(1) − Hw2(3) − Hb (>0)
[6] Tc1 <  : Hc2 > Hw2(3) − Hw2(1) + Hb (<0)
              Hc2 < −Hb (>0)
LAYER-3
[7] Tin1  : Hc3 < Hw3(4) − Hw3(2)
LAYER-4
[8] Tstor : Hc4 > Hw4(3)
[9] Tall  : Hc4 > Hw4(3)

|  |  | t | Ms | Hc | Tc | Hw1 | Sw |
|--|--|--|--|--|--|--|--|
| | $Tb_{21}Fe_{79}$ | 400 | 70 | 7000 | 135 | 3600 | |
| | $Gd_5Dy_{15}Fe_{72}Co_8$ | 450 | 80 | 2000 | 220 | 2200 | 2 |
| | $Tb_{23}Dy_4Fe_{73}$ | 150 | 170 | 700 | 115 | 2900 | 3.6 |
| | $Tb_{27}Co_{73}$ | 2000 | 260 | 1500 | >300 | 490 | 5.1 |

LAYER-1
[1] Tstor : Hc1 > Hw1(2)
[2] Tread : Hc1 > Hw1(2)
[3] TL    : Hc1 < Hw1(2) − Hb
LAYER-2
[4] Tin1  : Hc2 < Hw2(3) − Hw2(1)
[5] TL <  : Hc2 > Hw2(1) − Hw2(3) + Hb
          : Hc2 > Hw2(3) − Hw2(1) − Hb
[6] Tc1 < : Hc2 < Hb
[7] Tin1  : Hc3 < Hw3(4) − Hw3(2)
LAYER-4
[8] Tstor : Hc4 > Hw4(3)
[9] Tall  : Hc4 > Hw4(3) + Hb

|  |  | t | Ms | Hc | Tc | Hw1 | Sw |
|---|---|---|---|---|---|---|---|
|  | $Gd_{12}Dy_{12}Fe_{76}$ | 400 | 100 | 5000 | 145 | 2500 |  |
|  | $Gd_5Dy_{15}Fe_{72}Co_8$ | 450 | 80 | 2000 | 220 | 2100 | 2 |
|  | $Tb_{23}Dy_4Fe_{73}$ | 150 | 170 | 700 | 115 | 3100 | 3.5 |
|  | $Tb_{27}Co_{73}$ | 2000 | 260 | 1500 | >300 | 490 | 5.1 |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tin1  : Hc2 < Hw2(3) − Hw2(1)
[5] TL  ∨ : Hc2 > Hw2(1) − Hw2(3) + Hb
          Hc2 > Hw2(3) − Hw2(1) − Hb
[6] Tc1 < : Hc2 ∨ Hb
LAYER-3
[7] Tin1  : Hc3 < Hw3(4) − Hw3(2)
LAYER-4
[8] Tstor : Hc4 > Hw4(3)
[9] Tall  : Hc4 > Hw4(3) + Hb

| | | t | Ms | Hc | Tc | Hw1 | Sw |
|---|---|---|---|---|---|---|---|
| $Tb_{27}Fe_{73}$ | re | 400 | 90 | 4500 | 135 | 2500 | |
| $Gd_5Dy_{15}Fe_{72}Co_8$ | TM | 450 | 80 | 2000 | 220 | 2400 | 1.8 |
| $Tb_{23}Dy_4Fe_{73}$ | re | 150 | 170 | 700 | 115 | 3100 | 3.5 |
| $Tb_{27}Co_{73}$ | re | 2000 | 260 | 1500 | >300 | 490 | 5.1 |

LAYER-1
[1] Tstor : Hc1 > Hw1(2)
[2] Tread : Hc1 > Hw1(2) + Hb
[3] TL   : Hc1 < Hw1(2) + Hb
LAYER-2
[4] Tin1 : Hc2 < Hw2(3) − Hw2(1)
[5] TL   < Hc2 > Hw2(1) − Hw2(3) + Hb
         Hc2 > Hw2(3) − Hw2(1) − Hb
[6] Tc1 < : Hc2 < Hb
LAYER-3
[7] Tin1 : Hc3 < Hw3(4) − Hw3(2)
LAYER-4
[8] Tstor : Hc4 > Hw4(3)
[9] Tall : Hc4 > Hw4(3) + Hb

| | t | Ms | Hc | Tc | Hw1 | Sw |
|---|---|---|---|---|---|---|
| $Tb_{21}Fe_{79}$ | 400 | 70 | 7000 | 135 | 3600 | |
| $Gd_5Dy_{22}Fe_{65}Co_8$ | 450 | 90 | 2000 | 230 | 1700 | 2 |
| $Tb_{23}Dy_4Fe_{73}$ | 150 | 170 | 700 | 115 | 3100 | 3.4 |
| $Tb_{27}Co_{73}$ | 2000 | 260 | 1500 | >300 | 480 | 5 |

LAYER-1
[1] Tstor : Hc1 > Hw1(2)
[2] Tread : Hc1 > Hw1(2)
[3] TL : Hc1 < Hw1(2) − Hb LAYER-2
[4] Tini : Hc2 < Hw2(3) − Hw2(1) + Hb
[5] TL < : Hc2 > Hw2(3) − Hw2(1) + Hb
       Hc2 > Hw2(1) − Hw2(3) − Hb
[6] Tc1 < : Hc2 < Hb LAYER-3
[7] Tini : Hc3 < Hw3(4) − Hw3(2) + Hb LAYER-4
[8] Tstor : Hc4 > Hw4(3)
[9] Tall : Hc4 > Hw4(3) + Hb

| | | t | Ms | Hc | Tc | Hw1 | Sw |
|---|---|---|---|---|---|---|---|
| RE | $Gd_{12}Dy_{12}Fe_{76}$ | 400 | 100 | 5000 | 145 | 2500 | |
| RE | $Gd_5Dy_{22}Fe_{65}Co_8$ | 450 | 90 | 2000 | 230 | 1700 | 2 |
| re | $Tb_{23}Dy_4Fe_{73}$ | 150 | 170 | 700 | 115 | 3100 | 3.4 |
| re | $Tb_{27}Co_{73}$ | 2000 | 260 | 1500 | >300 | 480 | 5 |

LAYER-1
[1] Tstor : Hc1 > Hw1(2)
[2] Tread : Hc1 > Hw1(2) + Hb
[3] TL    : Hc1 < Hw1(2) + Hb
LAYER-2
[4] Tin1  : Hc2 < Hw2(3) − Hw2(1) + Hb
[5] TL <  : Hc2 > Hw2(3) − Hw2(1) + Hb
           Hc2 > Hw2(1) − Hw2(3) − Hb
[6] Tc1 < : Hc2 < Hb
LAYER-3
[7] Tin1  : Hc3 < Hw3(4) − Hw3(2) + Hb
LAYER-4
[8] Tstor : Hc4 > Hw4(3)
[9] Tall  : Hc4 > Hw4(3) + Hb

| | | t | Ms | Hc | Tc | Hw1 | Sw |
|---|---|---|---|---|---|---|---|
| re | $Tb_{27}Fe_{73}$ | 400 | 90 | 4500 | 135 | 2500 | |
| RE | $Gd_5Dy_{22}Fe_{65}Co_8$ | 450 | 90 | 2000 | 230 | 1900 | 1.8 |
| re | $Tb_{23}Dy_4Fe_{73}$ | 150 | 170 | 700 | 115 | 3300 | 3.3 |
| re | $Tb_{27}Co_{73}$ | 2000 | 260 | 1500 | >300 | 480 | 5 |

```
LAYER-1
  [1] Tstor : Hc1 > Hw1(2)
  [2] Tread : Hc1 > Hw1(2) + Hb
  [3] TL    : Hc1 < Hw1(2) + Hb
LAYER-2
  [4] Tin1  : Hc2 < Hw2(3) - Hw2(1) + Hb
  [5] TL <  : Hc2 > Hw2(3) - Hw2(1) + Hb
            : Hc2 > Hw2(1) - Hw2(3) - Hb
  [6] Tc1 < : Hc2 < Hb
LAYER-3
  [7] Tin1  : Hc3 < Hw3(4) - Hw3(2) + Hb
LAYER-4
  [8] Tstor : Hc4 > Hw4(3)
  [9] Tall  : Hc4 > Hw4(3) + Hb
```

Hb

|    |                        | t    | Ms  | Hc   | Tc   | Hw1  | Sw  |
|----|------------------------|------|-----|------|------|------|-----|
| TM | $Tb_{21}Fe_{79}$       | 400  | 70  | 7000 | 135  | 3600 |     |
| re | $Gd_5Dy_{25}Fe_{62}Co_8$ | 450  | 80  | 1700 | 220  | 1800 | 2   |
| re | $Tb_{23}Dy_4Fe_{73}$   | 150  | 170 | 700  | 115  | 3300 | 3.3 |
| re | $Tb_{27}Co_{73}$       | 2000 | 260 | 1500 | >300 | 480  | 5   |

LAYER-1
[1] Tstor : Hc1 > Hw1(2)
[2] Tread : Hc1 > Hw1(2) − Hb (>0)
[3] TL    : Hc1 < Hw1(2) + Hb
LAYER-2
[4] Tin1  : Hc2 < Hw2(3) − Hw2(1)
[5] TL <  : Hc2 > Hw2(1) − Hw2(3) − Hb (>0)
          Hc2 > Hw2(3) − Hw2(1) + Hb (<0)
[6] Tc1 < : Hc2 < −Hb (>0)
LAYER-3
[7] Tin1  : Hc3 < Hw3(4) − Hw3(2)
LAYER-4
[8] Tstor : Hc4 > Hw4(3)
[9] Tall  : Hc4 > Hw4(3)

FIG. 90
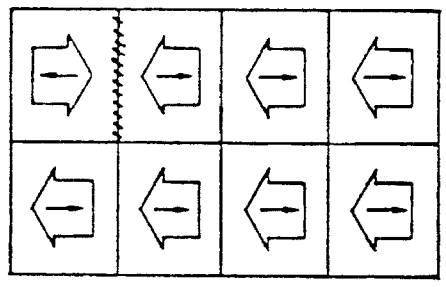
| | | t | Ms | Hc | Tc | Hw1 | Sw |
|---|---|---|---|---|---|---|---|
| | $Gd_{12}Dy_{12}Fe_{76}$ | 400 | 100 | 5000 | 145 | 2500 | 2 |
| | $Gd_5Dy_{25}Fe_{62}Co_8$ | 450 | 80 | 1700 | 220 | 1800 | 3.3 |
| | $Tb_{23}Dy_4Fe_{73}$ | 150 | 170 | 700 | 115 | 3300 | 5 |
| | $Tb_{27}Co_{73}$ | 2000 | 260 | 1500 | >300 | 480 | |
LAYER-1
[1] Tstor : Hc1 > Hw1(2)
[2] Tread : Hc1 > Hw1(2)
[3] TL      : Hc1 < Hw1(2) − Hb
LAYER-2
[4] Tin1 : Hc2 < Hw2(3) − Hw2(1)
[5] TL    : Hc2 > Hw2(1) − Hw2(3) − Hb (>0)
          Hc2 > Hw2(3) − Hw2(1) + Hb (<0)
[6] Tc1 < : Hc2 < −Hb (>0)
LAYER-3
[7] Tin1 : Hc3 < Hw3(4) − Hw3(2)
LAYER-4
[8] Tstor : Hc4 > Hw4(3)
[9] Tall  : Hc4 > Hw4(3)

| | t | Ms | Hc | Tc | Hw1 | Sw |
|---|---|---|---|---|---|---|
| $Tb_{27}Fe_{73}$ | 400 | 90 | 4500 | 135 | 2500 | |
| $Gd_5Dy_{25}Fe_{62}Co_8$ | 450 | 80 | 1700 | 220 | 2100 | 1.8 |
| $Tb_{23}Dy_4Fe_{73}$ | 150 | 170 | 700 | 115 | 3300 | 3.3 |
| $Tb_{27}Co_{73}$ | 2000 | 260 | 1500 | >300 | 480 | 5 |

```
LAYER-1
[1] Tstor : Hc1 > Hw1(2)
[2] Tread : Hc1 > Hw1(2) - Hb
[3] TL    : Hc1 < Hw1(2) - Hb
LAYER-2
[4] Tin1  : Hc2 < Hw2(3) - Hw2(1)
[5] TL <  : Hc2 > Hw2(1) - Hw2(3) - Hb (>0)
            Hc2 > Hw2(3) - Hw2(1) + Hb (<0)
[6] Tc1 < : Hc2 < -Hb (>0)
LAYER-3
[7] Tin1  : Hc3 < Hw3(4) - Hw3(2)
LAYER-4
[8] Tstor : Hc4 > Hw4(3)
[9] Tall  : Hc4 > Hw4(3)
```

FIG. 93
(1) Tc2 < Thigh
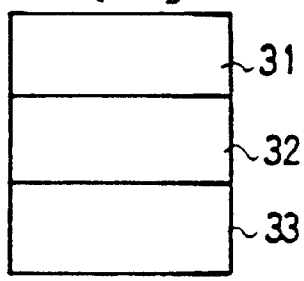
(2)
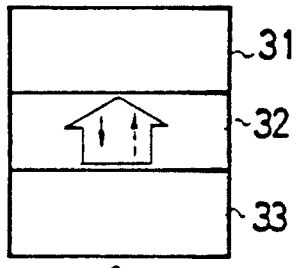
(3)
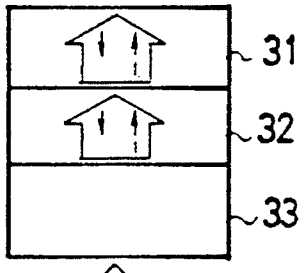
(4)
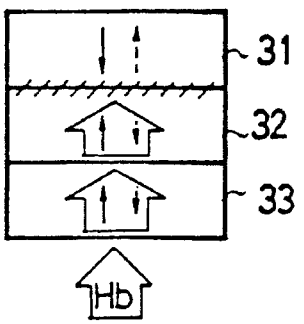
(5)
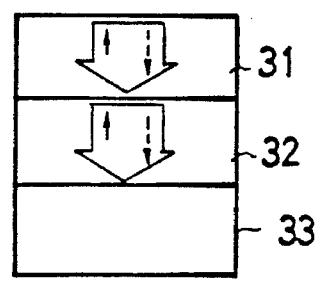
(6)
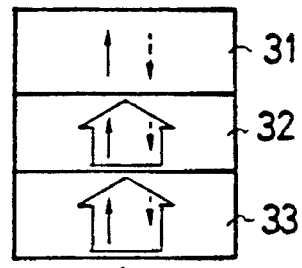

FIG. 99(a)
PRIOR ART
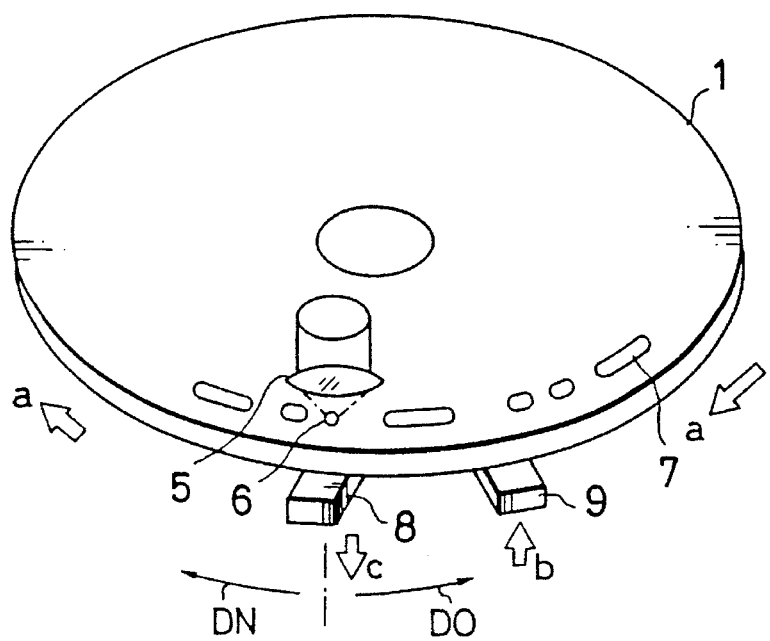
FIG. 99(b)
PRIOR ART
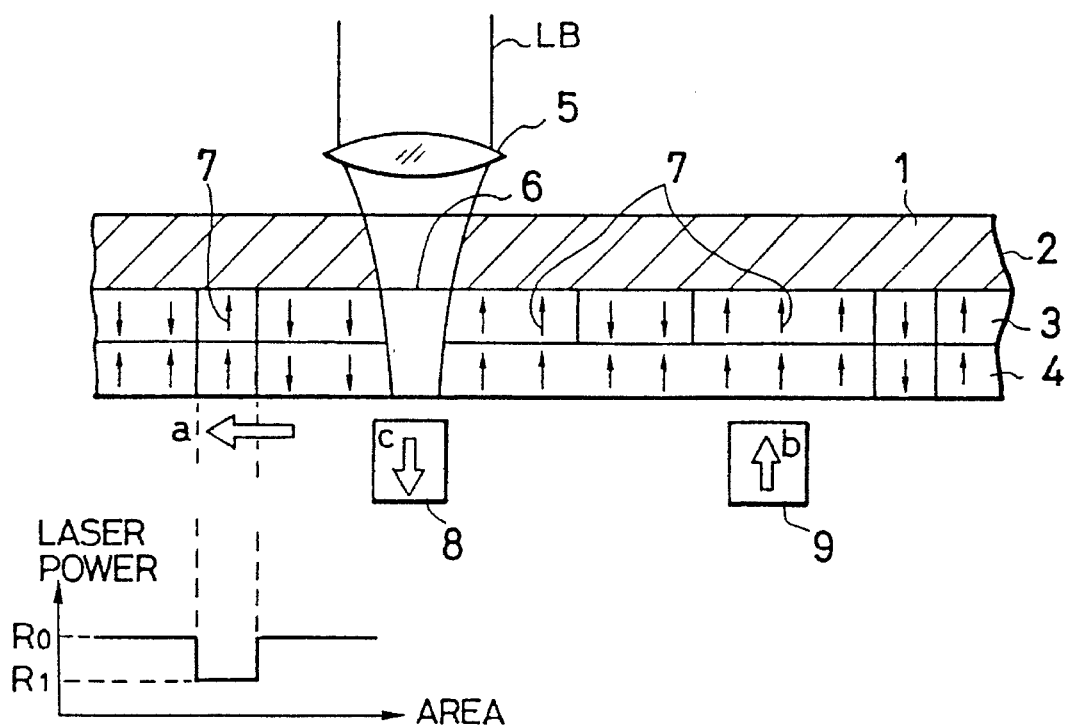
FIG. 99(c)
PRIOR ART

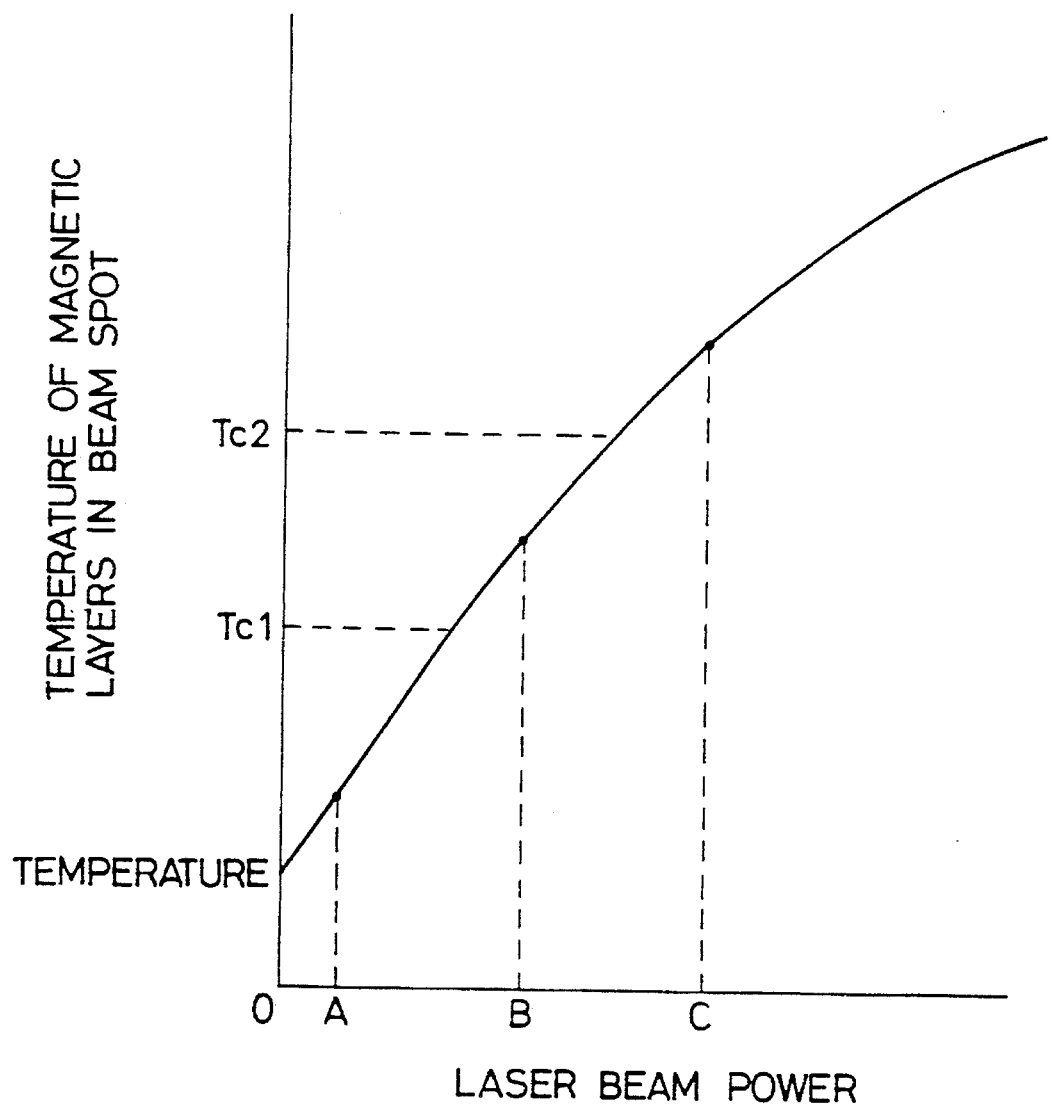

FIG. 108
TM-RICH 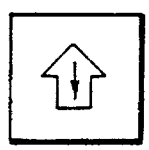 RE-RICH 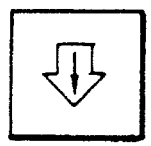 4TH MAG. LAYER
 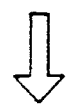
FIG. 109
    0      1
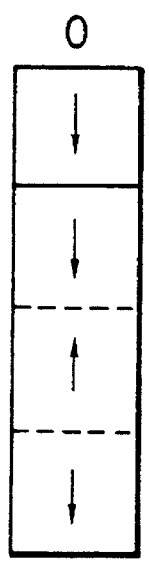 OR 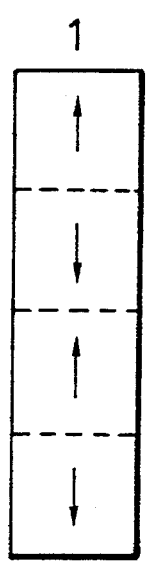
1ST MAG. LAYER
2ND MAG. LAYER
3RD MAG. LAYER
4TH MAG. LAYER

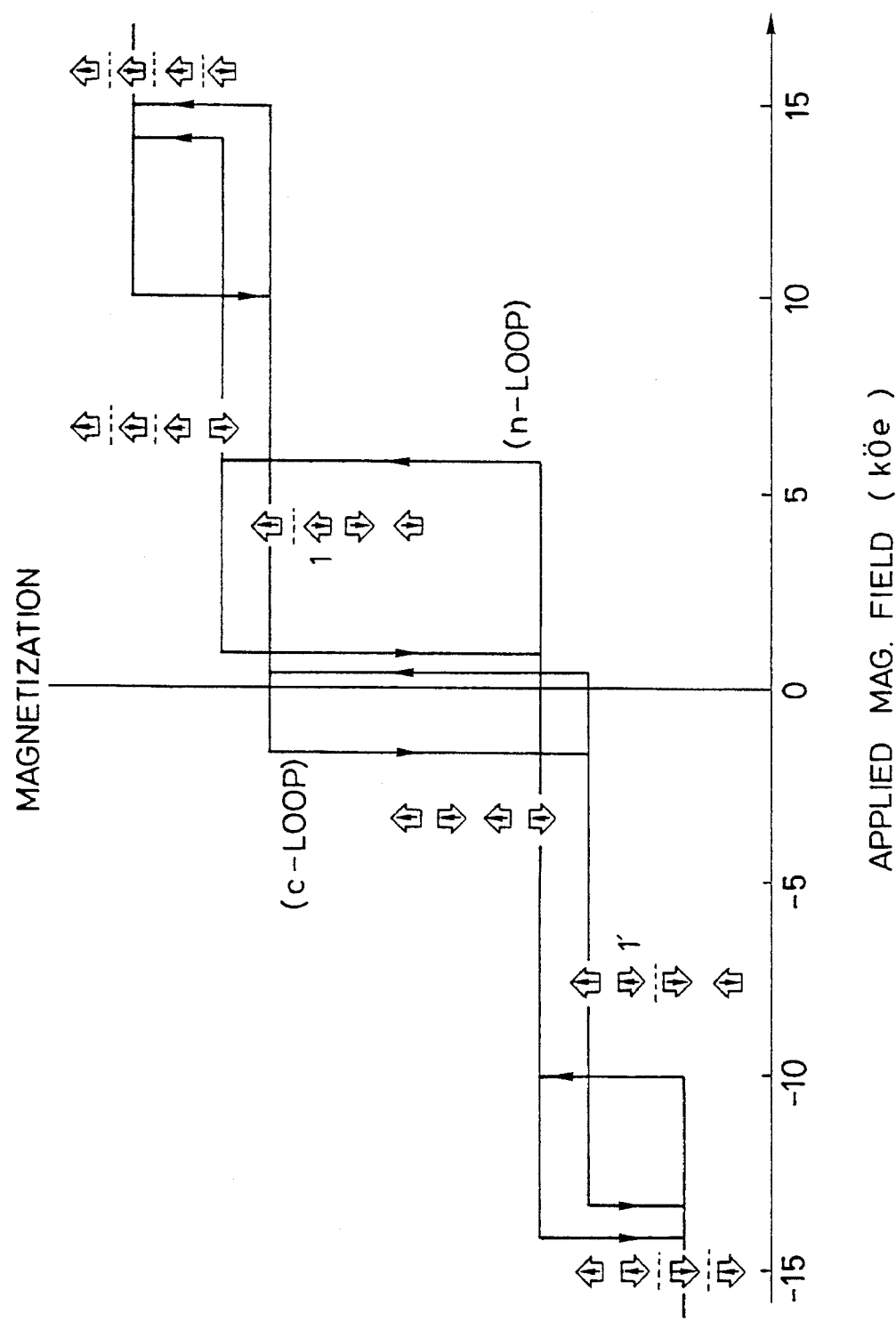

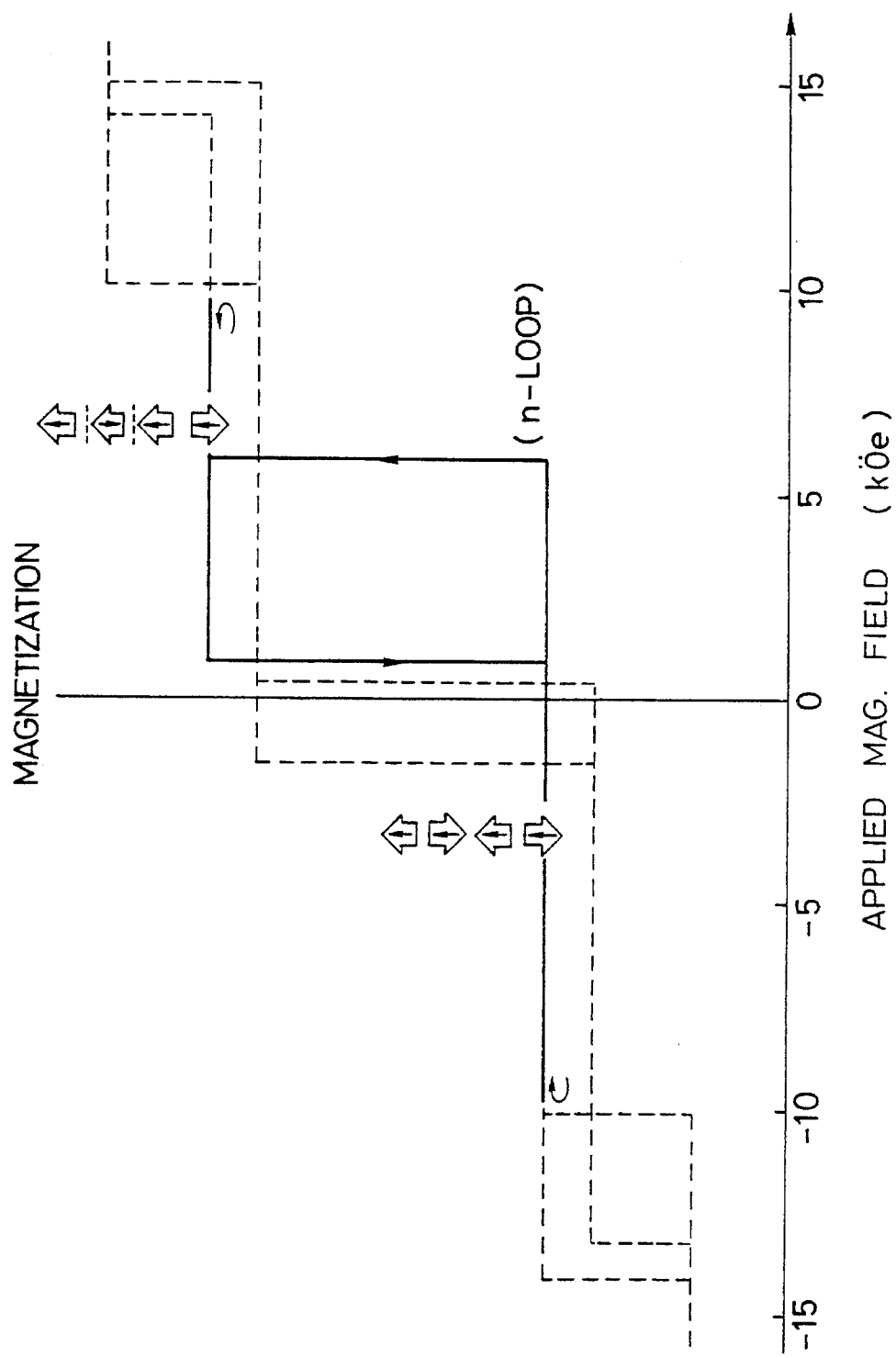

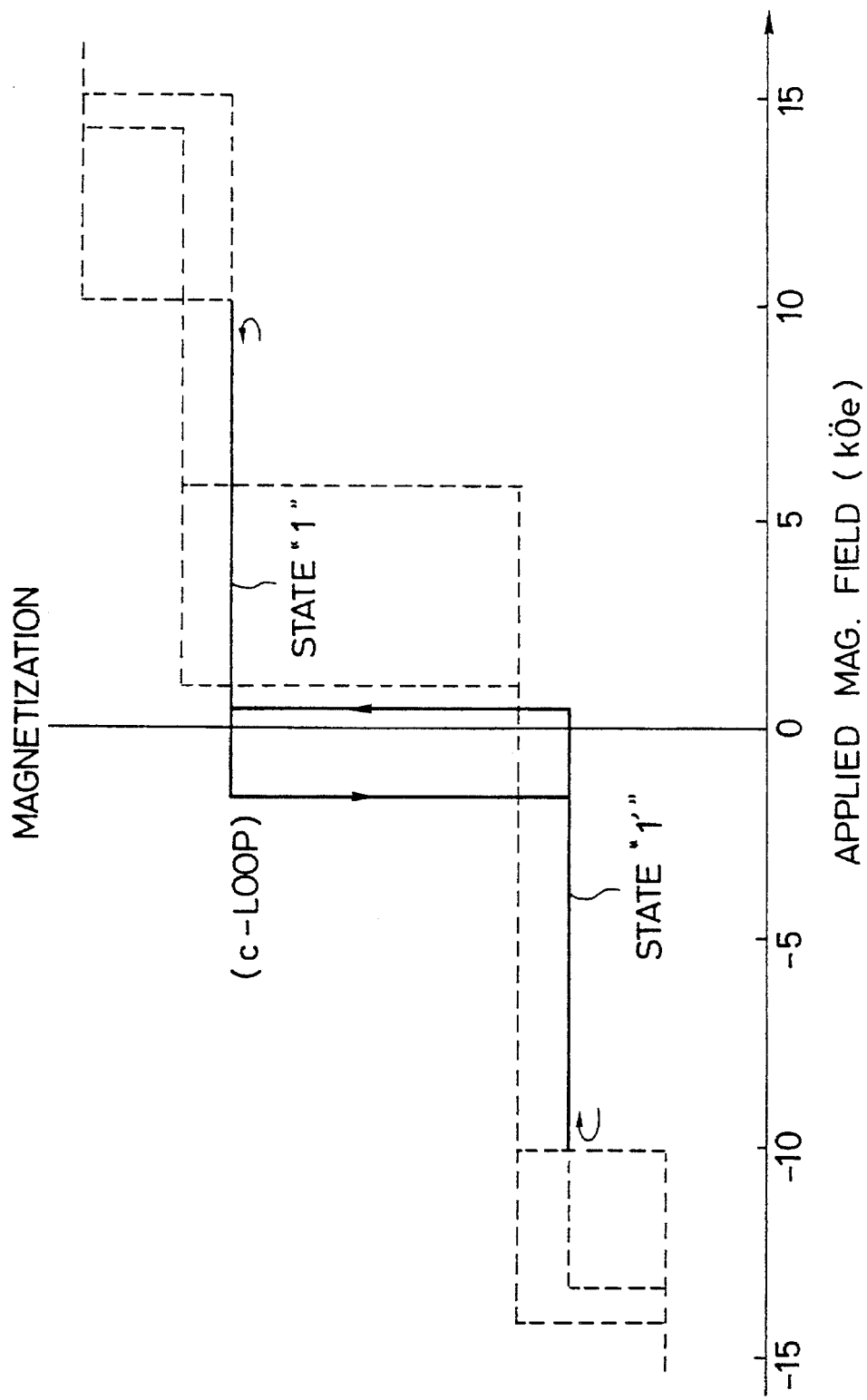

F I G. 116
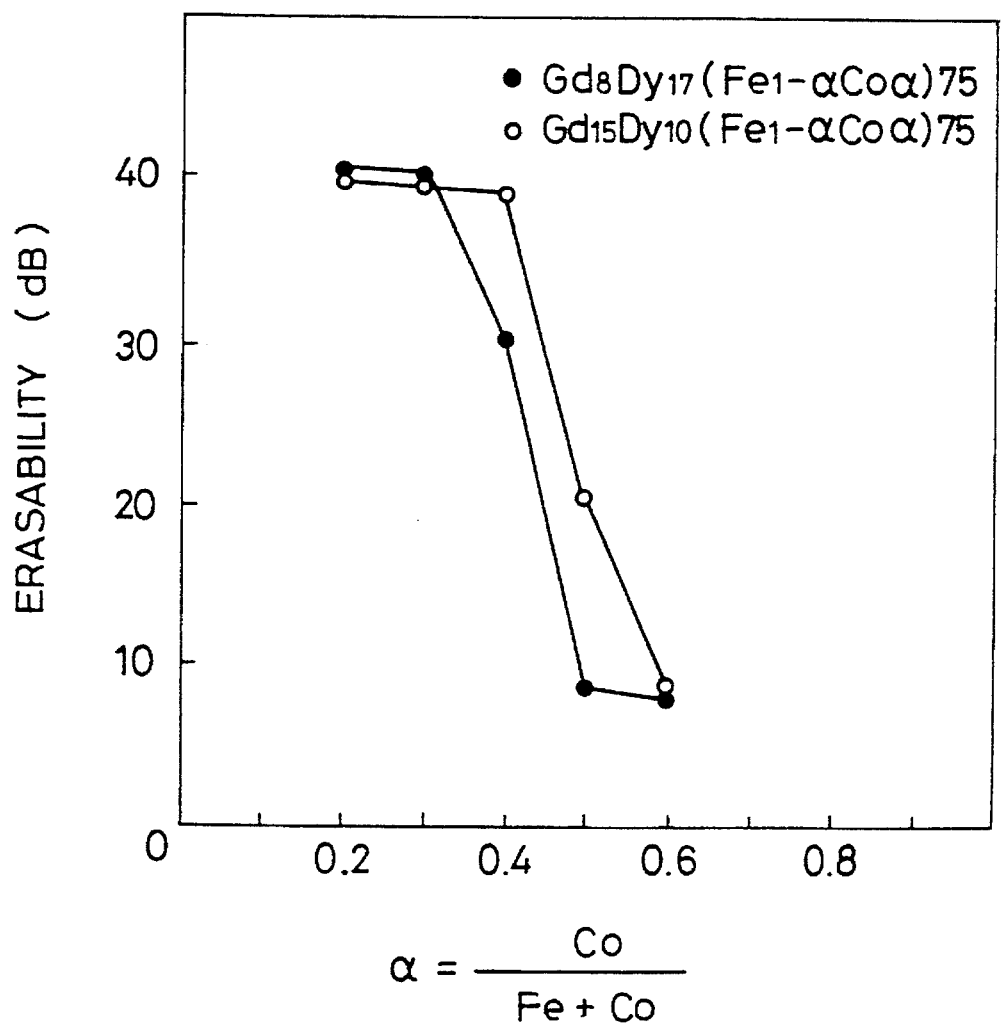

EXAMPLE OF KERR LOOP OF 1ST MAG. LAYER 5,512,366

MAGNETO-OPTIC RECORDING MEDIUM AND APPARATUS

CROSS REFERENCE TO RELATED APPLICATION

This application is a continuation-in-part of application Ser. No. 07/474,104, now U.S. Pat. No. 5,216,663 filed Apr. 20, 1990 (filed as PCT International Application No. PCT/JP89/00863, filed Aug. 23, 1989).

BACKGROUND OF THE INVENTION

This invention relates to a magneto-optic recording medium that is directly overwritable by optical modulation, enabling new information to be written directly over old information, and to a manufacturing method for this magneto-optic recording medium, and apparatus for recording on and reproducing from such magneto-optic recording medium.

First Prior Art Example

In FIG. 99, (a) is an oblique view of the main parts of a prior-art magneto-optic read-write device as shown, for example, in *Preprints of the 34th Joint Congress of Applied Physics*, Spring 1987, 28 P-Z L-3; (b) is a sectional view illustrating optical reading and writing of the recording medium; and (c) is a plot of the laser power variations for writing information in areas on the recording medium. In these drawings, 1 is a magneto-optic recording medium comprising a glass or plastic substrate 2, a first magnetic layer 3, and a second magnetic layer 4. An exchange coupling force acts between the first and second magnetic layers 3 and 4, tending to align their magnetization in the same direction. A laser beam LB is focused by an objective lens 5 onto a spot 6 on tile information medium 1. The numeral 7 indicates areas In which the direction of magnetization in the first magnetic layer 3 is upward in FIG. 99 (b), this indicating the recording of binary "1" data. An initializing magnet 9 generates a magnetic field of substantially 5000 oersteds to initialize the second magnetic layer 4. A bias magnet 8 disposed facing the objective lens 5 with the information medium 1 in between generates a magnetic field of substantially 200 to 600 oersteds. In FIG. 99 (c) laser power is shown on the vertical axis and areas are indicated on the horizontal axis. The laser power is modulated to record the information "1" in the region R1 and the information "0" in the region R0. The dash-dot line in FIG. 99 (a) separates new data (DN) on the left from old data (DO) on the right.

The operation will be explained next. The recording medium 1 is rotated in the direction of the arrows in FIG. 99 (a) and (b) by a support and driving mechanism not shown in the drawing. The first magnetic layer 3 has the same properties as the recording layer in the media used in general magneto-optic disks comprising, for example, $Tb_{21}Fe_{79}$, and here too it functions as a reading and writing layer. The second magnetic layer 4, called the auxiliary layer, comprises $Gd_{24}Tb_3Fe_{73}$, for example, and provides the overwrite function, enabling new information to be written over old information in real time. The Curie temperatures Tc1 and Tc2 of the first and second magnetic layers 3 and 4, their room-temperature coercivities Hc1 and Hc2, and their room-temperature exchange coupling strengths Hw1 and Hw2 satisfy the following relations:

$$Tc1 < Tc2$$

$$Hc1 - Hw1 > Hc2 + Hw2$$

First the reading of information recorded in the first magnetic layer 3 (the recording layer) will be explained. As shown in FIG. 99 (b), the first magnetic layer 3 is magnetized in the up direction to represent a "1" and in the down direction to represent a "0." When this information is read, the first magnetic layer 3 is illuminated by the beam spot 6, and the magnetic orientation of the first magnetic layer 3 in the beam spot 6 is transformed by the well-known optical Kerr effect to optical Information, in which form it is detected. FIG. 100 indicates the temperature changes in the magnetic layers in the spot caused by the laser beam power, with A corresponding to the intensity of the laser beam that illuminates the recording medium 1 during reading. At this intensity the maximum temperature increase in the first and second magnetic layers 3 and 4 in the beam spot 6 does not attain the Curie temperatures Tc1 and Tc2 of these layers, so the illumination in the beam spot does not erase the direction of magnetization; that is, it does not erase the recorded information.

Next the overwriting operation will be explained. The initializing magnet 9 in FIG. 99 generates a magnetic field of intensity Hini in the direction of the arrow b (up) in the drawing. The field Hini is related to the coercivity and exchange coupling strength of the first and second magnetic layers 3 and 4 as follows:

$$Hc1 - Hw1 > Hini > Hc2 + Hw2$$

As a result, when the information medium 1 revolves in the direction of the arrow a in FIG. 99 (b), those parts of the second magnetic layer 4 that pass over the initializing magnet 9 are uniformly magnetized in the up direction, regardless of the magnetic alignment of the first magnetic layer 3. The first magnetic layer 3 itself is not affected at room temperature by the magnetic field of the initializing magnet or by the exchange coupling force exerted by the second magnetic layer 4, so it remains in its previous state.

To write a "1," which means to magnetize the first magnetic layer 3 in the up direction, the laser beam is modulated to the intensity B in FIG. 100. The temperature in the beam spot 6 then rises above the Curie temperature Tc1 of the first magnetic layer 3, but does not reach the Curie temperature Tc2 of the second magnetic layer 4. Consequently, the first magnetic layer 3 loses its magnetization, while the second magnetic layer 4 retains the upward magnetic alignment given by the initializing magnet 9. As the disk turns and the area leaves the illumination of the beam spot 6, when the temperature of the first magnetic layer 3 falls below its Curie temperature Tc1, the magnetic alignment of the second magnetic layer 4 is transferred to the first magnetlc layer 3, so that the first magnetic layer 3 becomes magnetized in the up direction, corresponding to a "1."

To record a "0," which means to magnetize the first magnetic layer 3 in the down direction, the laser beam is modulated to the intensity C in FIG. 100. The temperature in the beam spot 6 then rises above both the Curie temperature Tc1 of the first magnetic layer 3 and the Curie temperature Tc2 of the second magnetic layer 4. Consequently, the first and second magnetic layers 3 and 4 both lose their magnetization. As the disk turns and the area leaves the illumination of the beam spot 6, when the temperature of the second magnetic layer 4 falls below its Curie temperature Tc2, the second magnetic layer 4 is magnetized in the down direction by the weak magnetic field applied in the direction of the arrow c (down) in FIG. 99 by the bias magnet 9. Moreover, when the temperature of the first magnetic layer 3 falls below its Curie temperature Tc1, the magnetic alignment of the second magnetic layer 4 is transferred to the first magnetic layer 3, so that the first magnetic layer 3 becomes magnetized in the down direction, corresponding to a "0."

By the above overwriting operations, new information can be written over old information in real time by modulating the laser beam power between the values B and C in FIG. 100 according to the binary codes "0" and "1" of the new information.

Second Prior Art Example

Another example of prior art magneto-optic recording medium is shown in FIGS. 101 and 102. This magneto-optic recording medium is described in Japanese Patent Application Kokai Publication No. 268103/1988, as Embodiment 1 in this publication. This magnetic recording medium 101 comprises a first magnetic thin film 100, a second magnetic thin film 200, a third magnetic thin film 300, a fourth magnetic thin film 400, a transparent substrate 500, a dielectric film 600, and a protective film 700. Reference numeral 900 denotes an interface magnetic wall. The magnetic thin films 100 to 400 are formed of transition metal (TM)—rare earth metal (RE) alloy magnetic materials. With this medium, recording is made under application of an external magnetic filed Hex, by heating the medium either to a first temperature T1 not lower than Curie temperature Tc1 of the first magnetic thin film 100, or to a second temperature T2 at which the orientation of the sublattice magnetization of the second magnetic thin film 200 can be reversed. The Curie temperatures are related as follows:

$$Tc1<Tc2 \quad (0-1)$$

$$Tc4<Tc2, Tc3 \quad (0-2)$$

$$Tc4 \leq Tc1 \quad (0-3)$$

At room temperature, the state of the magnetization is either in the state A or the state C. When the temperature is increased to T1, the first magnetic thin film 100 loses its magnetization (state E in FIG. 102). When the temperature falls below Tc1, the sublattice magnetization orientation of the first magnetic thin film 100 is aligned with the sublattice magnetization orientation of the second magnetic thin film 200. When the temperature fails to room temperature, the state A is assumed. Thus, a section or bit cell in which "0" has been recorded is formed.

When the temperature is increased to T2, the first and the second magnetic thin films 100 and 200 lose their magnetization. The second magnetic thin film 200 will then be magnetized by the external magnetic field Hex, and hence its sublattice magnetization orientation is reversed (state F in FIG. 102. When the temperature falls to the vicinity of Tc1, the sublattice magnetization orientation of the first magnetic thin film 100 is aligned with the sublattice magnetization orientation of the second magnetic thin film 200. This transfer of the sublattice magnetization orientation is similar to that which takes place when the temperature is increased to Tc1. However, the sublattice magnetization orientation of the second magnetic thin film 200 is opposite and the transfer must take place by the exchange-coupling alone (without the aid of the external magnetic field). The following relation therefore must be satisfied.

$$\sigma w1 > 2 \cdot |Ms1| \cdot h1 \cdot Hex \quad (0-5)$$

where h1 represents the thickness of the first magnetic thin film,

Msi represents the magnetization,

Hci represents the coercivity, and

σ w1 represents the energy density of the interface magnetic wall between the first and the second magnetic thin films.

The external magnetic field Hex cannot therefore made high. It is described in this publication that Hex is not more than about 1 kilo-oersteds. An interface magnetic wall 900 is created at the fourth magnetic thin film 400 because the sublattice magnetization orientations of the second and the third magnetic thin films 200 and 300 are opposite to each other (state G in FIG. 102. When the temperature falls further from this state G to room temperature TR, the state C is assumed provided that the following relationships are satisfied:

$$\sigma w2 - 2 \cdot Ms3 \cdot h3 \cdot Hex$$

$$<2 \cdot Ms319 \; h3 \cdot Hc3 \quad (0-11)$$

$$\sigma w2 - \sigma w1 - 2 \cdot Ms2 \cdot h2 \cdot Hex$$

$$>2 \cdot Ms2 \cdot h2 \cdot Hc2 \quad (0-12)$$

where σ w2 represents the energy of the interface magnetic wall between the second and the third magnetic thin films 200 and 300. Thus, a section or bit cell in which "1" has been recorded is formed.

The above mentioned publication also shows another medium, as Embodiment 2, of which the process of magnetization is shown in FIG. 103. FIG. 104 is a temperature characteristics diagram of the magnetization and coercivity of the second magnetic thin film 200. In the FIG. 103, the arrows of the broken line denote RE sublattice magnetization. The magnetic thin films are composed as shown in Table P1.

TABLE P1

| Film | Composition | Curie Temp. (°C.) | Magnetization (emu cc$^{-1}$) | Coercivity (kilo-oersteds) | Thickness (angstroms) |
|---|---|---|---|---|---|
| First | TbFeCo | 150 | 100 | 12 | 500 |
| Second | GdTbFeCo | 210 | 100 | 1 | 300 |
| Third | TbFeCo | 150 | 150 | 7 | 500 |
| Fourth | TbFe | 130 | — | — | 100 |

The second magnetic thin film 200 has the temperature characteristics of the magnetization and coercivity shown in FIG. 104. The external magnetic field Hex is so set as to satisfy $$Hc2<Hex$$

In the example described, the external magnetic field Hex is 1 kilo-oersteds. The recording operation is similar to that described above. But the initialization of the second magnetic thin film 200 is achieved by setting the external magnetic field to be higher than the coercivity of the second magnetic thin film 200 so as to satisfy the same condition as the recording medium shown in FIG. 102.

Third Prior Art Example

A further example of recording medium in the prior art is shown in Japanese Patent Application Kokai Publication No. 241051/1989. In this prior art, four magnetic layers are provided, and overwriting is achieved without resorting to the external magnetic field. The overwriting in the prior art is shown in FIG. 105. The fourth magnetic layer is premagnetized so that its sublattice magnetization orientation is upward, for example. At room temperature, the sublattice magnetization orientations of the second and the third magnetic layers are identical with the sublattice magnetization orientation of the fourth magnetic layer (FIG. 105 at (a)).

When the recording medium is heated above Tc1, the first magnetic layer loses its magnetization. When it cools below Tc1, the sublattice magnetization orientation of the first magnetic layer is aligned with the sublattice magnetization orientation of the second magnetic layer (FIG. 105 at (g)), and the first magnetic layer is magnetized upward (FIG. 105 at (f)). In this way, recording which results in upward sublattice magnetization orientation in the first magnetic layer is achieved.

When the recording medium is heated above TH, and close to Tc2, the first and the third magnetic layers lose their magnetization. The exchange-coupling from the fourth magnetic layer does not act on the second magnetic layer, and because of opposing magnetic field, the second magnetic layer is magnetized so that its sublattice magnetization orientation is opposite to the sublattice magnetization orientation of the fourth magnetic layer (FIG. 105 at (e)). When the temperature is decreased below Tc1, the sublattice magnetization orientation of the first magnetic layer is aligned with the sublattice magnetization orientation of the second magnetic layer, to be downward (FIG. 105 at (i)). When the temperature is returned to room temperature, the sublattice magnetization orientation of the second magnetic layer is returned to the initial state (this process is called initialization) by exchange-coupling with the third magnetic layer (FIG. 105 at (h)). In this way, recording which results in the downward sublattice magnetization orientation in the first magnetic layer is achieved.

Problems Associated with the Prior Art Examples

The first-mentioned prior-art magneto-optic recording medium has a problem that an initializing magnet with a strong magnetic field is required and the overall structure of the read-write apparatus is complex and large in size.

A problem associated with the medium of Embodiment 1 of the Japanese Patent Application Kokai Publication No. 68103/1988 is that the external magnetic field Hex must be small so that the initialization of the second magnetic layer 200 is restrained, as will be seen from the condition (0-12) for the transition from the state G to the state C. However, if the external magnetic field Hex is set small, it is difficult to reverse the magnetization orientation of the second magnetic layer 200 into direction of the external magnetic field Hex when the medium is heated to T2 for High writing, and it may fail to realize the state F. Moreover, even if the conditions are so set as to satisfy the relationship (0-11), the sublattice magnetization orientation of the third magnetic thin film 300 may be reversed when the thermo-magnetic recording medium 101 moves out of the region where the external magnetic field is applied, thereby causing failure in overwriting.

A problem associated with Embodiment 2 of the Japanese Patent Application Kokai Publication No. 268103/1988 is that the initialization of the second magnetic layer 200 utilizes the external magnetic field Hex so the external magnetic field Hex must be fairly large. Then, the transfer of the sublattice magnetization orientation of the second magnetic layer to the first magnetic layer 100 at about Tc1, i.e., the transition from the state F to the state G is difficult to occur, thereby causing failure in overwriting. Moreover, it is difficult to realize the second magnetic layer having the coercivity as set forth in Table P1, and even if it is realized, writing is difficult.

A problem associated with the medium described in Japanese Patent Application Kokai Publication No. 241051/1989 is that the writing into the second magnetic layer is made employing the compensation point recording system. Accordingly, the second magnetic layer must have a compensation temperature above room temperature and below the medium temperature during High writing. Therefore, stray magnetic field does not act, and recording characteristics are poor. For instance, in digital recording signals are not obtained at all, and overwriting was difficult. In addition, the exchange-coupling functions between the first magnetic layer and the second magnetic layer even below TL, and initialization of the second magnetic layer is not completely achieved, and overwriting may not be achieved.

SUMMARY OF THE INVENTION

The present invention is directed toward a solution of the above described problems.

An object of the invention is provide a magneto-optic recording medium that does not require an initializing magnet and can be easily overwritten.

Another object is to provide a fabrication method for such a magneto-optic recording medium.

A magneto-optic recording medium according to the invention as defined by claim 1 comprises:

a first magnetic layer having perpendicular magnetic anisotropy; and a second magnetic layer provided on the first magnetic layer and coupled to It by an exchange force, wherein the following relationship is satisfied:

$Tc1 < Tc2$ where, Tc1: Curie temperature of first magnetic layer Tc2: Curie temperature of second magnetic layer
The following relationship is additionally satisfied at room temperature:

$Hc1 > Hw1$ and $Hc2 > Hw2$ where, Hc1: coercivity of first magnetic layer
Hc2: coercivity of second magnetic layer
Hw1: reversal field shift in first magnetic layer due to exchange force
Hw2: reversal field shift in second magnetic layer due to exchange force.

A magneto-optic recording medium according to the invention as defined by claim 3 comprises:

a first magnetic layer having perpendicular magnetic anisotropy;

a second magnetic layer provided on the first magnetic layer and coupled to it by an exchange force; and a third magnetic layer provided on the second magnetic layer and coupled to it by an exchange force;
wherein the following relationships are satisfied:

$Tc1 < Tc2 < Tc3$ where, Tc1: Curie temperature of first magnetic layer
Tc2: Curie temperature of second magnetic layer
Tc3: Curie temperature of third magnetic layer
The following relationships are additionally satisfied at room temperature:

$Hc1 > Hw1(2)$ and $Hc3 > Hw3(2)$

There exists a temperature between room temperature and Tc1 at which the following relationship is also satisfied:

$Hc2<Hw2(3)-Hw2(1)$ where, Hc1: coercivity of first magnetic layer
Hc2: coercivity of second magnetic layer
Hc3: coercivity of third magnetic layer
Hwi(j): reversal field shift in i-th layer due to exchange coupling force between j-th layer and i-th layer.

A magneto-optic recording medium according to the invention as defined by claim 5 comprises:
a first magnetic layer having perpendicular magnetic anisotropy;
a second magnetic layer provided on the first magnetic layer and coupled to it by an exchange force;
a third magnetic layer provided on the second magnetic layer and coupled to it by an exchange force; and
a fourth magnetic layer provided on the third magnetic layer and coupled to it by an exchange force;
wherein the following relationships are satisfied:

$Tc1<Tc2, Tc3<Tc2, Tc1<Tc4,$ and $Tc3<Tc4$ where, Tc1: Curie temperature of first magnetic layer
Tc2: Curie temperature of second magnetic layer
Tc3: Curie temperature of third magnetic layer
Tc4: Curie temperature of fourth magnetic layer;
the magnetization of said first magnetic layer is not reversed due to the reversal of the magnetization of said second magnetic layer at room temperature.

In the magneto-optic recording medium according to the invention as defined in claim 5, it is preferable that the following relationships are additionally satisfied at room temperature:

$Hc1>Hw1(2)$ and $Hc4>Hw4(3)$; and there exists a temperature between room temperature and Tc1 or Tc3, whichever is lower, at which the following relationships are also satisfied:

$Hc2<Hw2(3)-Hw2(1)$ and $Hc3<Hw3(4)-Hw3(2)$ where, Hc1: coercivity of first magnetic layer
Hc2: coercivity of second magnetic layer
Hc3: coercivity of third magnetic layer
Hc4: coercivity of fourth magnetic layer
Hwi(j): reversal field shift in i-th layer due to exchange coupling force between j-th layer and i-th layer.

In the magneto-optic recording medium as defined by claim 5, it is preferable that the second magnetic layer is a rare earth metal sublattice dominant film;
the directions of the sublattice magnetization of said second magnetic layer, said third magnetic layer and said fourth magnetic layer are parallel with each other at room temperature after recording operation; and
there is a temperature between room temperature and the lower one of the Curie temperature of said first magnetic layer and the Curie temperature of said third magnetic layer at which the relationship $Hc2<Hw2$ is satisfied,
wherein
Hc2 represents the coercivity of said second magnetic layer that is obtained when said four layers are stacked with each other and the sublattice magnetizations of said first magnetic layer and said third magnetic layer are antiparallel with each other, and
Hw2 represents the exchange coupling which said second magnetic layer receives from said first magnetic layer and said third magnetic layer when said four layers are stacked, with each other and the sublattice magnetizations of said first magnetic layer and said third magnetic layer are antiparallel with each other.

A magneto-optic recording medium according to the invention as defined by claim 20 comprises:
a first magnetic layer having perpendicular magnetic anisotropy;
a second magnetic layer provided on the first magnetic layer and coupled to it by an exchange force; and
a third magnetic layer provided on the second magnetic layer and coupled to it by an exchange force, wherein the following relationships are satisfied:

$Tc1<Tc2$ and $Tc3<Tc2$ where, Tc1: Curie temperature of first magnetic layer
Tc2: Curie temperature of second magnetic layer
Tc3: Curie temperature of third magnetic layer
The following relationships are additionally satisfied at room temperature:

$Hc1>Hw1(2)$ and $Hc3>Hw3(2)$

There exists a temperature between room temperature and Tc3 at which the following relationship is also satisfied:

$Hc2<Hw2(3)-Hw2(1)$ where, tc1: coercivity of the first magnetic layer
Hc2: coercivity of the second magnetic layer
Hc3: coercivity of the third magnetic layer
Hwi(j): reversal field shift in i-th layer due to exchange coupling force between j-th layer and i-th layer.

The invention of claim 22 is the magneto-optic recording medium as recited in claim 20, further comprising a fourth magnetic layer disposed between the second and third magnetic layers and coupled to them by an exchange force, wherein the following relationships are satisfied:

$Tc4<Tc3<Tc2$ and $Tc1<Tc2$ where, Tc4: Curie temperature of the fourth magnetic layer
The following relationships are additionally satisfied at room temperature:

$Hc1>Hw1(2)$ and $Hc3>Hw3(4)$

There exists a temperature between room temperature and Tc4 at which the following relationships are also satisfied:

$Hc2<Hw2(4)-Hw2(1)$ and $Hc4<Hw4(3)-Hw4(2)$

In any of the above described magneto-optical recording media, there may further be provided an interface control layer disposed at an interface between magnetic layers, for controlling the exchange force.

The invention of claim 24 is a method of manufacturing an overwritable magneto-optic recording medium having an initializing layer the magnetization of which is not reversed in reading or writing, wherein a substrate comprising the aforesaid initializing layer is placed in an atmosphere to which a magnetic field oriented in one direction is applied by a magnetic field applying means, the surface of the substrate being substantially perpendicular to the direction in which the magnetic field is applied, thereby pre-initializing the initializing layer.

The invention of claim 25 is a method of manufacturing an overwritable magneto-optic recording medium having initializing layers the magnetization of which is not reversed in reading or writing, wherein substrates comprising the aforesaid initializing layers are placed in an atmosphere to which a magnetic field oriented in one direction is applied by a magnetic field applying means, the surface of the substrates being substantially perpendicular to the direction in which the magnetic field is applied, thereby pre-initializing the initializing layers, after which the substrates are joined.

The invention of claim 26 is a method of manufacturing an overwritable magneto-optic recording medium having initializing layers the magnetization of which is not reversed in reading or writing, wherein after the joining of substrates having initializing layers, the joined substrates are placed in an atmosphere to which a magnetic field oriented in one direction is applied, the surfaces of the joined substrates being substantially perpendicular to the direction in which the magnetic field is applied.

The invention of claim 27 is a method of manufacturing an overwritable magneto-optic recording medium having initializing layers the magnetization of which is not reversed in reading or writing, wherein after the joining of two substrates having initializing layers with different coercivities, a magnetic field stronger than the coercivity of one of the initializing layers is applied substantially perpendicular to the substrates, then a magnetic field weaker than the coercivity of the aforesaid one of the initializing layers but stronger than the coercivity of the other initializing layer and oriented oppositely to the aforesaid magnetic field is applied substantially perpendicular to the substrates.

The inventive structures in the any of the above described magneto-optic recording media, has a first magnetic layer for information recording and an initializing layer, which enable optically-modulated overwriting. Further auxiliary layers can be provided for more efficient transfer from the initializing layer to the recording layer.

Claims 24 through 27 relate to methods of applying a magnetic field exceeding the coercivity of the initializing layer to pre-initialize the magnetic alignment of the initializing layer of the magneto-optic recording medium to a certain direction.

A magneto-optic recording and reproducing apparatus according to the invention as defined by the claim 28 is for recording information on a recording layer of a magneto-optic recording medium in the form a bit having an upward magnetization and a bit having a downward magnetization, and uses the magneto-optic recording medium as recited above, and comprises:

means for irradiating a laser beam on the medium, means for heating said magneto-optic recording medium to two or more values in accordance with the binary information to be recorded, and means for applying a recording magnetic field to the part of the medium where said beam is irradiated.

In the apparatus, a reproducing laser beam may be provided in the proximity of the recording laser beam.

The recording laser beam and the reproducing laser beam may have different wavelengths.

BRIEF DESCRIPTION OF THE DRAWINGS

FIG. 1 (a) is an oblique view of the main parts of a magneto-optic recording apparatus comprising an inventive magneto-optic recording medium, (b) is a partial sectional view illustrating optical reading and writing of an inventive two-layer magneto-optic recording medium, and (c) is a plot of laser power variations for recording information in areas on the magneto-optic recording medium.

FIG. 4 shows the states of the layers of an inventive two-layer magneto-optic recording medium during the writing of information.

FIG. 10 illustrates the states of the layers of an inventive four-layer magneto-optic recording medium during the writing of information.

FIG. 93 shows the states of the layers of another inventive three-layer magneto-optic recording medium during recording.

FIG. 99 (a) is an oblique view of the main parts of a prior-art magneto-optic read-write apparatus, (b) is a partial sectional view illustrating optical reading and writing of the magneto-optic recording medium, and (c) is a plot of laser power variations for recording information in areas on the magneto-optic recording medium.

FIG. 99 shows a magneto-optic recording and reproducing device in the prior art.

FIG. 100 shows the variation In the temperature in the magnetic film due to the laser beam power.

FIGS. 107 to 109 are schematic diagrams showing the process of initialization of the magneto-optic disk of this invention.

FIG. 112A is a schematic diagram showing the magnetization curves in the case of room temperature.

FIG. 112B shows the n-loop in solid line and the c-loop in dotted line.

FIG. 112C shows the c-loop in solid line and the n-loop in dotted line.

FIG. 116 shows the composition ratio of iron and cobalt in the second magnetic layer, and the erasability.

DETAILED DESCRIPTION OF THE PREFERRED EMBODIMENTS

Figure 2:
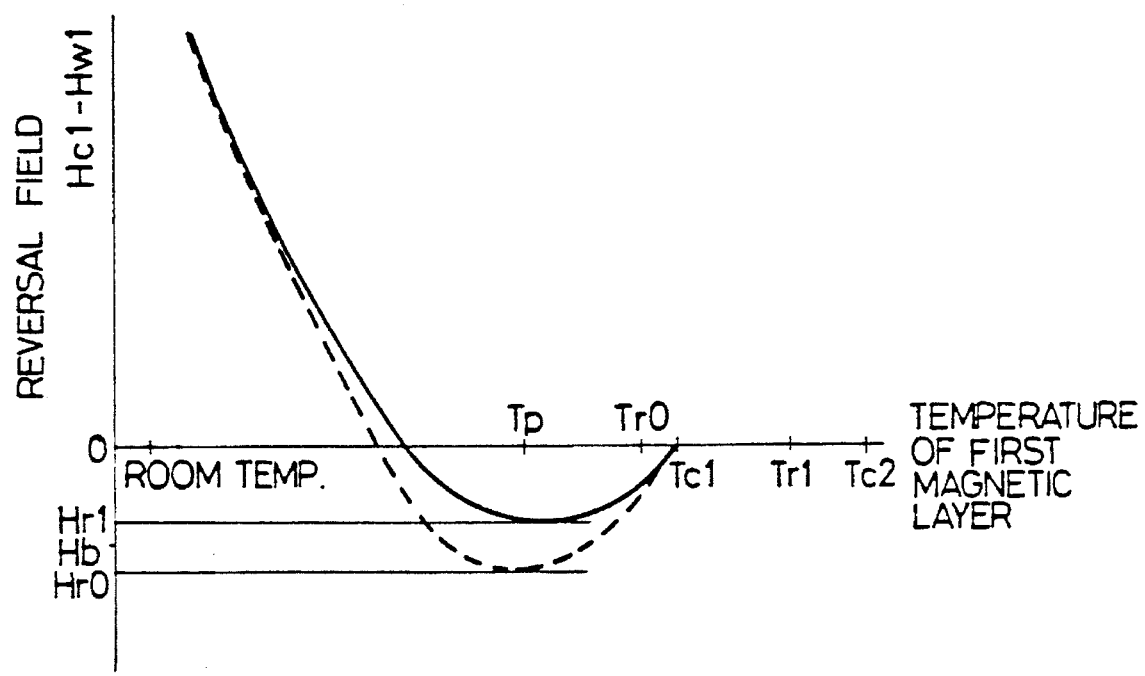
FIG. 2 is a drawing illustrating the relationship between the temperature in the first magnetic layer of an inventive two-layer magneto-optic recording medium and the reversal field.

A detailed description will be given of an overwritable magneto-optic recording medium that does not require an initializing magnet. In FIG. 1, (a) is an oblique view of the main parts of a magneto-optic recording apparatus comprising an inventive magneto-optic recording medium, (b) is a partial sectional view illustrating optical reading and writing of an inventive two-layer magneto-optic recording medium, and (c) is a plot of laser power variations for recording information in areas on the inventive magneto-optic recording medium. In these drawings, 11 is an inventive magneto-optic recording medium, 20 is a laser beam emitted by a beam-emitting device for illuminating the magneto-optic recording medium 11 and reading and writing information, 16 is a beam spot formed by focusing the laser beam 20 with an objective lens 5 so as to illuminate the magneto-optic recording medium 11, and 18 is a magnet that applies a magnetic field in a fixed direction to the part of the magneto-optic recording medium 11 illuminated by the beam emitting device.

The magneto-optic recording medium 11 is rotationally driven in the direction of the arrow (a) in the drawings. As noted above, the information medium 11 comprises two magnetic layers 13 and 14, the first magnetic layer 13 being closer than the second magnetic layer 14 to the side illuminated by the laser beam. The first magnetic layer 13 is a read-write layer for holding directions of magnetization representing the information "0" and "1." The second magnetic layer 14 is provided for overwriting. The second magnetic layer 14 is called the initializing layer, and provides the functions of both the auxiliary layer and the initializing magnet in the prior art.

The characteristics of the first magnetic layer 13 and the second magnetic layer 14 are related so that $Tc1 < Tc2$, where Tc1 and Tc2 are their respective Curie temperatures, and so that $$Hc1 > Hw1 + Hb \quad \text{(A)}$$

$$Hc2 > Hw2 + Hb \quad \text{(B)}$$

where Hc1 and Hc2 are their respective coercivities, and Hwi (i=1, 2) represents the exchange coupling forces between the two layers.

Equation (A) holds from room temperature to a certain temperature T0 lower than Tc1. Thus in the temperature range from room temperature to T0, the coercivity Hc1 of the first magnetic layer 13 is greater than the sum of the effect Hw1 of the exchange coupling force and the field Hb applied by the magnet 18 during writing, hence the first magnetic layer 13 is able to preserve its magnetic alignment without being affected by the magnetization of the second magnetic layer 14.

Equation (B) holds throughout the range of operating temperatures. Accordingly, in the range of operating temperatures, the coercivity Hc2 of the second magnetic layer 14 is greater than the sum of the effect Hw2 of the exchange coupling force and the field Hb applied by the magnet 18 during writing, hence once the second magnetic layer 14 is initialized, to the up direction as shown in FIG. 1 (b) for example, it is able to preserve its upward magnetic alignment without suffering magnetic reversal.

FIG. 2 shows the temperature characteristic of the reversal field of the first magnetic layer 13. The reversal field, which is the minimum magnetic field necessary to reverse the magnetic alignment, is given by the formula:

$Hc1 - Hw1$

The solid line in FIG. 2 indicates the temperature characteristic of the reversal field when the laser intensity is R1 in FIG. 1 (c). The dashed line indicates the characteristic when the laser intensity is R0.

Next the writing operation will be explained. First the operation of writing the information "0" by magnetizing the first magnetic layer 13 in the down direction will be described.

When the laser intensity is R1, the temperature in the illuminated beam spot 16 rises to Tr1 in FIG. 2. As the disk rotates and leaves the illuminated beam spot 16, the temperature in the first magnetic layer 13 falls. As can be seen from the solid line in FIG. 2, throughout the temperature range from Tc1 to room temperature,

|Hb|>Hw1−Hc1, so the first magnetic layer 13 is magnetized in the downward direction of the bias magnetic field Hb.

Next the operation of writing the information "1" by magnetizing the first magnetic layer 13 in the up direction, will be described.

When the laser intensity is R0, the temperature in the illuminated beam spot 16 rises to Tr0 in FIG. 2. As the disk rotates and leaves the illuminated beam spot 16, the temperature in the first magnetic layer 13 falls. As can be seen from the dashed line in FIG. 2, in the neighborhood of, for example, the temperature Tp,

|Hb|<Hw1−Hc1, so the first magnetic layer 13 is magnetized in the direction of the exchange force, namely the upward direction in which the second magnetic layer 14 is magnetized.

By the above operations, new data can be written over old data in real time by modulating the intensity of the laser beam at each point in FIG. 4 between R1 and R0, according to the "0" and "1" values of the new data.

Next the reason why the reversal field of the first magnetic layer 13 changes with temperature as shown by the solid line in FIG. 2 when the laser intensity is R0 and R1 will be explained.

Laser illumination raises the temperatures of both magnetic layers, but after being heated, the first magnetic layer 13 cools at a faster rate than the second magnetic layer 14. This is thought to occur for the following reasons.

(i) Since the laser illumination is from the side of the first magnetic layer 13, the first magnetic layer 13 is heated to a higher temperature than the second magnetic layer 14. Its rate of cooling is therefore faster.

(ii) The first magnetic layer 13 is in contact with the substrate, and dissipates heat through the substrate.

(iii) The extreme thinness of the first magnetic layer 13 leads to large heat dissipation.

Thus the first magnetic layer 13 cools at a faster rate. Let T2r0 be the temperature of the second magnetic layer 14 when the first magnetic layer 13 cools to a temperature of substantially Tp in FIG. 2 after having been heated by a laser beam of intensity R0 to a temperature of Tr0 in FIG. 2. Let T2r1 be the temperature of the second magnetic layer 14 when the first magnetic layer 13 cools to a temperature of substantially Tp in FIG. 2 after having been heated by a laser beam of intensity R1 to a temperature of Tr1 in FIG. 2. From the foregoing difference in cooling rates, it follows that:

T2r0<T2r1

The higher laser intensity R1 therefore leaves the second magnetic layer 14 at a higher temperature in the vicinity of Tp. Since the exchange coupling force tends to decrease at higher temperatures of the magnetic layers, the exchange coupling force is smaller when the laser beam has the higher intensity R1. This gives rise to the difference between the solid line and dashed line in the temperature characteristics of the reversal field of the first magnetic layer 13 in FIG. 2. A result is a magnetic hysteresis effect with respect to temperature which makes overwriting possible.

The operation of reading the recorded information is the same as in the prior art.

Next an embodiment will be described in which the first and second magnetic layers comprise an alloy of rare-earth (RE) and transition-metal (TM) elements.

When an RE-TM alloy is selected for both the first and second magnetic layers, the direction and magnitude of the externally observable magnetization of each alloy depends on the direction and magnitude of the magnetization (magnetic moment per unit volume) of its TM and RE sublattices. Let the magnetic direction and magnitude of the TM sublattice be represented by a dotted line vector ↑, the magnetic direction and magnitude of the RE sublattice by a solid-line vector ↑, and the magnetic direction and magnitude of the alloy as a whole by a double-line vector ⇑. The vector ⇑ is expressed as the sum of the vector ↑ and the vector ↑. Due, to an interaction between the TM sublattice magnetization and the RE sublattice magnetization in the alloy, the vector ↑ and the vector ↑ always point in opposite directions. When both are equal in magnitude the sum of ↓ and ↑ or ↑ and ↓ is zero, so the magnetization of the alloy is zero (that is, the magnitude of the externally apparent magnetization is zero). The alloy composition that produces this zero value is called the compensation composition. At other compositions, the alloy has a magnetization equal in strength to the difference in strength between the two sublattice magnetizations, oriented (⇓ or ⇑) in the direction of the stronger vector. The magnetization of this vector is externally observable. For example, ↑ and ↓ gives ⇑, and ↑ and ↓ gives ⇓.

When the strength of the RE sublattice magnetization vector exceeds the strength of the TM sublattice magnetization vector, the alloy is said to be RE-rich, and when the strength of the TM sublattice magnetization vector exceeds the strength of the RE sublattice magnetization vector, the alloy is said to be TM-rich. The compositions of the first and second magnetlc layers can both be classified as RE-rich or TM-rich.

Figure 3:
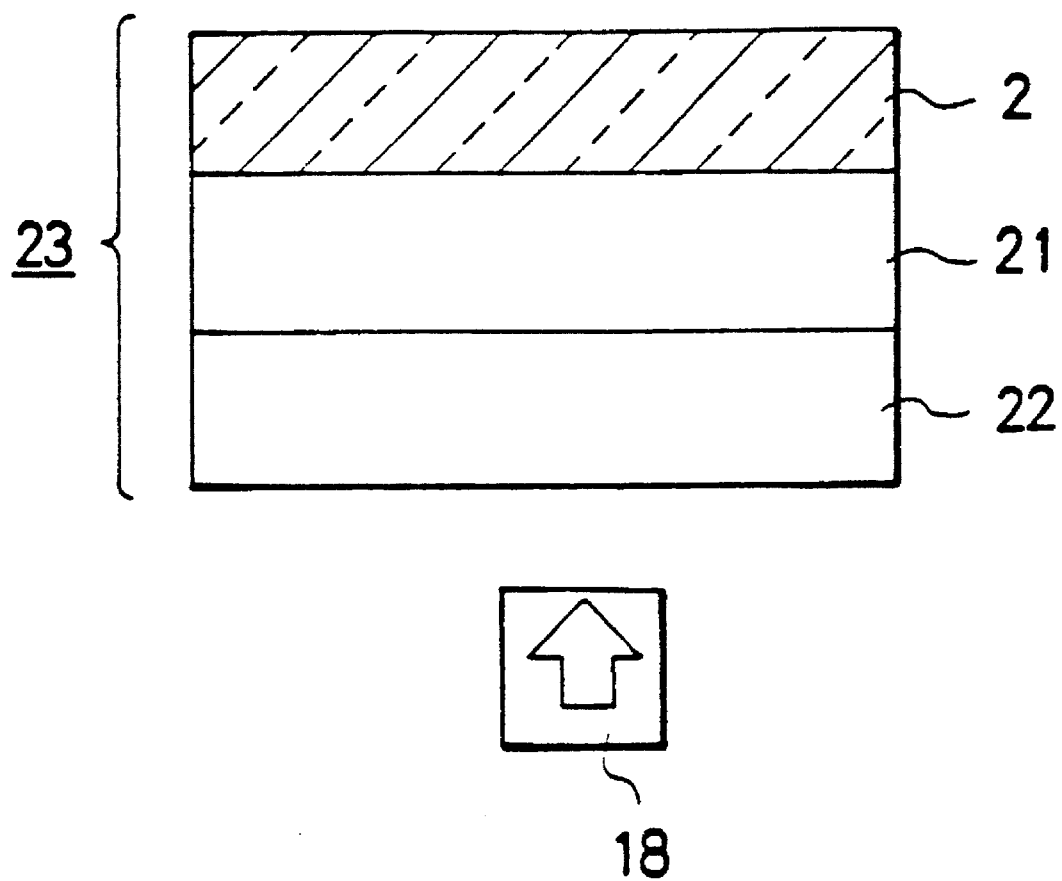
FIG. 3 is a drawing showing the specific structure of an inventive two-layer magneto-optic recording medium.

FIG. 3 is a sectional view of a magneto-optic recording medium comprising such RE-TM alloys, in which 2 is the substrate, 21 is a first amorphous magnetic alloy layer of MFeCo (in which M represents Tb or Dy or a combination of both), and 22 is a second amorphous magnetic alloy layer of GdTbCo. A non-magnetic substance such as glass or plastic is used for the substrate 2. The MFeCo ternary first amorphous magnetic alloy layer 21 (which will be called the first magnetlc alloy layer) has a composition of $M_x(Fe_{1-y}Co_y)_{1-x}$, where $0.15<x<0.3$ and $0<y\leq0.50$. The second amorphous magnetlc alloy layer 22 (which will be called the second magnetic alloy layer) has a composition of $(Gd_{1-y}Tb_y)_xCo_{1-x}$, where $0.15<x<0.35$ and $0.3\leq y\leq 1$. Magnetic layers such as the above can be formed by methods such as sputtering or vacuum evaporation deposition.

Embodiments of the invention will now be described in detail.

Embodiment A1

Ferrimagnetic layers as follows are formed on a substrate by sputtering.

1st magnetic alloy layer: $Tb_{23}Fe_{72}Co_5$ 500 angstroms

2nd magnetic alloy layer: $Gd_{14}Tb_{14}Co_{72}$ 1500 angstroms

The magnetic layers are coupled by an exchange force. The Curie temperature of the first magnetic alloy layer 21 is substantially 180° C. The second magnetic alloy layer 22 has a reversal field of 1000 oersteds or more from room temperature to 250° C., so the second magnetic alloy layer 22 does not undergo magnetic reversal within the operating temperature range. At a temperature of substantially 150° C. the exchange force exceeds the coercivity of the first magnetic alloy layer 21, the difference between the exchange force and the coercivity reaching a maximum value of substantially 1000 oersteds. The external magnet 18 generates a constant magnetic field of substantially 1000 oersteds oriented in the up direction. The second magnetic alloy layer 22 is magnetized uniformly in the up direction. The direction of the magnetic field generated by the external magnet 18 is opposite to that shown in the preceding example.

Figure 5:
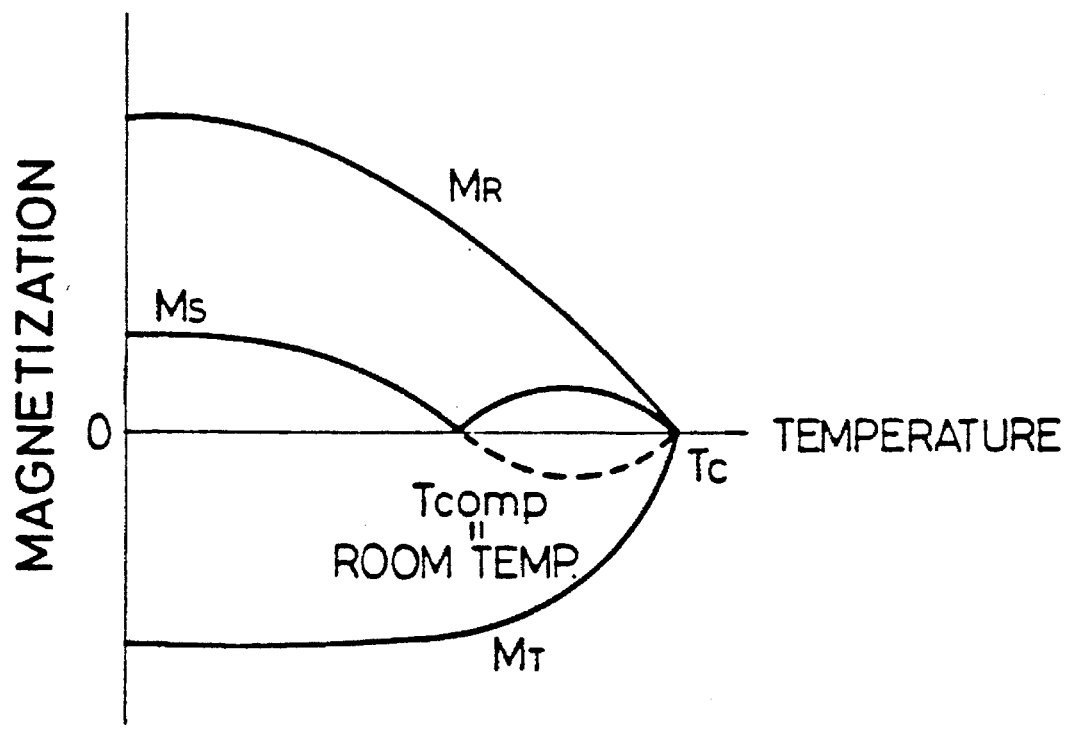
FIG. 5 illustrates the magnetization states of an alloy of a rare-earth metal and transition metal having a room-temperature compensation temperature.

The writing of information on a magneto-optic recording medium 23 of this composition will be explained with reference to FIG. 4. As shown at (1) or (5) in FIG. 4, the composition of the first magnetic alloy layer of $Tb_{23}Fe_{72}Co_5$ is the compensation composition at room temperature, so the net magnetization of the alloy is zero. The second magnetic alloy layer of $Gd_{14}Tb_{14}Co_{72}$ is RE-rich and has a net magnetization in the up direction. In this embodiment, a "0" is recorded when the direction of magnetization of the TM sublattice of the first magnetic alloy layer 21 is down, and a "1" is recorded when the direction is up. The writing of a "1" is shown at (1) to (4) in FIG. 4. First, when a domain is illuminated by a laser beam spot of intensity R1 [see (c) in FIG. 1], its temperature rises to Tr1, exceeding the Curie temperature of the first magnetic alloy layer 21, so the first magnetic alloy layer 21 is demagnetized [(2) in [FIG. 4]. When the rotation of the disk carries the domain out of the beam spot, the temperature of the first magnetic alloy layer falls. Hw1–Hc1 reaches a maximum in the vicinity of Tp in FIG. 2, but the bias field Hb exceeds this value (|Hb|>Hw1–Hc1), so the first magnetic alloy layer receives a net magnetization in the (up) direction of the bias field Hb. At this temperature, the first magnetic alloy layer is TM-rich. This is because, from FIG. 5, the compensation point is close to room temperature, making the alloy TM-rich at higher temperatures. Accordingly, the TM sublattice is magnetized in the up direction [(3) in FIG. 4]. When the temperature falls further to room temperature, the first magnetic alloy layer has the compensation composition [(4) in FIG. 4]. The recording of a "0" is shown at (5) to (8) in FIG. 4. First, when a domain is illuminated by a laser beam spot of intensity R0, its temperature rises to Tr0, [(6) in FIG. 4]. When the rotation of the disk carries the domain out of the beam spot, the temperature of the first magnetic alloy layer falls. As explained previously, in the vicinity of Tp in FIG. 2 (substantially 150° C.), the magnetic alignment of the second magnetic alloy layer is transferred by the exchange force to the first magnetic alloy layer (Hb<Hw1–Hc1), so the TM sublattice of the first magnetic alloy layer is magnetized in the down direction. [(7) in FIG. 4]. When the temperature falls further to room temperature, the first magnetic alloy layer has the compensation composition [(8) in FIG. 4]. Optically modulated direct overwriting is thus possible by modulating only the intensity of the laser beam. When a signal was recorded in this way with a linear speed of 6 m/s and pit length of 0.8 to 5 micrometers, the field generated by the external magnet 18 being 1000 oersteds and the laser beam being modulated between a peak power of 16 mW and bottom power of 5 mW, an erasability characteristic of 25 dB or greater was obtained. The signal was read with a laser power of 1.5 mW.

Embodiments A2 to A8

It suffices for the coercivity of the second magnetic layer 14 to have a sufficiently large magnitude in the vicinity of the Curie temperature of the first magnetic layer 13. The magneto-optic information recording media shown in Table 1 were obtained by sputtering magnetic layers on a glass substrate by the same method as in Embodiment A1.

TABLE I

|  | 1ST MAGNETIC LAYER | | 2ND MAGNETIC LAYER | |
| --- | --- | --- | --- | --- |
|  | COMPOSITION | THICKNESS Å | COMPOSITION | THICKNESS Å |
| MEDIUM 2 | $Tb_{23}Fe_{72}Co_5$ | 500 | $Gd_{15}Tb_{14}Co_{71}$ | 1500 |
| MEDIUM 3 | $Tb_{23}Fe_{72}Co_5$ | 400 | $Gd_{14}Tb_{14}Co_{72}$ | 1500 |
| MEDIUM 4 | $Tb_{23}Fe_{72}Co_5$ | 400 | $Gd_{14}Tb_{16}Co_{70}$ | 1500 |
| MEDIUM 5 | $Tb_{23}Fe_{72}Co_5$ | 500 | $Gd_{14}Tb_{14}Co_{72}$ | 1800 |
| MEDIUM 6 | $Tb_{23}Fe_{72}Co_5$ | 400 | $Gd_{14}Tb_{14}Co_{72}$ | 1800 |
| MEDIUM 7 | $Dy_{23}Fe_{72}Co_5$ | 500 | $Tb_{30}Co_{70}$ | 1500 |
| MEDIUM 8 | $Tb_{23}Fe_{72}Co_5$ | 500 | $Tb_{33}Co_{67}$ | 1500 |

When a magneto-optic recording apparatus using the other magneto-optic information recording media listed as embodiments of this invention in Table 1 was operated at a linear speed of 6 m/s, light-modulated direct overwriting was possible as in Embodiment A1. Erasability characteristics of 20 dB or greater were obtained as shown in Table 2, and characteristics of 23 to 35 dB were obtained with optimum adjustment of the power.

TABLE 2

|  | GENERATED FIELD (Oe) | PEAK POWER (mW) | BOTTOM POWER (mW) |
| --- | --- | --- | --- |
| MEDIUM 2 | 1000 ± 100 | 12.0 to 17.0 | 4.0 to 7.0 |
| MEDIUM 3 | 1200 ± 100 | 10.0 to 15.0 | 4.0 to 7.0 |
| MEDIUM 4 | 1300 ± 100 | 11.0 to 17.0 | 4.0 to 7.0 |
| MEDIUM 5 | 1000 ± 100 | 13.0 to 17.0 | 4.5 to 7.5 |
| MEDIUM 6 | 1200 ± 100 | 12.0 to 15.0 | 4.5 to 7.5 |
| MEDIUM 7 | 800 ± 100 | 9.0 to 17.0 | 3.5 to 7.5 |
| MEDIUM 8 | 1200 ± 100 | 12.0 to 17.0 | 4.0 to 8.0 |

Another novel magneto-optic recording medium has layers with the following composition and thickness.

Embodiment A9: first magnetic alloy layer $Tb_{23}Fe_{67}Co_{10}$ (thickness: 500 angstroms)
second magnetic alloy layer $Gd_{12}Tb_{12}Co_{76}$ (thickness: 1500 angstroms)

Good overwriting characteristics similar to those of Embodiment A1 were obtained.

Embodiment A10

Substrate: 1.2 mm-thick plastic substrate

TbFeCo ternary first amorphous magnetic alloy layer:

$Tb_{23.6}(Fe_{90}Co_{10})_{76.4}$

Thickness: 500 angstroms

Room-temperature coercivity: Approx. 10K oersteds

Curie temperature: 180° C.

GdTbCo ternary second amorphous magnetic alloy layer:

$(Gd_{50}Tb_{50})_{24}Co_{76}$

Thickness: 1800 angstroms

Room-temperature coercivity: Approx. 1K oersted

Curie temperature: $\geq 300°$ C.

After being initialized once at 10,000 oersteds, the magneto-optic recording medium of Embodiment A10 was successfully overwritten 1000 times or more at a disk speed of 6 m/s with the recording field held at 1000 oersteds. The writing power of the laser beam was modulated between 15 mW and 5 mW at rates of 1 MHz and 1.5 MHz.

Embodiments A11 to A15

Magneto-optic information recording media having first magnetic layers and second magnetic layers with the compositions listed in Table 3 but otherwise similar to Embodiment A10 were obtained as further embodiments of this invention, and their overwritability by a single light beam was investigated as in Embodiment A10.

Comparative examples A1 and A2

Magneto-optic information recording media having first magnetic layers and second magnetic layers with the compositions listed in Table 3 but otherwise similar to Embodiment A10 were obtained as comparative examples, and their overwritability by a single light beam was investigated as in Embodiment A10.

TABLE 3

|  | 1ST MAGNETIC LAYER | | 2ND MAGNETIC LAYER | | |
| --- | --- | --- | --- | --- | --- |
|  | COMPOSITION | THICK-NESS Å | COMPOSITION | THICK-NESS Å | OVER-WRITABLE |
| MEDIUM 11 | $Tb_{23.6}(Fe_{90}Co_{10})_{76.4}$ | 500 | $(Gd_{65}Tb_{35})_{23.5}Co_{76.5}$ | 1800 | YES |
| MEDIUM 12 | $Tb_{22.4}(Fe_{90}Co_{10})_{77.6}$ | 400 | $(Gd_{70}Tb_{30})_{22.0}Co_{76.0}$ | 1800 | YES |
| MEDIUM 13 | $Tb_{24.0}(Fe_{95}Co_5)_{76.0}$ | 500 | $Tb_{24.2}Co_{75.8}$ | 1500 | YES |
| COMPARATIVE EXAMPLE 1 | $Tb_{24.2}(Fe_{95}Co_5)_{75.8}$ | 500 | $(Gd_{60}Tb_{40})_{15.0}Co_{85.0}$ | 1800 | NO |
| COMPARATIVE EXAMPLE 2 | $Tb_{25.1}(Fe_{90}Co_{10})_{74.9}$ | 500 | $(Gd_{56}Tb_{44})_{35.0}Co_{65.0}$ | 1800 | NO |
| MEDIUM 14 | $Tb_{27.3}(Fe_{90}Co_{10})_{72.7}$ | 400 | $(Gd_{60}Tb_{40})_{23.9}Co_{76.1}$ | 1500 | YES |
| MEDIUM 15 | $Tb_{23.6}(Fe_{50}Co_{50})_{76.4}$ | 400 | $(Gd_{50}Tb_{50})_{24.5}Co_{75.5}$ | 1800 | YES |

Next an overwritable magneto-optic recording medium requiring no initializing magnet and having a three-layer structure will be described.

Figures 6A, 6B:
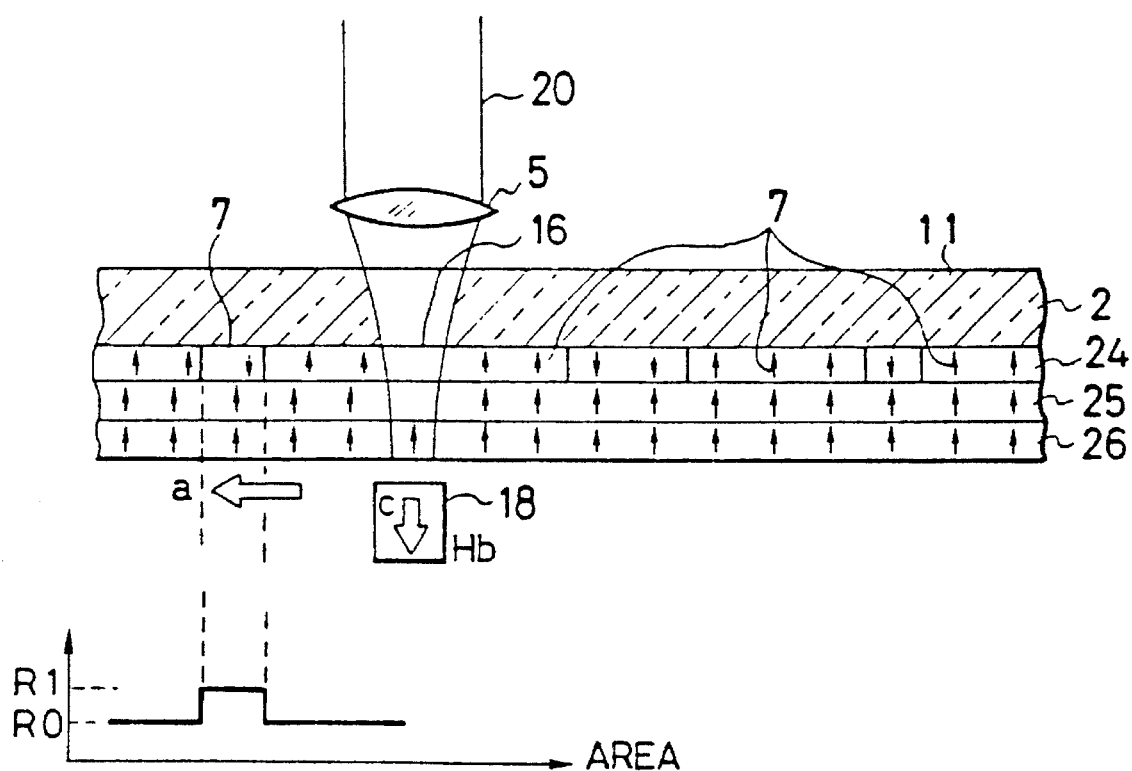
FIG. 6 (a) is a partial sectional view illustrating optical reading and writing of an inventive three-layer magneto-optic recording medium, and (b) is a plot of laser power variations for recording information in areas on the magneto-optic recording medium.

In FIG. 6, reference numerals identical to those in FIG. 1 denote elements similar to those in FIG. 1. The numeral 24 denotes a first magnetic layer, 25 denotes a second magnetic layer, and 26 denotes a third magnetic layer. In this embodiment, the first magnetic layer 24, the second magnetic layer 25, and the third magnetic layer 26 are all TM-RE alloys, and all layers are TM-rich. The first magnetic layer 24 and the second magnetic layer 25 are coupled by an exchange coupling force which aligns direction of magnetization of the TM sublattices in the two layers. The second magnetic layer 25 and the third magnetic layer 26 are coupled by a similar exchange coupling force.

The magnetization of the third magnetic layer 26 is initialized to the up direction in the drawing by, for example, an electromagnet.

The first magnetic layer 24 is the recording layer which holds a sublattice magnetization (in this case the magnetization of the TM sublattice) representing the information "0" or "1." The second magnetic layer 25 and the third magnetic layer 26 are provided for the purpose of overwritability. The second magnetic layer 25 is particularly referred to as the auxiliary layer; its sublattice magnetization is transferred to the first magnetic layer 24. (That is, the sublattices of the first magnetic layer 24 are magnetically aligned with the sublattices of the second magnetic layer.) This enables the first magnetic layer 24 to be magnetized in the desired direction. The third magnetic layer 26 is an initializing layer. The sublattice magnetic alignments of the third magnetic layer 26 are transferred to the second magnetic layer 25, whereby the sublattices of the second magnetic layer 26 can be magnetized in a fixed direction at room temperature.

Specific characteristics of the first magnetic layer 24, the second magnetic layer 25, and the third magnetic layer 26 will be described next.

The Curie temperatures Tc1, Tc2, and Tc3 of the layers satisfy the relationship:

$$Tc1 < Tc2 < Tc3$$

In this embodiment all three layers are TM-rich, so the following conditions must be satisfied at room temperature. At room temperature:

$$Hc1 - Hw1(2) > 0 \quad (1)$$

$$Hc3 - Hb - Hw3(2) > 0 \quad (3)$$

In the interval from room temperature to Tc1 there exists a temperature at which the following condition is satisfied:

$$Hc2 + Hw2(1) - Hw2(3) < 0 \quad (2)$$

where, Hci: coercivity of the i-th magnetic layer

Hwi(j): reversal filed shift in i-th layer due to exchange coupling force between j-th layer and i-th layer Hb: field applied by the bias magnet 18 during writing Next the operation will be described. Reading is the same as in the prior art, so the description below pertains to overwriting.

As the recording medium passes through the beam spot, it undergoes the environmental changes shown in Table 4.

TABLE 4

|  | EXTERNAL FIELD | TEMPERATURE |
| --- | --- | --- |
| ENVIRONMENT I | 0 | ROOM TEMP. |
| ENVIRONMENT II | Hb | ROOM TEMP. |
| ENVIRONMENT III | Hb | ELEVATED TEMP. |
| ENVIRONMENT IV | Hb | ROOM TEMP. |
| ENVIRONMENT V | 0 | ROOM TEMP. |

Environment III obtains in the substantially 1-micrometer area of the beam spot 16. Environments II and IV obtain in the substantially 1-millimeter regions in front of and behind the beam spot. In environment III, the temperature of the magnetic layers in the beam spot 16 rises to a maximum temperature that depends on the laser intensity. Afterward, when the beam spot 16 has been passed, the temperature falls, returning to room temperature in a space of several tens of micrometers.

Overwriting is enabled by binary modulation of the above-mentioned laser intensity. Writing with the stronger laser intensity R1 will be referred to as high writing, and the maximum temperature reached by the magnetic layers at this time will be denoted Thigh. Writing with the weaker laser intensity R0 will be referred to as low writing, and the maximum temperature reached by the magnetic layers at this time will be denoted Tlow.

The processes of low writing and high writing will be described in detail with reference to the changes in magnetization in corresponding environments.

Low writing

Environment I: The first magnetic layer 24 has characteristics satisfying the above equation (1). Since the coercivity Hc1 is greater than the exchange coupling Force Hw1(2) exerted by the second magnetic layer 25, the previous state of magnetization is preserved: the sublattices thus retain their up or down state according to the information written previously. As can be seen from equation (3), the coercivity Hc3 of the third magnetic layer 26 is sufficiently high that the pre-existing upmagnetization of its TM sublattice is retained. According to equation (2), the exchange coupling force between the second magnetic layer 25 and the third magnetic layer 26 is strong enough that the TM sublattice in the second magnetic layer 25 is magnetically aligned with the TM sublattice in the third magnetic layer 26; that is, it is magnetized in the up direction. There are accordingly two states in environment I: one in which "1" information is written in the first magnetic layer 24, which is the recording layer; and another in which the information "0" is written. If the upward state of magnetization of the TM sublattice in the first magnetic layer 24 is named the "1" state and the downward state is named the "0" state, the two states are as indicated at (1) in FIG. 7. In the drawings, ↑ indicates the magnetization of the TM sublattice, and ↑ indicates the magnetization of the RE sublattice, the length being proportional to the strength of magnetization. In all layers, ↑ is longer than ↑ because all magnetic layers in this embodiment are TM-rich. In the "1" state, the sublattices in the first magnetic layer 24 and the second magnetic layer 25 are magnetized in opposite directions, so their mutual states oppose the exchange coupling force; they are in an unstable state with an energy of σ w12 at the interface between the two layers. This instability is represented by cross-hatching in the drawing. The first magnetic layer 24 and the second magnetic layer 25 are able to maintain this unstable state because they satisfy the conditions in equations (1) and (2), respectively.

Figure 7:
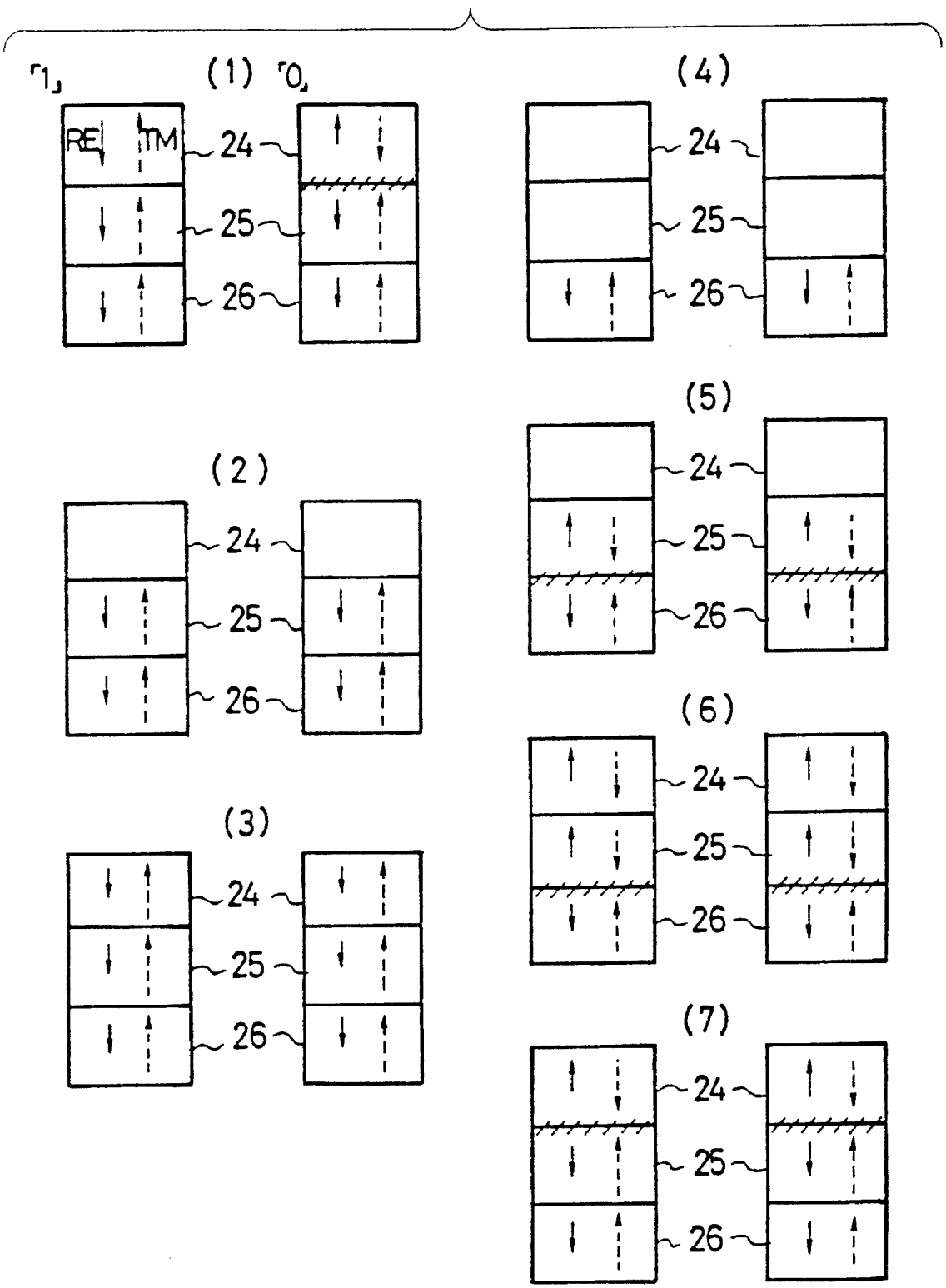
FIG. 7 shows the states of the layers of an inventive three-layer magneto-optic recording medium during the writing of information.

Environment II: The difference from environment I is that a downward-oriented external magnetic field Hb is applied by the bias magnet 18. At (1) in FIG. 7, a somewhat unstable state exists only in the first magnetic layer 24 in the "0" state. Since Hb points down, however, it acts to preserve the direction of magnetization of the first magnetic layer 24 in the "0" state. The other layers are in a sufficiently stable state that their magnetization is not reversed by the external magnetic field Hb which has a strength of at most a few hundred oersteds. The state at (1) in FIG. 7 is therefore maintained in environment II.

Environment III: The magnetic layers in the beam spot 16 illuminated with laser intensity R0 are heated to a maximum temperature of Tlow, which satisfies the relationship:

$$Tc1 \leq Tlow < Tc2 < Tc3$$

At this Tlow, the first magnetic layer 24 is demagnetized because it is at or above its Curie temperature Tc1. The Curie temperatures Tc2 and Tc3 of the second magnetic layer, 25 and the third magnetic layer, however, are high enough that the state of magnetization in environment II is maintained. The magnetization state at this maximum temperature Tlow is accordingly as shown at (2) in FIG. 7. Upon leaving the beam spot 16, the magnetic layers rapidly cool. During the cooling process, at a point where the temperature of the first magnetic layer 24 has fallen a little below Tc1, spontaneous magnetization begins to appear in the first magnetic layer 24. The coercivity of the first magnetic layer 24 is sufficiently small at this temperature, and the exchange coupling force from the second magnetic layer 25, which has a sufficiently high Curie temperature, is comparatively large [Hc1+Hb<Hw1(2)], that the sublattices of the first magnetic layer 24 are magnetically aligned with the sublattices of the second magnetic layer 25. This state of magnetization is maintained when cooling proceeds and the magnetic layers return to room temperature. Thus at the point of return to room temperature, the state of magnetization is as shown at (3) in FIG. 7.

Environments IV and V: All magnetic layers in (3) in FIG. 7 are sufficiently stable that they remain in the same state in environment IV and environment V.

Low writing therefore leaves the TM sublattice of the first magnetic layer magnetized in the "1" state, regardless of whether it was formerly in the upward-pointing "1" state or the downward-pointing "0" state.

High recording

Environments I and II are the same as environments I and II in low recording, at (1) in FIG. 7.

Environment III: The magnetic layers in the beam spot 16 illuminated by the laser intensity R1 are heated to a maximum temperature of Thigh, which satisfies the relationships:

$$Tc1 < Tc2 \leq Thigh < Tc3$$

At temperature Thigh, both the first magnetic layer 24 and the second magnetic layer 25 lose their magnetization. The Curie temperature of the third magnetic layer 26, however, is high enough that the state of magnetization in environment II is maintained. The magnetization states at this maximum temperature Thigh are therefore as shown at (4) in FIG. 7. When the magnetic layers leave the beam spot 16, they rapidly cool. During the cooling process, at a point at which the temperature of the second magnetic layer 25 is slightly less than Tc2, the second magnetic layer 25 begins to undergo spontaneous magnetization. At temperatures sufficiently higher than Tc1, the coercivity of the second magnetic layer 25 and the exchange coupling force exerted by the third magnetic layer 26 are small enough that the main factor at this temperature is the bias field Hb. The second magnetic layer 25 is thus magnetized in the down direction in alignment with the bias field, as shown at (5) in FIG. 7.

A state of instability therefore exists between the second magnetic layer 25 and the third magnetic layer 26, but the second magnetic layer 25 is supported by the relatively strong, downward-pointing force of the bias field [Hw2(3)−Hc2<Hb], and the Curie temperature Tc3 of the third magnetic layer 26 is sufficiently high that its coercivity remains high enough to hold the upward direction of magnetization [Hc3−Hb−Hw3(2)>0]. As the temperature falls, the coercivity of the second magnetic layer 25 and the third magnetic layer 26 increases and they become more stable. When the temperature falls slightly below Tc1, the first magnetic layer 24 begins to undergo spontaneous magnetization, so just as in low writing, the sublattices of the first magnetic layer 24 are magnetically aligned with the sublattices of the second magnetic layer 25. This magnetic alignment remains unchanged as cooling proceeds to room temperature [at (6) in FIG. 7].

Upon cooling to room temperature, the magnetic alignment of the sublattices of the third magnetic layer 26 is transferred to the second magnetic layer 25, which satisfies equation (2), as shown at (7) in FIG. 7, while the first magnetic layer 24, which satisfies equation (1), maintains its existing state of magnetization.

Environments IV and V: The first magnetic layer 24 and the second magnetic layer 25, which satisfy equations (1) and (2), continue to hold the states of magnetization shown in FIG. 7.

High recording therefore leaves the TM sublattice magnetization of the first magnetic layer in the "0" state, regardless of whether it was previously in the up-oriented "1" state or the down-oriented "0" state.

Given binary information can therefore be overwritten without difficulty by modulation of the laser intensity between the two values R0 and R1 as shown above.

The specific composition of the magnetic layers used is as follows.

First magnetic layer: $Tb_{21}Fe_{74}Co_5$
Second magnetic layer: $Dy_{19}Fe_{62}Co_{19}$
Third magnetic layer: $Tb_{20}Co_{80}$ Good overwriting with a C/N ratio of 45 dB was obtained by applying a downward-oriented magnetic field of 200 oersteds as the bias field.

At room temperature:

$$\left. \begin{array}{l} \text{(a) } Hc1 - 0.5(ab+1)Hb - Hw1(2) > 0 \\ \text{(b) } Hc3 + 0.5(ac-1)Hb - Hw3(2) > 0 \\ \text{There must also exist, in the range of} \\ \text{temperatures up to Tc2, a temperature at} \\ \text{which the following condition is satisfied:} \\ \text{(c) } Hc2 + 0.5(-a-1)Hb + Hw2(1) - Hw2(3) < 0 \end{array} \right\} \quad (4)$$

where, Hc1: coercivity of first magnetic layer
Hc2: coercivity of second magnetic layer
Hc3: coercivity of third magnetic layer
Hb: magnetic field applied during writing [Hwi(j): reversal field shift in i-th layer due to exchange coupling force between j-th layer and i-th layer
a=1: when the second layer has a compensation temperature at room temperature or higher
a=−1: when the second layer does not have a compensation temperature at room temperature or higher
b=1: when the first and second layers are both TM-rich, or both RE-rich
b=−1: in other cases
c=1: when the second and third layers are both TM-rich, or both RE-rich
c=−1: in other cases

TABLE 5

| No. | MAGNETIC LAYERS | | | COMPOSITIONS | | | | | PARAMETERS | | |
|---|---|---|---|---|---|---|---|---|---|---|---|
| | 1st | 2nd | 3rd | 1st | 2nd | 3rd | Hb | C/N | a | b | c |
| 2 | TM | TM | (RE) | $Tb_{21}Fe_{74}Co_5$ | $Dy_{19}Fe_{60}Co_{21}$ | $Tb_{29}Co_{71}$ | +350 | 45 | −1 | 1 | −1 |
| 3 | TM | RE | TM | $Tb_{21}Fe_{74}Co_5$ | $Dy_{28}Fe_{50}Co_{22}$ | $Tb_{18}Co_{82}$ | +300 | 45 | −1 | −1 | −1 |
| 4 | TM | RE | (RE) | $Tb_{15}Dy_6Fe_{73}Co_6$ | $Dy_{28}Fe_{50}Co_{22}$ | $Tb_{29}Co_{71}$ | −250 | 44 | −1 | −1 | 1 |
| 5 | TM | (RE) | TM | $Tb_{21}Fe_{79}$ | $Gd_{13}Dy_{15}Fe_{57}Co_{15}$ | $Tb_{19}Co_{81}$ | −300 | 39 | 1 | −1 | −1 |
| 6 | TM | (RE) | RE | $Dy_{20}Fe_{70}Co_{10}$ | $Gd_{13}Dy_{15}Fe_{57}Co_{15}$ | $Tb_{30}Co_{70}$ | +350 | 46 | 1 | −1 | 1 |
| 7 | TM | (RE) | (RE) | $Tb_{21}Fe_{79}$ | $Dy_{26}Fe_{52}Co_{22}$ | $Tb_{29}Co_{71}$ | +400 | 41 | 1 | −1 | 1 |
| 8 | TM | (RE) | (RE) | $Tb_{21}Fe_{74}Co_5$ | $Gd_{17}Tb_9Fe_{67}Co_{10}$ | $Tb_{29}Co_{71}$ | +350 | 44 | 1 | −1 | 1 |
| 9 | (RE) | (RE) | (RE) | $Tb_{23}Fe_{73}Co_4$ | $Gd_{18}Dy_{10}Fe_{62}Co_{10}$ | $Tb_{29}Co_{71}$ | +350 | 43 | 1 | 1 | 1 |
| 10 | (RE) | (RE) | RE | $Dy_{21}Fe_{69}Co_7$ | $Gd_{13}Dy_{15}Fe_{57}Co_{15}$ | $Tb_{30}Co_{70}$ | +350 | 43 | 1 | 1 | 1 |

NOTES:
TM: TM-RICH
RE: RE-RICH
Hb: BIAS FIELD (Oe) + UP; − DOWN
C/N: CARRIER-TO-NOISE RATIO (dB)

Figure 8:
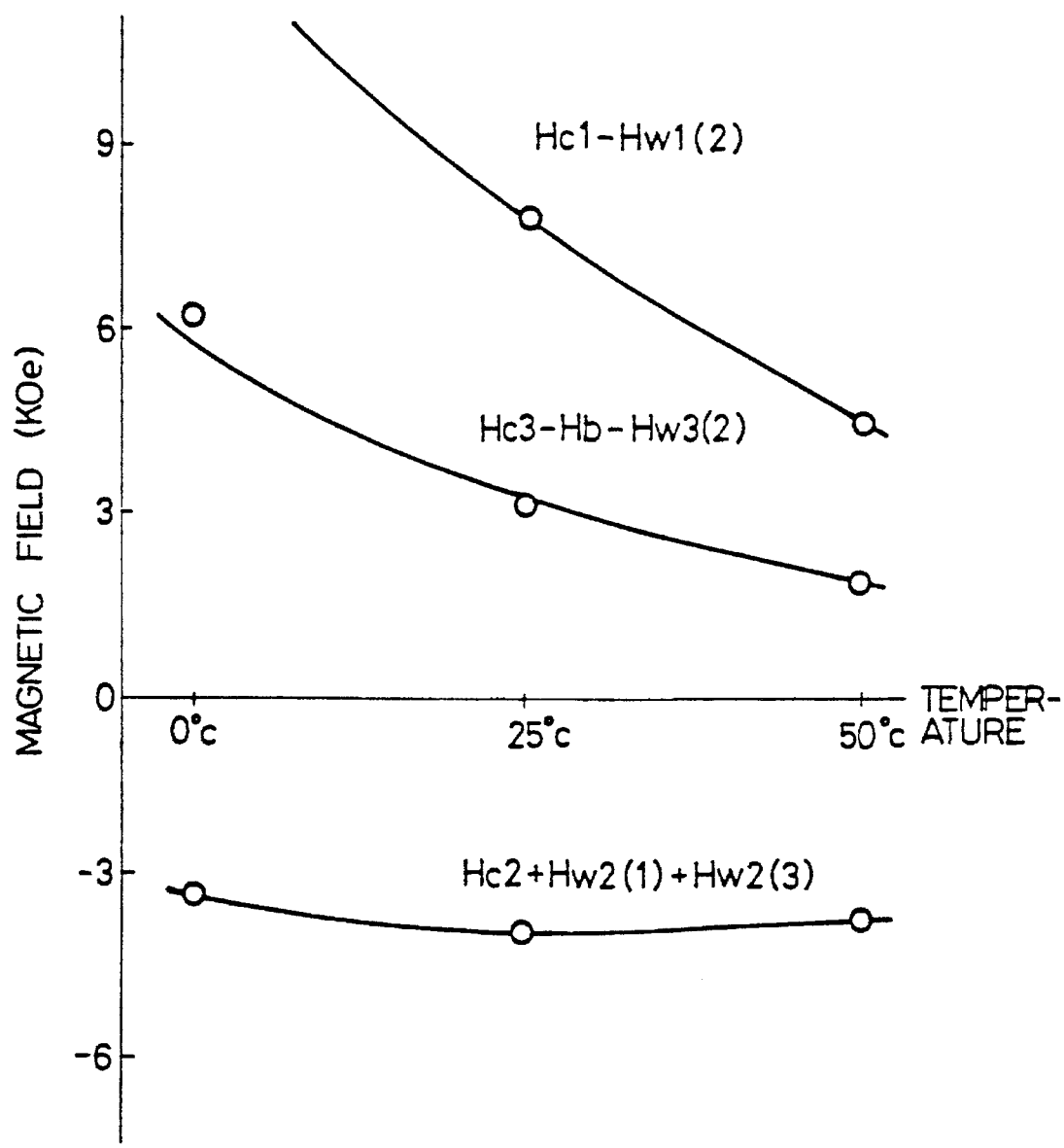
FIG. 8 is an illustrative drawing showing the possibility of overwriting in a room-temperature environment.

FIG. 8 shows the results (marked with circles) of measurements of the quantities on the left sides of equations (1) to (3) made in the vicinity of room temperature. These results indicate that overwriting is possible in the temperature range from 0° C. to 50° C.

In the embodiments shown above the first magnetic layer 24, the second magnetic layer 25, and the third magnetic layer 26 were all TM-rich, but other combinations are possible also. Table 5 lists examples for which overwriting has been confirmed. The direction of the bias field is for the case in which the third magnetic layer is magnetized in the up direction. In the column that indicates the type of each layer, the notation (RE) means that the RE sublattice is magnetically dominant at room temperature, but the TM sublattice is magnetically dominant at higher temperatures (above the compensation point).

The conditions that permit reading and writing on a three-layer overwritable recording medium like the one described above are summarized as follows.

Figure 9:
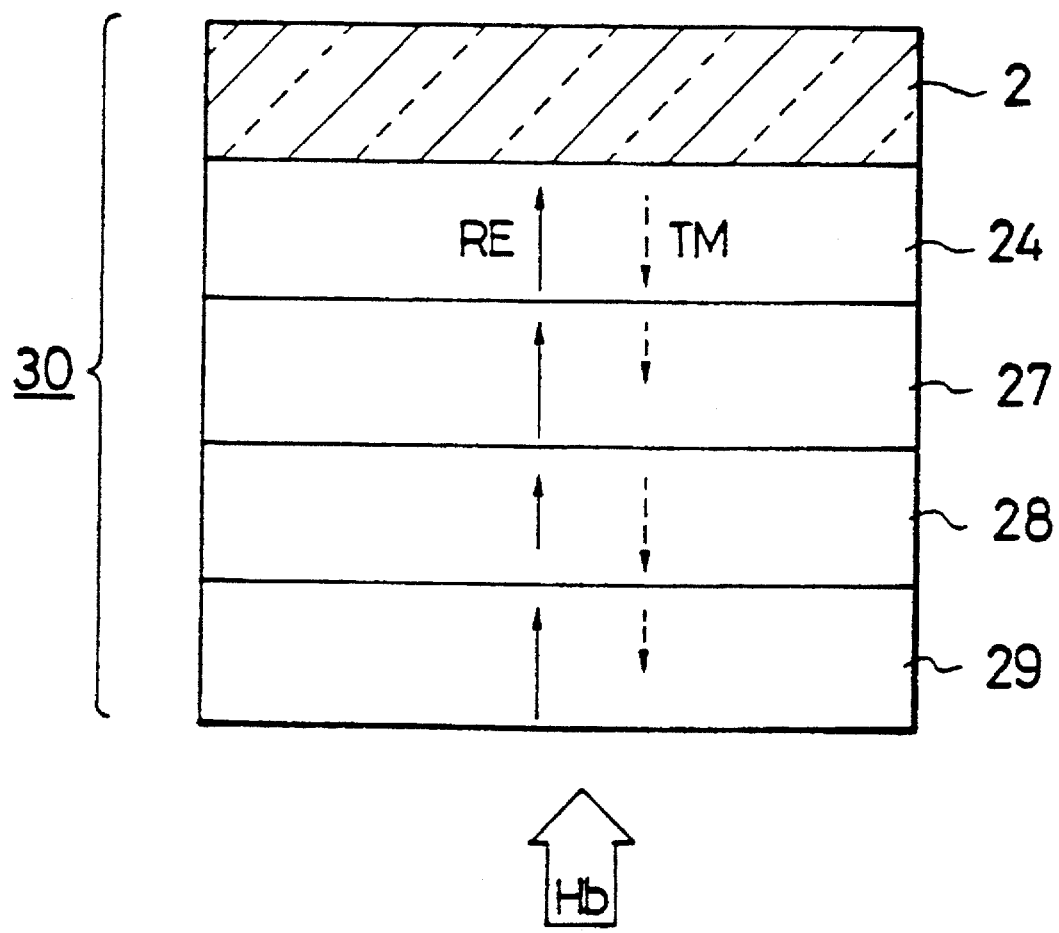
FIG. 9 is a drawing showing the specific structure of an inventive four-layer magneto-optic recording medium.

By providing one or more magnetic layers with lower Curie temperatures between the second magnetic layer and third magnetic layer of the above-described three-layer magneto-optic recording medium, reading and writing can be better stabilized and the C/N ratio can be improved. FIG. 9 shows a sectional view of the main parts of a magneto-optic recording medium according to this invention, in which 27, 28, and 29 denote a second magnetic layer, a third magnetic layer, and a fourth magnetic layer, respectively. The third magnetic layer is the newly added layer. The fourth magnetic layer corresponds to the third magnetic layer in a three-layer medium. The recording medium 30 is formed by a method such as sputtering on a glass substrate and has a ferrimagnetic structure such as the following:

1st magnetic layer: $Dy_{23}Fe_{68}Co_9$ 500 angstroms [compensation composition (at room temperature)],
2nd magnetic layer: $Tb_{25}Fe_{60}Co_{15}$ 700 angstroms [RE-rich]
3rd magnetic layer: $Tb_{16}Fe_{84}$ 200 angstroms [TM-rich]
4th magnetic layer: $Tb_{30}Co_{70}$ 700 angstroms [RE-rich]

Adjacent magnetic layers are coupled by an exchange force. The fourth magnetic layer 29 has a coercivity of 700 oersteds or greater at temperatures from room temperature up to substantially 300° C., and does not undergo magnetic reversal due to heating by laser illumination within the range of operating conditions. The second magnetic layer has a compensation temperature equal to or greater than room temperature. The external magnet 18 generates a magnetic field of 200 to 400 oersteds. The fourth magnetic layer 29 is initially uniformly magnetized in, for example, the up direction by a means such as exposing the recording medium 30 to a magnetic field exceeding the reversal field of the fourth magnetic layer 29. The external magnet 18 generates an upward-pointing field this time.

The temperature characteristics of the layers and the magnetic characteristics interrelating the layers are as follows:

Tc4>Tc2>Tc1>Tc3>(room temperature)

−Hw1(2)+Hc1−Hb>0 (room temperature)

Hw1(2)−Hc1−Hb>0

(reference temperature: a certain temperature between room temperature and Tc1)

hw2(3)−Hw2(1)+Hc2+Hb>0 (room temperature)

Hw3(4)−Hw3(2)−Hc3−Hb>0

(a certain temperature between Tc3 and room temperature)

−Hw4(3)+Hc4>0

(entire operating temperature range)

The operation will be explained next. In low writing, the laser output is increased over the read-out power. The area in the beam spot 6 exceeds the reference temperature but does not reach the magnetic reversal temperature (the temperature at which the coercivity becomes smaller than the external field, causing the magnetization to reverse itself to align with the external field) of the second magnetic layer 27, so time TM and RE sublattices of the second magnetics layer 27 do not change their directions of magnetization. At the reference temperature, the magnetic alignment of the second magnetic layer 27 is transferred to the first magnetic layer 24, causing the magnetic alignment of the TM sublattice of the first magnetic layer 24 to point downward as shown at (1) in FIG. 10. At the reference temperature, the first magnetic layer is TM-rich. The third magnetic layer 28 and the fourth magnetic layer 29 make no special contribution to this operation. Even if the third magnetic layer 28 loses its magnetization, it will be remagnetized in the same fixed direction by "the exchange force coupling it with the fourth magnetic layer 29. After this, when time layers leave the beam spot and cool to the vicinity of room temperature, the first magnetic layer 24 returns to the compensation composition (FIG. 9).

In high writing, the temperature exceeds the magnetic reversal temperature of the second magnetic layer 27 but does not reach the magnetic reversal temperature of the fourth magnetic layer 29. The first and third magnetic layers lose their magnetizations, but the magnetic alignments of the sublattices of the fourth magnetic layer 29 do not change. Since the temperature exceeds the compensation temperature of the second magnetic layer, the second magnetic layer becomes TM-rich. [(2) in FIG. 10] At its magnetic reversal temperature, the second magnetic layer 27 is not affected by exchange forces from the first and third magnetic layers, so it is upwardly magnetized in alignment with the field of the external magnet 18; that is, its TM sublattice is also upwardly magnetized. [(3) in FIG. 10] In addition, the magnetic alignment of the second magnetic layer 27 is transferred to the first magnetic layer 24, so the TM sublattice of time first magnetic layer is also magnetized in the up direction. Since the exchange force is weakest between the first magnetic layer 24 and the second magnetic layer 27, stronger between the second magnetic layer 27 and the third magnetic layer 28, and strongest between the third magnetic layer 28 and the fourth magnetic layer 29, and since the third magnetic layer 28 is below its Curie temperature at this time, time sublattices of the third magnetic layer 28 align with the sublattices of the fourth magnetic layer 29 [(5) in FIG. 10]. When the temperature falls further and the exchange forces increase, the sublattices of the second magnetlc layer 27 are magnetically aligned via the third magnetic layer 28 with the sublattices of the fourth magnetic layer 29, thus returning to their initial state. [(6) in FIG. 10]

In this way, light-modulated direct overwriting is possible by modulating only the laser intensity. On a magneto-optic recording medium comprising a substrate with grooves spaced at 1.6 micrometers, provided with a dielectric enhancement layer on which the above-described magnetic layers were formed and to which a magnetic field of 200 oersteds had been applied, a C/N ratio of 45 dB and erasability characteristic of 40 dB or better were obtained at a linear speed of 11 m/s with a pit length of 0.76 micrometers. The laser beam was modulated between a peak power of 18 mW and a bottom power of 7 mW.

Embodiment A16

Recording media were formed by sputtering magnetic layers onto a glass substrate as in the preceding embodiment. Completely light-modulated direct overwriting is possible on any of these recording media by optimization of the writing conditions.

TABLE 6

| 1ST MAG. LAYER | 2ND MAG. LAYER | 3RD MAG. LAYER | 4TH MAG. LAYER |
|---|---|---|---|
| $Dy_{23}Fe_{68}Co_9$ 400 Å | $Tb_{25}Fe_{60}Co_{15}$ 700 Å | $Tb_{16}Fe_{84}$ 200 Å | $Tb_{30}Co_{70}$ 700 Å |
| $Dy_{23}Fe_{72}Co_5$ 500 Å | $Tb_{25}Fe_{60}Co_{15}$ 700 Å | $Tb_{16}Fe_{84}$ 200 Å | $Tb_{30}Co_{70}$ 700 Å |
| $Dy_{23}Fe_{68}Co_9$ 500 Å | $Tb_{25}Fe_{60}Co_{15}$ 700 Å | $Tb_{16}Fe_{84}$ 100 Å | $Gd_{10}Tb_{20}Co_{70}$ 1200 Å |

Figure 11:
FIGS. 11 through 91 illustrate the conditions of inventive four-layer magneto-optic recording media having layers of different compositions.
Figure 13:
Figure 14:
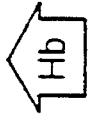
Figure 15:
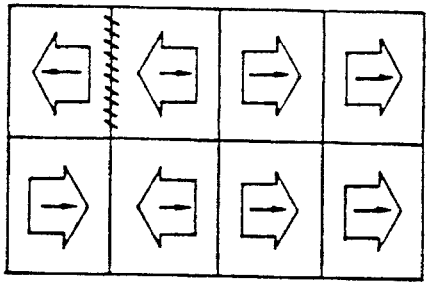
Figure 16:
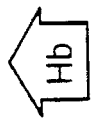
Figure 17:
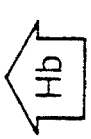
Figure 18:
Figure 19:
Figure 20:
Figure 21:
Figure 22:
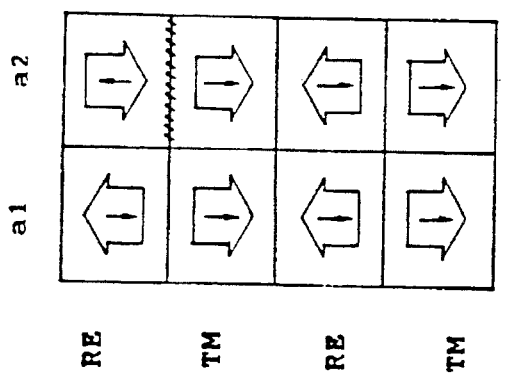
Figure 23:
Figure 24:
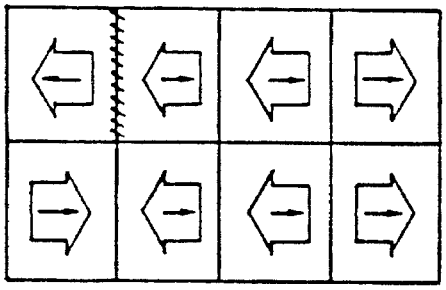
Figure 25:
Figure 26:
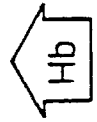
Figure 27:
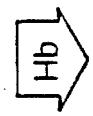
Figure 28:
Figure 29:
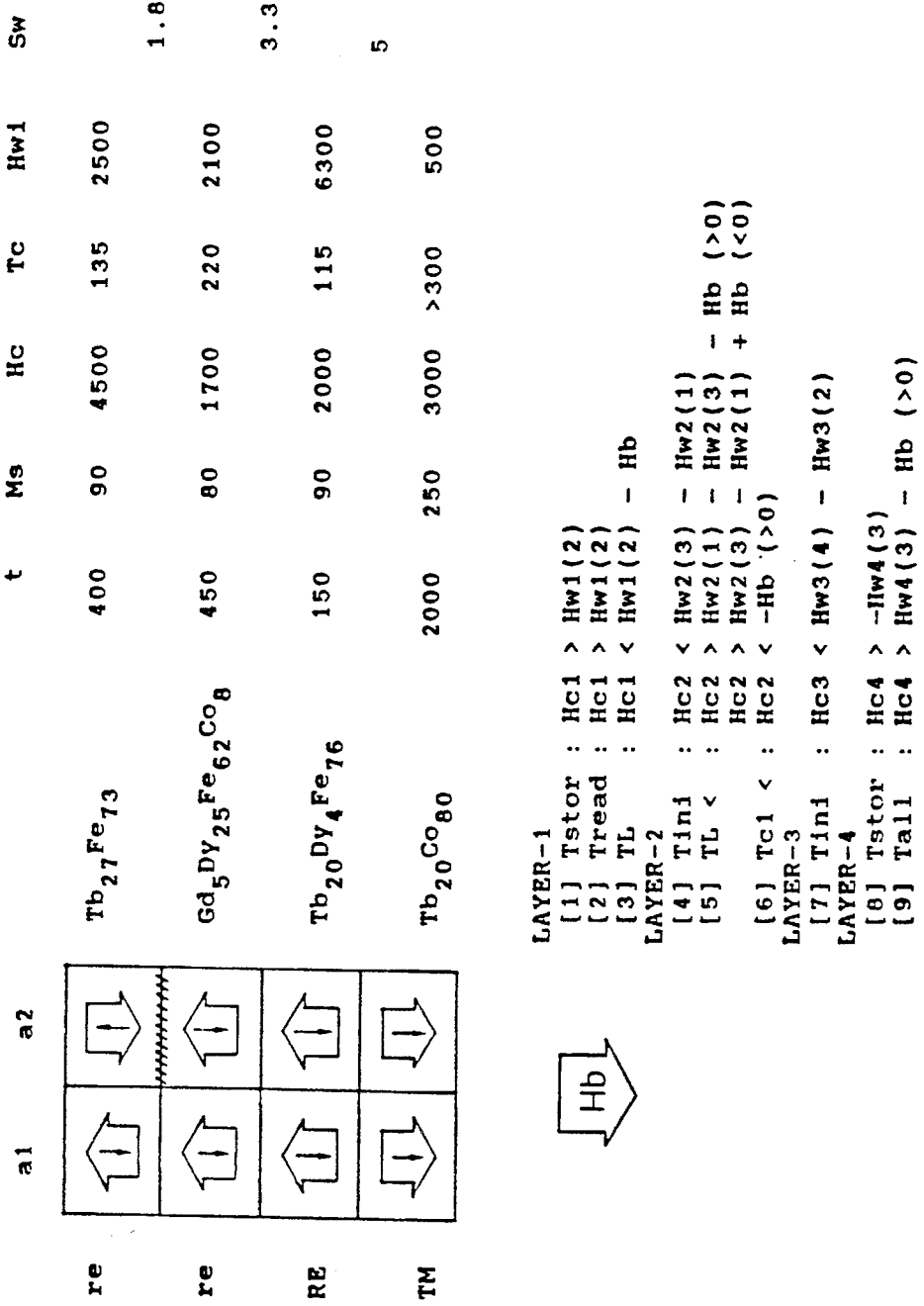
Figure 30:
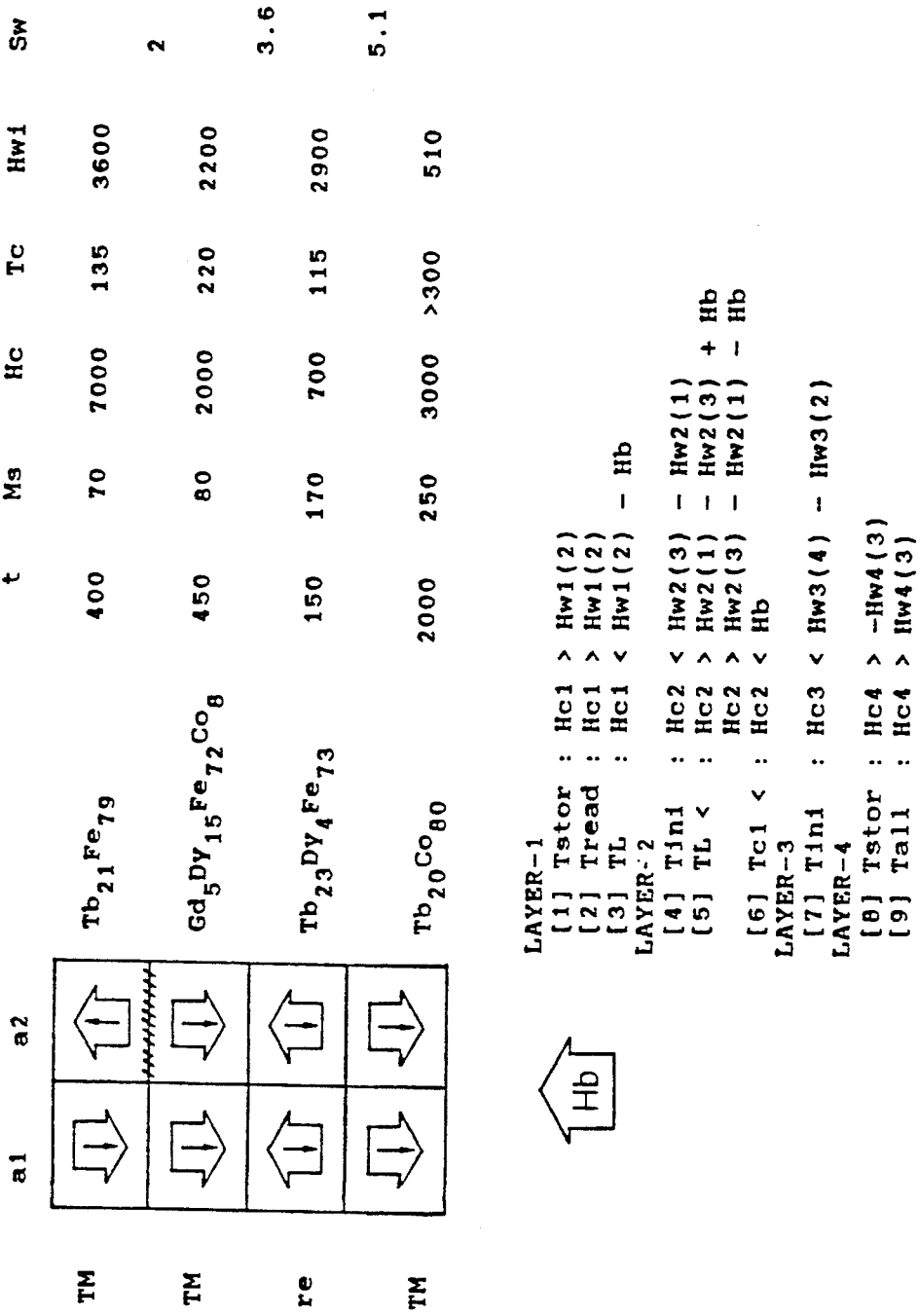
Figure 31:
Figure 33:
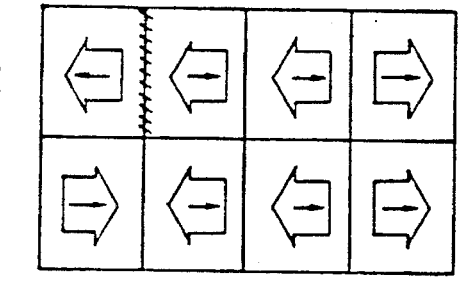
Figure 35:
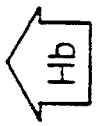
Figure 38:
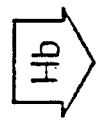
Figure 40:
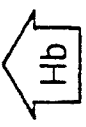
Figure 41:
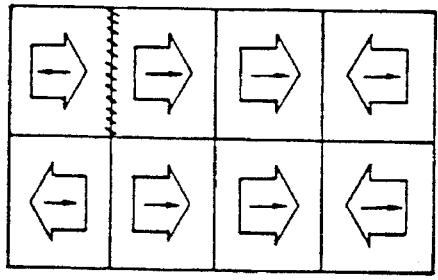
Figure 42:
Figure 43:
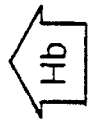
Figure 44:
Figure 45:
Figure 46:
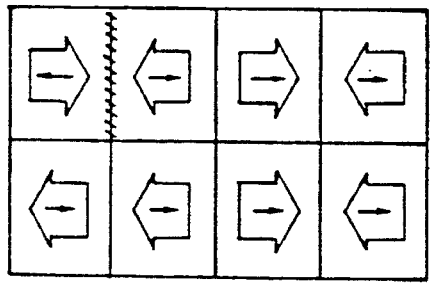
Figure 48:
Figure 49:
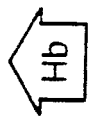
Figure 50:
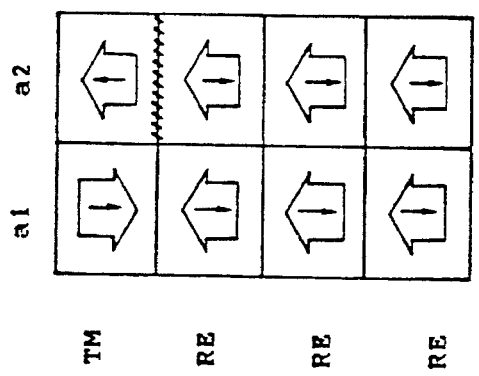
Figure 51:
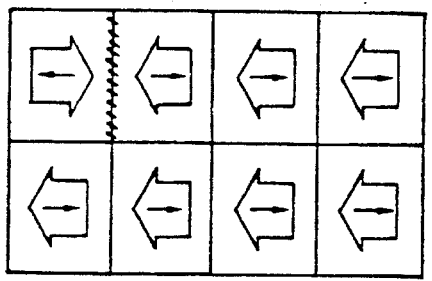
Figure 53:
Figure 54:
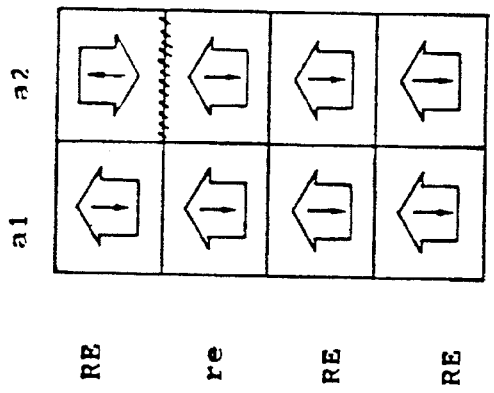
Figure 57:
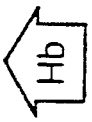
Figure 58:
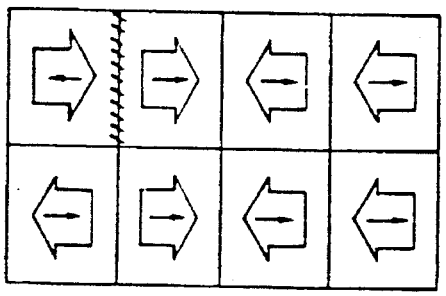
Figure 59:
Figure 60:
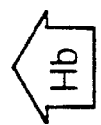
Figure 62:
Figure 63:
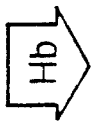
Figure 64:
Figure 65:
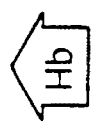
Figure 67:
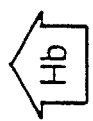
Figure 69:
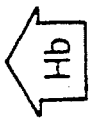
Figure 70:
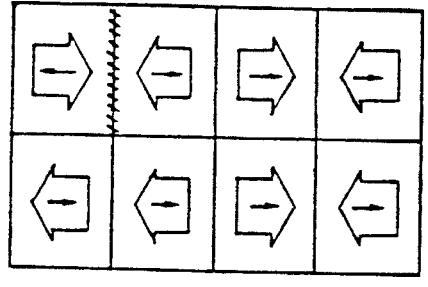
Figure 71:
Figure 72:
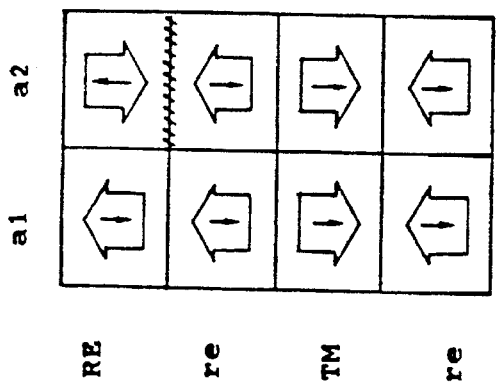
Figure 73:
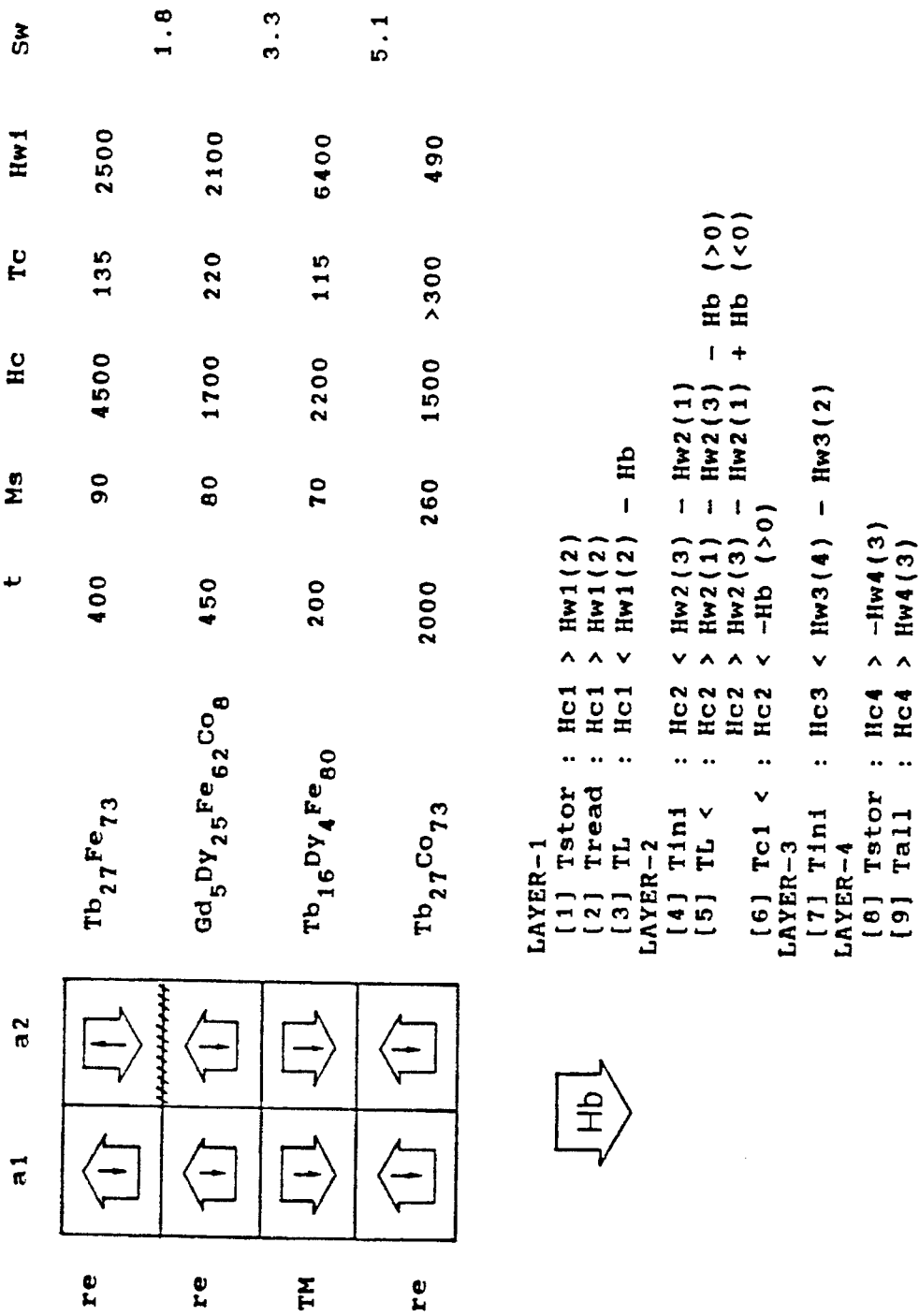
Figure 74:
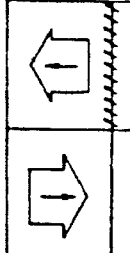
Figure 75:
Figure 76:
Figure 77:
Figure 78:
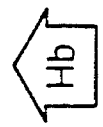
Figure 80:
Figure 81:
Figure 83:
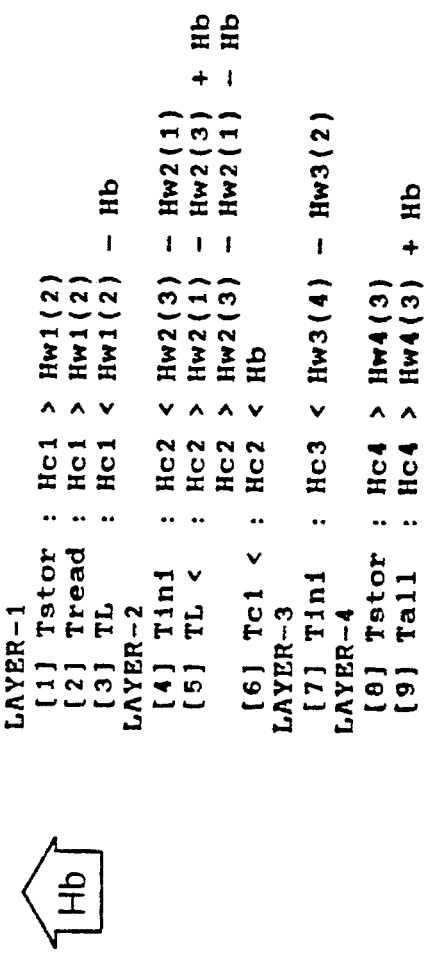
Figure 84:
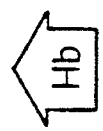
Figure 85:
Figure 86:
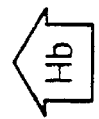
Figure 87:
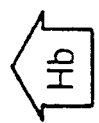
Figure 88:
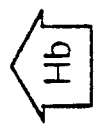
Figure 89:
Figure 91:

FIGS. 11 to 91 list all combinations of different types of layers, giving transition-metal and rare-earth-metal alloy compositions for each layer. The notation used in these drawings is defined below.

TM: a transition-metal-rich alloy of transition and rare-earth metals, not having a compensation temperature between room temperature and the Curie temperature RE: a rare-earth-rich alloy of transition and rare-earth metals, having a compensation temperature between room temperature and the Curie temperature re: a rare-earth-rich alloy of transition and rare-earth metals, not having a compensation temperature between room temperature and the Curie temperature t: thickness (angstroms)

Ms: saturation magnetic moment (emu/cc)

Hc: coercivity (oersteds)

Curie temperature (°C.)

Sw (or $\sigma_w$): interface wall energy (erg/cm$^2$)

Hwi: total exchange force exerted on the i-th layer

Hwi(j): exchange force exerted on the i-th layer by the jth layer [$\sigma_{wij}/(2|Ms_i|t_i)$]

Both i and J are counted from the substrate side.

↑: magnetic alignment of the TM sublattice

⇧: net magnetization; sum of the TM sublattice magnetization and the RE sublattice magnetization Tstor: all temperatures within the storage temperature range (ex: −10° C. to 60° C.)

Tread: all temperatures in the range form the lowest temperature during use to the temperature reached during read-out TL: a temperature higher than the reading temperature but lower than Tc1, at which transfer of the magnetic alignment of the second magnetic layer to the first magnetic layer occurs Tini: all temperatures under the temperature conditions during use (or the temperature at a certain location not illuminated by the laser beam, provided for initialization)

Tall: all temperatures in the operating temperature range (0° C. and above)

Tuse: the operating temperatures of the driving apparatus (0° C. to 50° C.)

In each drawing, a1 indicates the state in which "0" information is recorded, and a2 indicates the state in which "1" information is recorded. In the a2 state, cross-hatching indicates a magnetic wall.

Next the structure of another overwritable 3-layer magneto-optic recording medium will be described. The Curie temperatures of the layers and their magnetic properties are interrelated as follows.

$$Tc1 < Tc2 \quad [1]$$

$$Tc3 < Tc2 \quad [2]$$

$$Hc1 - Hw1(2) > 0 \text{ (room temperature)} \quad [3]$$

$$Hc2 + Hw2(1) - Hw2(3) < 0 \quad [4]$$

(at a certain temperature between room temperature and Tc3)

$$Hc3 - Hw3(2) > 0 \text{ (room temperature)} \quad [5]$$

Figure 92A:
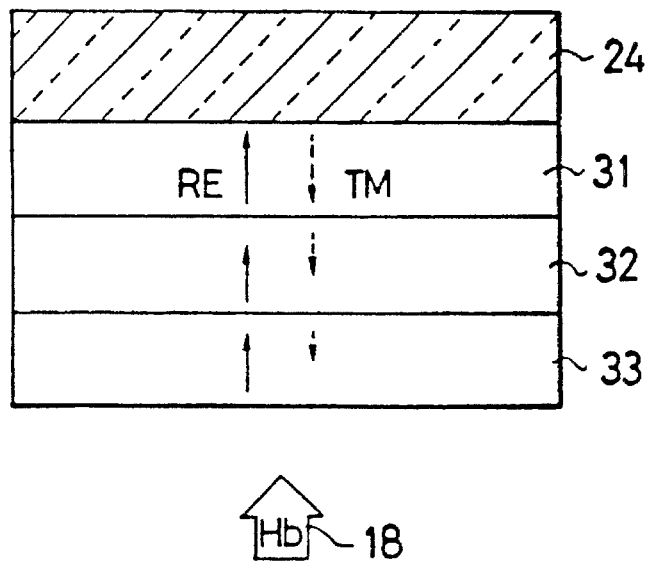
FIG. 92 (a) is a drawing showing the specific structure of another inventive three-layer magneto-optic recording medium, and (b) is an illustrative drawing showing the relationship of the temperature and saturation magnetization in the different layers.
Figure 92B:
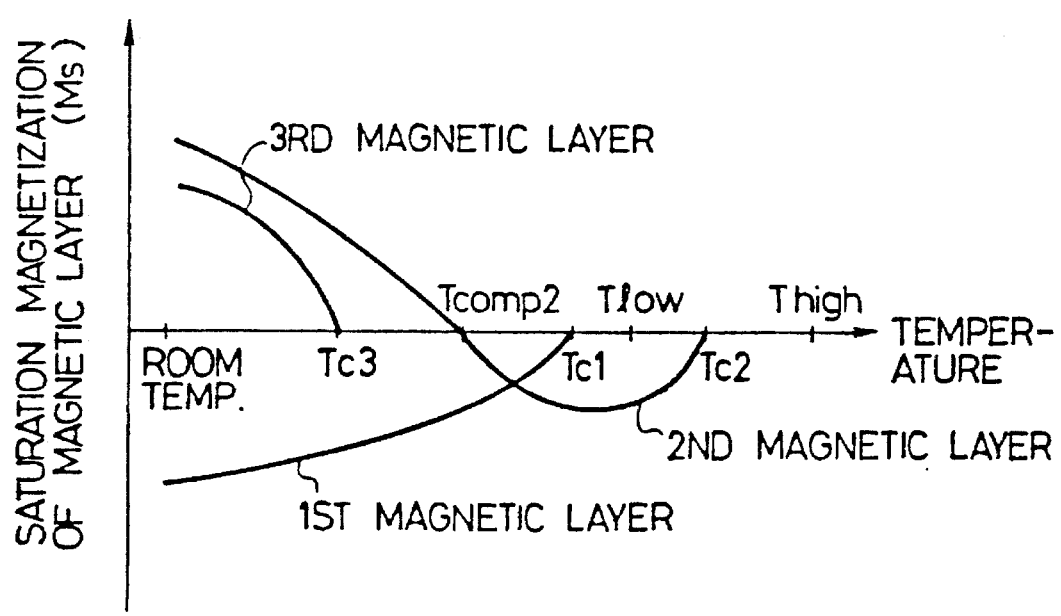

FIG. 92 (a) shows an embodiment of a three-layer magneto-optic recording medium having these relationships. In the drawing, 31 is a first magnetic layer of $Tb_{23}(Fe_{92}Co_8)_{77}$, 32 is a second magnetic layer of $Tb_{26}(Fe_{85}Co_{15})_{74}$, and 33 is a third magnetic layer of $Tb_{26}Fe_{74}$. The second magnetic layer 32 has a compensation point higher than room temperature as shown in FIG. 92 (b).

Next the overwriting operation will be described. The third magnetic layer 33 is uniformly magnetized ahead of time in the up direction, as can easily be done by using an electromagnet to generate a magnetic field of substantially 20,000 oersteds, for example. The third magnetic layer 33 which has thus been magnetized in the up direction may be heated by illumination by the beam spot to a temperature above its Curie temperature Tc3, and may lose its magnetization, but when it cools it will again be magnetized in the up direction by the effect of the bias magnetic field Hb. While cooling, it may also be affected by an exchange force Hw from the second magnetic layer 32, but since $$Hc3 + Hb > Hw3(2) \quad [6]$$

the third magnetic layer 33 retains its upward magnetization until it cools to room temperature. (Note that the Hc3 and Hw3 in equation [6] are not the room-temperature values given in equations [3] and [5], but values below a temperature at which the magnetization of the third magnetic layer becomes fixed during cooling; hence equation [6] is satisfied at all temperatures during cooling.) Thus the magnetic alignment of the third magnetic layer 33 is always upward, except when illuminated by the laser spot.

The exchange force Hw2(3) from the third magnetic layer 33, which is always magnetized in the up direction as shown above, and the bias magnetic field 1b act to align the magnetization of the second magnetic layer 32 in the up direction. From equation [5], these forces outweigh the exchange force Hw2(1) from the first magnetic layer 31 and the coercivity Hc2, which may try to align the magnetization of the second magnetic layer 32 in the down direction, so the second magnetic layer 32 is magnetized in the up direction. This is referred to as initialization of the second magnetic layer 32.

The above argument assumes that the bias magnetic field 1b acts on the recording medium at room temperature. This state is attained in parts of the recording medium that are disposed directly above the bias magnetic field but are not illuminated by the beam spot. In an actual read-write apparatus, the laser spot will be centered in the region influenced by the bias magnetic field 1b, so the second magnetic layer will be initialized immediately before and immediately after writing. For that reason, the second magnetic layer 32, like the third magnetic layer 33, will always be magnetized in the up direction, except where illuminated by the laser spot.

Next the writing of "1" information by magnetizing the first magnetic layer 31 in the up direction will be explained. The laser power at this time is R1, and the temperature in the beam spot rises to Thigh in FIG. 92.

A temperature is therefore attained that exceeds the Curie temperature Tc1 of the first magnetic layer 31, and is close to or higher than Tc2, the temperature at which the coercivity of the second magnetic layer 32 becomes less than Hb. The result is that the first magnetic layer 31 loses its magnetization in the beam spot [(1) in FIG. 93], and the up-oriented bias magnetic field Hb aligns the magnetization of the TM sublattice of the second magnetic layer 32, which is TM-rich because it is above its compensation temperature, in the up direction [(2) in FIG. 93]. When the temperature of the first magnetic layer 31 falls below the Curie temperature Tc1, the magnetic alignment of the second magnetic layer 32 is transferred by exchange force to the first magnetic layer 31, so the TM sublattice of the first magnetic layer 31 is magnetized in the up direction, corresponding to the information "1" [(3) in FIG. 93]. When the temperature falls further and goes below the Curie temperature Tc3, the net magnetization of the sublattices of the third magnetic layer is forced by the bias magnetic field Hb to the up direction (the RE sublattice being magnetized in the up direction). At this temperature the second magnetic layer is below its compensation temperature and is RE-rich, hence the net sublattice magnetization of the second magnetic layer is changed by the exchange force and bias magnetic field Hb to the up direction as explained before. [(4) in FIG. 93]

Next the writing of a "0" to orient the magnetization of the first magnetic layer 31 in the down direction will be explained. In this case, the laser power is R0, and the temperature in the beam spot rises to Tlow in FIG. 92. The temperature in the beam spot is thus close to the Curie temperature Tc1 of the first magnetic layer 31 and far below the Curie temperature Tc2 of the second magnetic layer 32. The first magnetic layer 31 therefore loses its magnetization, or becomes unstable. When cooling begins, the sublattice magnetic alignments of the second magnetic layer 32 are transferred to the first magnetic layer, causing the magnetization of the TM sublattice of the first magnetic layer 31 to be directed downward, corresponding to "0" information as at (5) in FIG. 93. Further cooling proceeds as explained in the writing of a "1," leading to the state at (6) in FIG. 93. The operations described above enable new data to be overwritten on old in real time just by modulating the laser power according to the binary "0" and "1" values.

Favorable overwriting is also possible if a fourth magnetic layer is provided between the second magnetic layer 32 and the third magnetic layer 33 of the three-layer magneto-optic recording medium described above. In this case, the Curie temperature Tc4 of the fourth magnetic layer must be lower than the Curie temperature of the third magnetic layer. $Dy_{23}Fe_{77}$ (t=500 angstroms), for example, can advantageously be used as the fourth layer.

At room temperature, this magneto-optic medium satisfies the following conditions:

$$Hc1>Hw1(2) \tag{1}$$

$$Hc3>Hw3(4) \tag{2}$$

There is furthermore a temperature between room temperature and Tc4 at which the following conditions are satisfied:

$$Hc2<Hw3(4)-Hw2(1) \tag{3}$$

$$Hc4<Hw4(3)-Hw4(2) \tag{4}$$

The addition of this fourth magnetic layer facilitates magnetization of the third magnetic layer by the bias magnetic field when the third magnetic layer cools. The reason is that when the third magnetic layer is magnetized by the bias magnetic field, the exchange force exerted by the second magnetic layer opposes the bias field. The temperature Td at which the magnetization of the third magnetic layer becomes fixed is slightly lower than Tc3. If the fourth magnetic layer has a Curie temperature satisfying the condition $$Tc3>Td>Tc4,$$

then at the temperature Td at which the magnetization of the third layer is fixed, the fourth magnetic layer is not magnetized, so the exchange force from the second magnetic layer does not act on the third magnetic layer, hence the third magnetic layer can more easily align itself with the bias magnetic field.

After that, the sublattice magnetic alignments of the third magnetic layer are, by equation [4], transferred to the fourth magnetic layer, and the sublattice magnetic alignments of the fourth magnetic layer are, by equation [3], transferred to the second layer. Thus the second magnetic layer is initialized as described earlier.

The specific overwriting procedure is exactly the same as described earlier.

In all of the preceding embodiments it is important to control the exchange forces between the magnetic layers. For this purpose, interface control layers may be inserted between the magnetic layers. For example, in a two-layer medium, ferrimagnetic layers of the following compositions were sputtered onto a glass substrate, in the following order.

| 1st magnetic layer: | $Tb_{23}Fe_{72}Co_5$ | 500 angstroms |
| --- | --- | --- |
| Interface control layer: | $Tb_{26}Fe_{70}Co_4$ | 50 angstroms |
| 2nd magnetic layer: | $Tb_{30}Fe_{70}$ | 1500 angstroms |

The interface control layer was formed by increasing the argon gas pressure by a factor of about six in the sputtering process. This medium showed good overwriting characteristics at a linear speed of 6 m/s with a peak power of 9 mW to 17 mW, a bottom power of 4 mW to 7.5 mW, and a bias field of 300±80 oersteds.

In a medium with four magnetic layers, the following ferrimagnetic layers and dielectric layer were formed by sputtering on a glass substrate:

| 1st magnetic layer: | $Dy_{23}Fe_{68}Co_9$ | 500 angstroms |
| --- | --- | --- |
| Interface control layer: | $SiN_x$ | 10 angstroms |
| 2nd magnetic layer: | $Gd_{13}Dy_{12}Fe_{60}Co_{15}$ | 1200 angstroms |
| 3rd magnetic layer: | $TbFe_{84}$ | 200 angstroms |
| 4th magnetic layer: | $Tb_{30}Co_{70}$ | 700 angstroms |

Adjacent magnetic layers, including the layers separated by the interface control layer, are coupled by exchange forces as before. This medium showed good overwriting characteristics at a linear speed of 11 m/s with a bias magnetic field of 200 oersteds, when the laser power was modulated between a peak power of 18 mW and bottom power of 7 mW.

The following, which include the above, can be used as the interface control layer.

1. The interface control layer can be formed by increasing the pressure of the gas used in the sputtering of the normal magnetic layers by a factor of five or more.
2. A dielectric comprising a nitride such as SiN or AlN, or an oxide such as $SiO_x$ can be used.
3. The normal magnetic layers can be formed by neutral sputtering using only argon. An interface control layer can be formed by reactive sputtering with admixture of a reactive gas such as oxygen or nitrogen.
4. A rare-earth (RE)—transition-metal (TM) layer in which the RE component is 30 at % or greater can be formed under the normal sputtering gas pressure.
5. A non-magnetic metal such as Al or Cu can be used.
6. A magnetic layer with an axis of easy magnetization oriented in the plane of the disk can be used.

An interface control layer can be formed by methods such as the above, but methods other than the methods shown here can also be used as long as they permit control of the exchange coupling force.

Interface control layers that to not contribute to the essential operation can be added to a two-layer, three-layer, or four-layer medium, between any of the magnetic layers.

Figure 94:
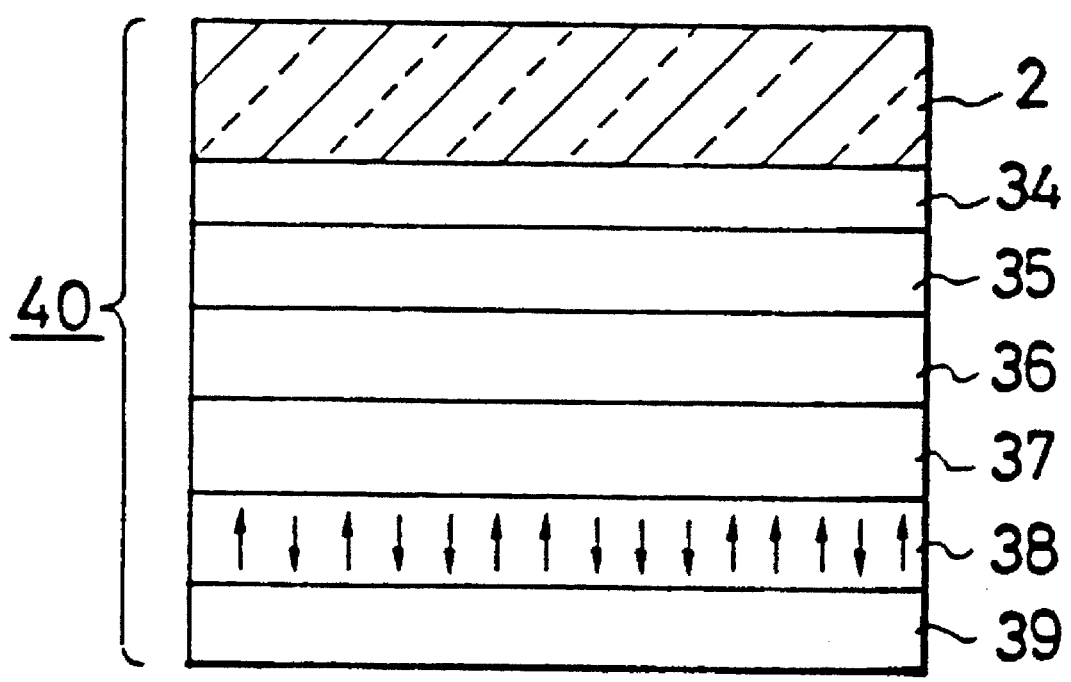
FIG. 94 is a drawing showing the specific structure of an inventive four-layer magneto-optic recording medium before initialization.

Magneto-optic recording media that are overwritable even without an initializing magnet have been described above. Next, methods of manufacturing such recording media will be described, taking a four-layer recording medium as an example. With reference to FIG. 94, after a layer of $SiN_x$ is sputtered onto a polycarbonate substrate 2 with a diameter of 130 mm as a dielectric layer 34, a first layer 35, a second layer 36, a third layer 37, and a fourth layer 38 are formed by sputtering in the same way, and finally a protective layer 39 is formed.

In this case, the magnetic domains of the fourth layer 38, which is the initializing layer, are left with random alignments.

Figure 95A:
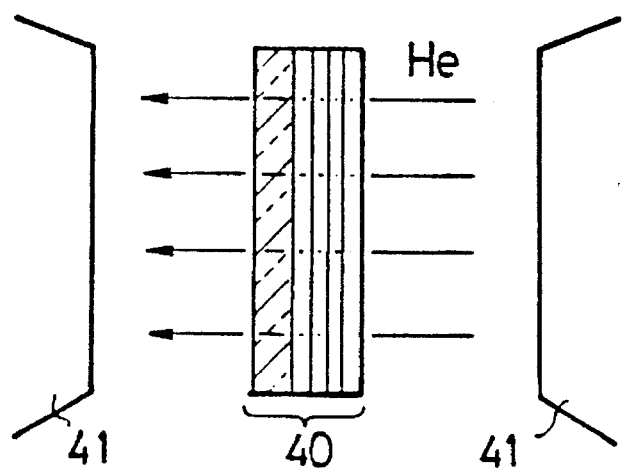
FIG. 95 (a) illustrates a method of initialization, and (b) shows the structure after the initialized layers are joined.
Figure 95B:
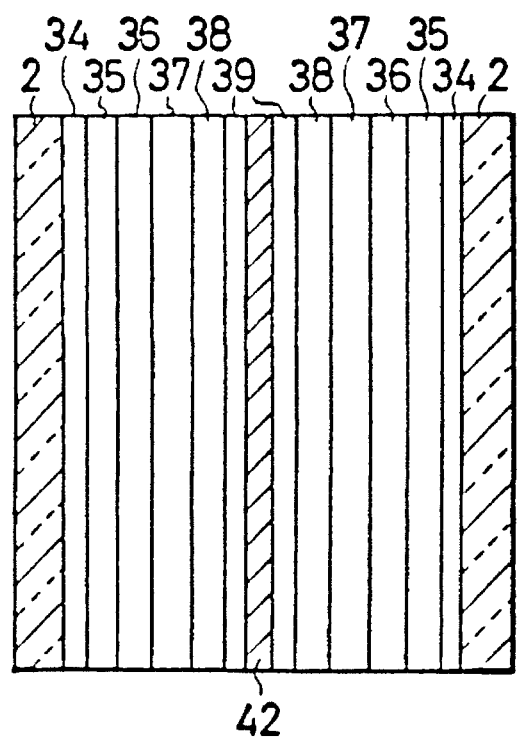

It is therefore necessary to align the magnetization of the fourth layer 38 in one direction. A first method can be considered as illustrated at (a) and (b) in FIG. 95. In the drawing, 41 is a initial magnetic field applying means, and 42 is an adhesive layer.

Before joining of the halves, a magnetic field He exceeding the room-temperature coercivity Hc4 of the fourth layer 38 is applied to align the magnetization of the fourth layer 38. Then an adhesive layer is formed comprising an epoxy or hot-melt adhesive or the like and the halves are joined.

As a second method, the coercivities Hc4(A) and Hc4(B) of the two fourth layers (on the pair of substrates that will be joined together) are arranged so that |He(A)|>|Hc4(a)|>|Hc4(B)|, where He(A) and He(B) are magnetic fields applied by an initial magnetic field applying means.

Figure 96A:
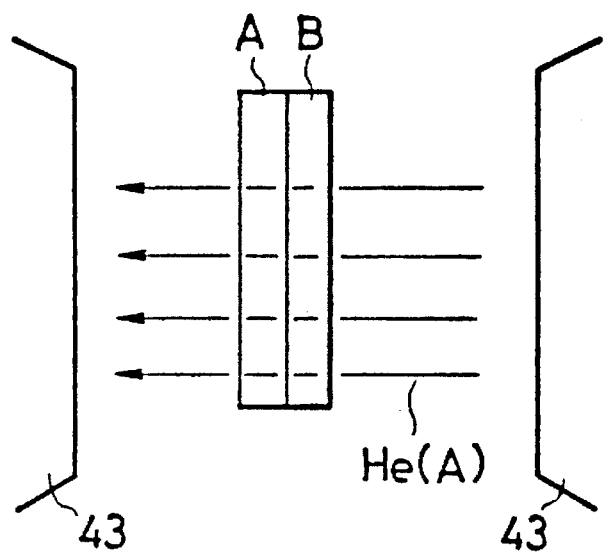
FIG. 96 illustrates another method of initialization.
Figure 96B:
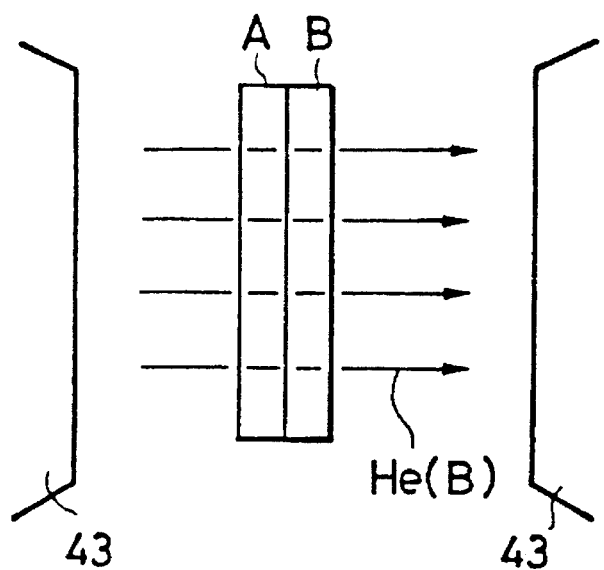
Figure 97A:
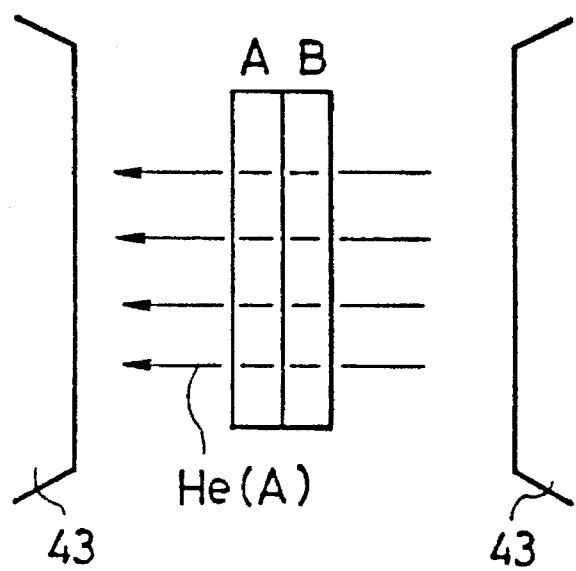
FIG. 97 illustrates yet another method of initialization.
Figure 97B:
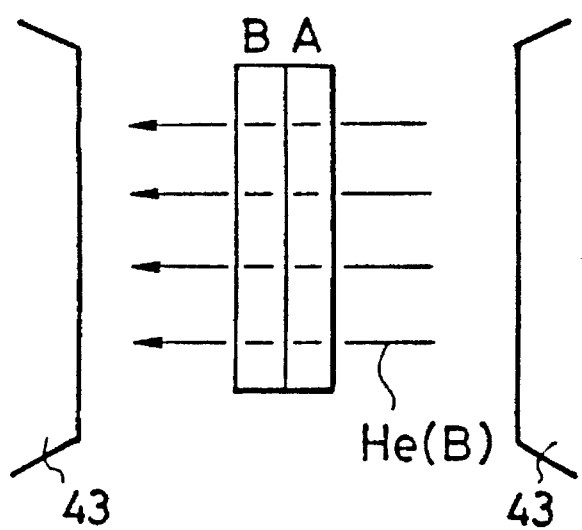
Figure 98:
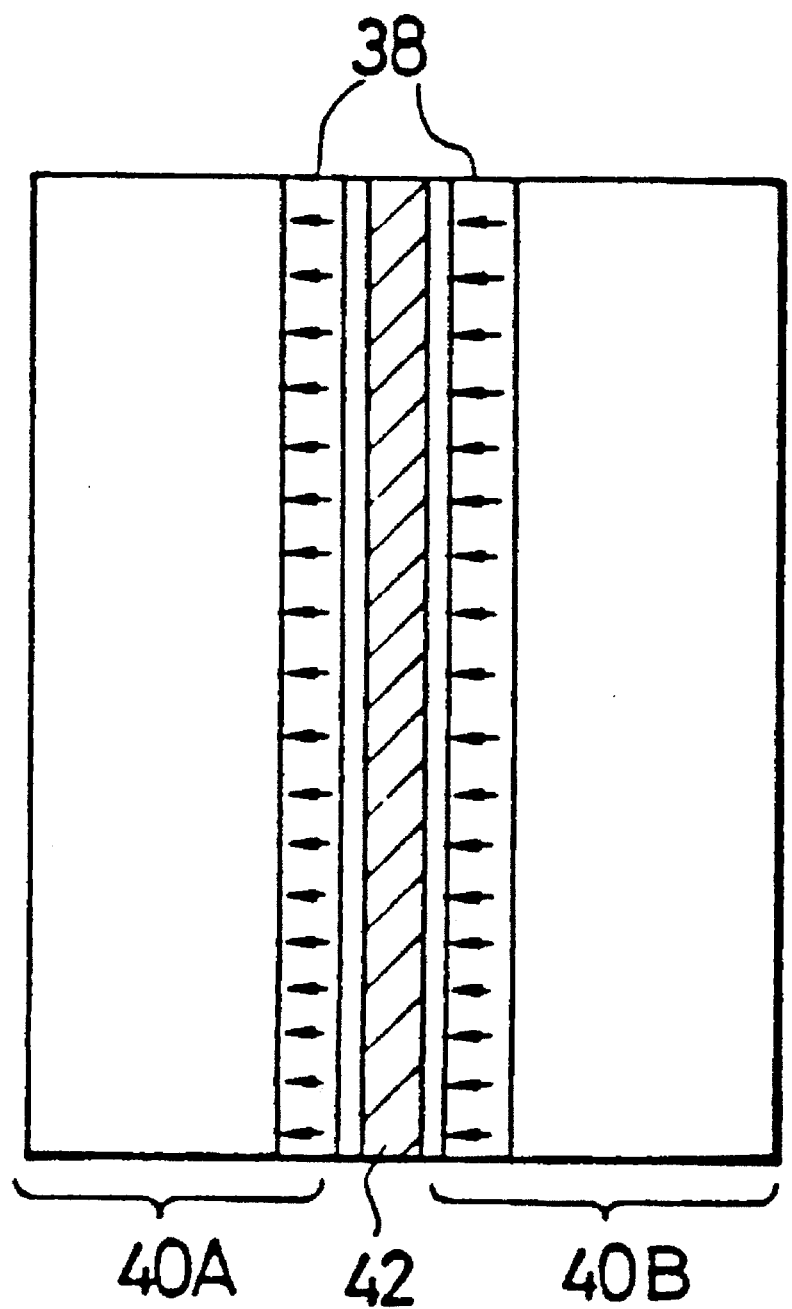
FIG. 98 shows the specific structure of a magneto-optic disk medium initialized as in FIG. 97.
Figure 101:
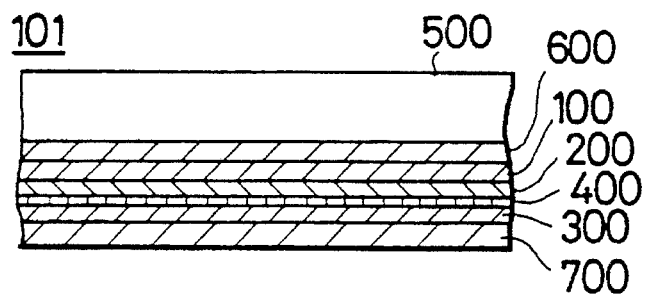
FIG. 101 shows another medium in the prior art.
Figure 102:
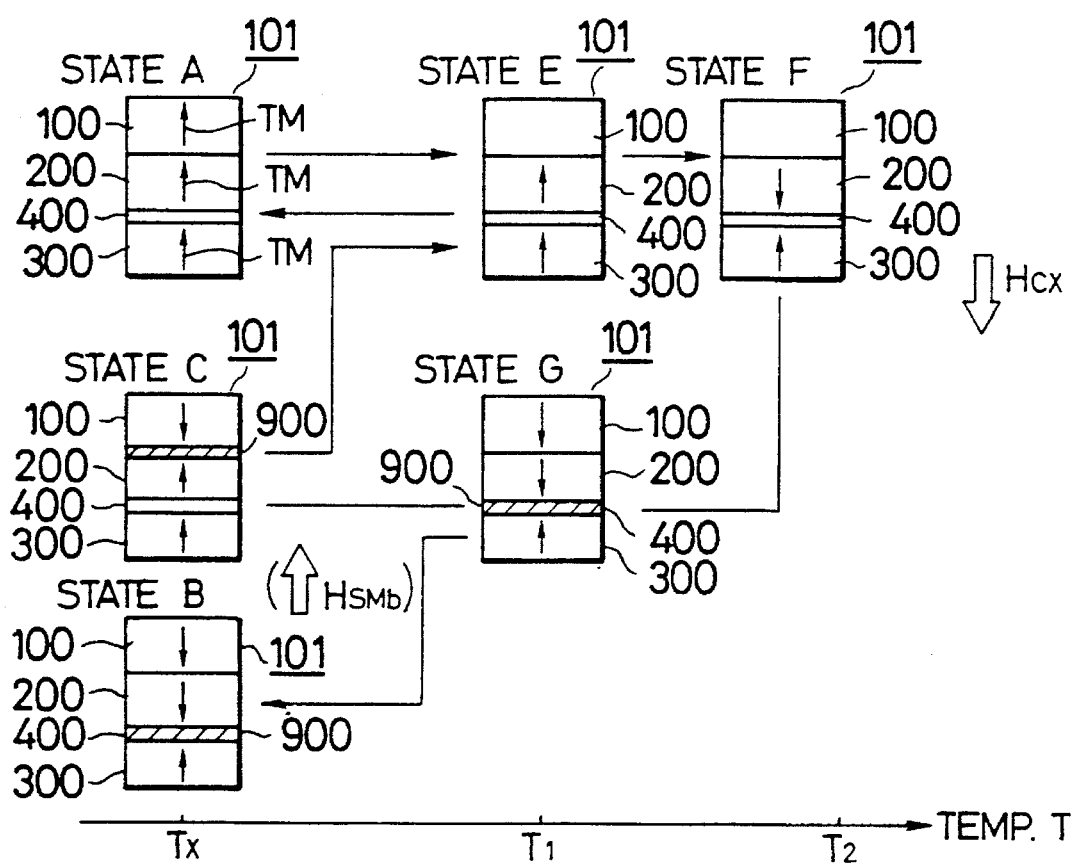
FIGS. 102 and 103 show transition between states of the medium in the prior art.
Figure 103:
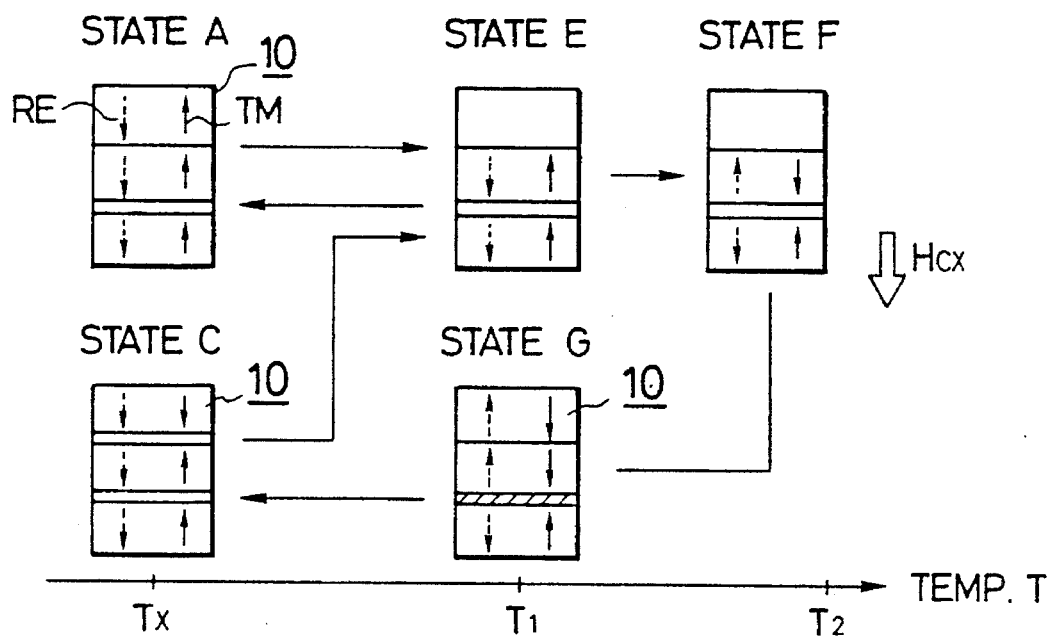
Figure 104:
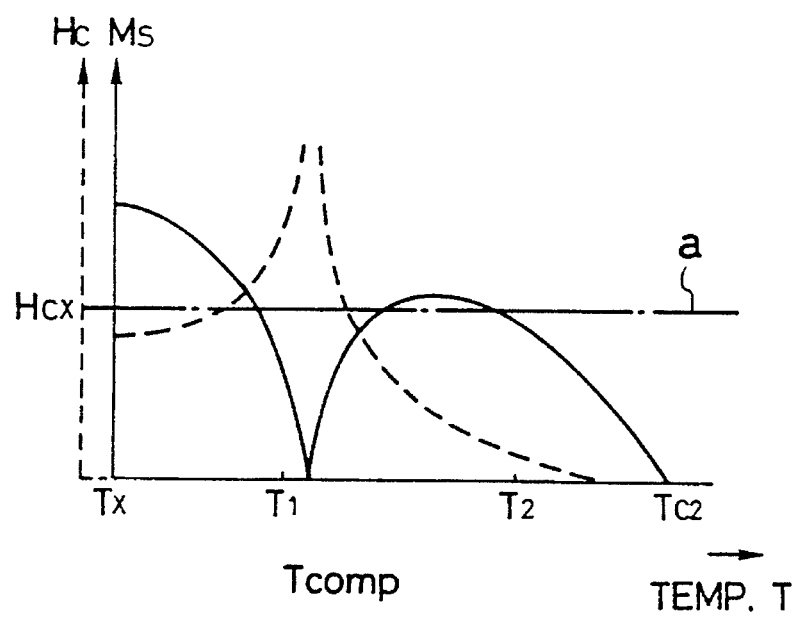
FIG. 104 shows the temperature characteristics of the magnetization and the coercivity of the second layer of the prior art medium.
Figure 105:
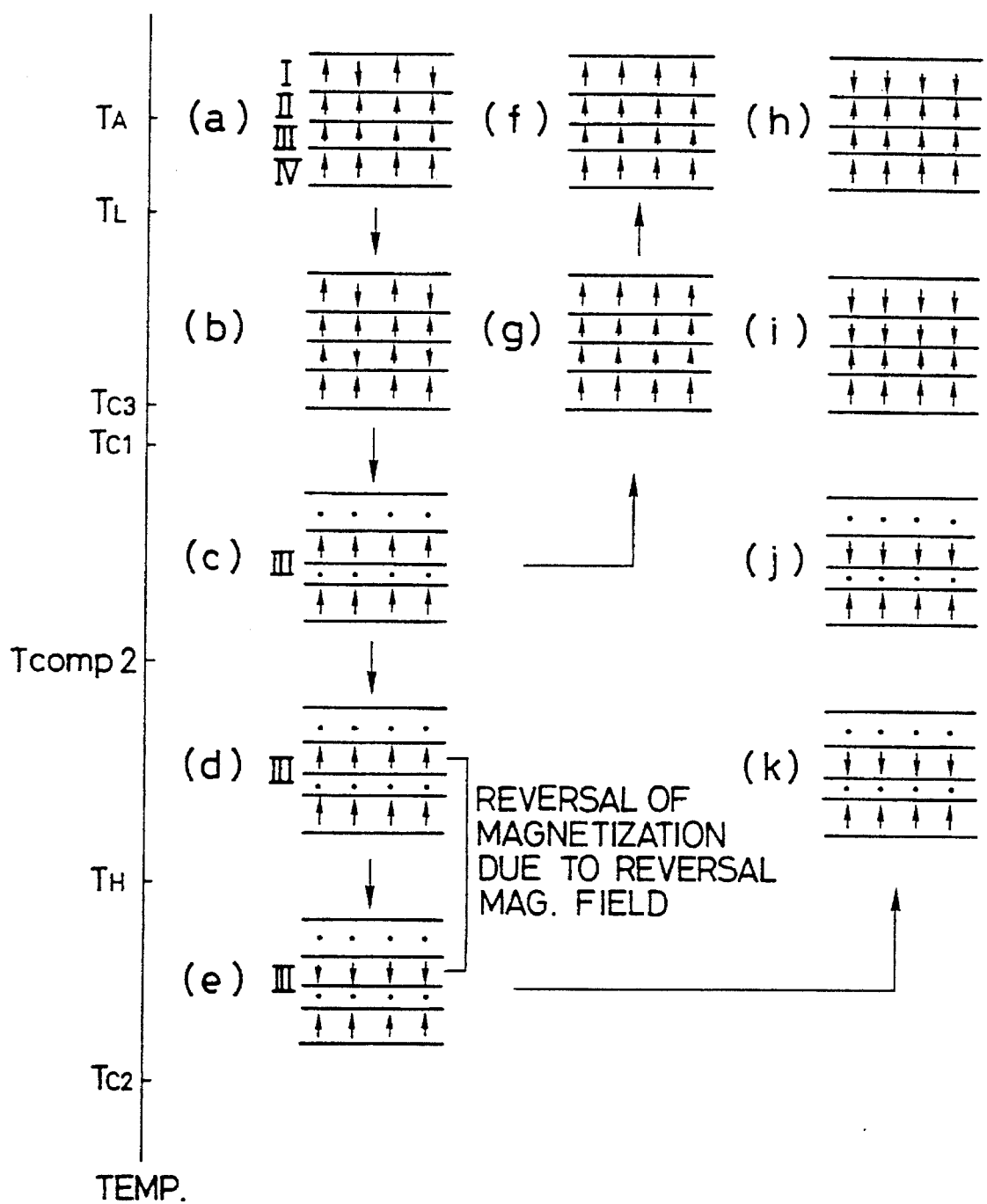
FIG. 105 is a diagram showing transition of the state responsive to the temperature of the medium in another prior art.

After such a pair of substrates has been joined together, first the magnetic field applying means 43 applies a magnetic field He(A) exceeding the Hc4(A) of the A-side of the disk to align the magnetization of the A-side initializing layer, as in (*a*) in FIG. 96. Next a magnetic field He(B) that exceeds Hc4(B) but does not exceed Hc4(A) and is oriented oppositely to He(A) is applied as at (*b*) in FIG. 96 to align the magnetization of the initializing layer on the B-side. This method of initializing the media can also be carried out by reversing the disk during the process, as illustrated at (*a*) and (*b*) in FIG. 97. FIG. 98 shows the assembled disk that has been initialized at (*a*) in FIG. 97. It is also possible for a device to detect the A- and B-sides of an assembled disk in which the fourth layers on the two sides 40A and 40B are initialized in the same direction, to change the orientation of the bias magnetic field, and to perform the final signal processing by taking account of the fact that the orientation of the bit cells is changed.

The preceding manufacturing methods have been described for a four-layer recording medium, but similar methods can be applied to three-layer and two-layer recording media.

Embodiment B1

Figure 106:
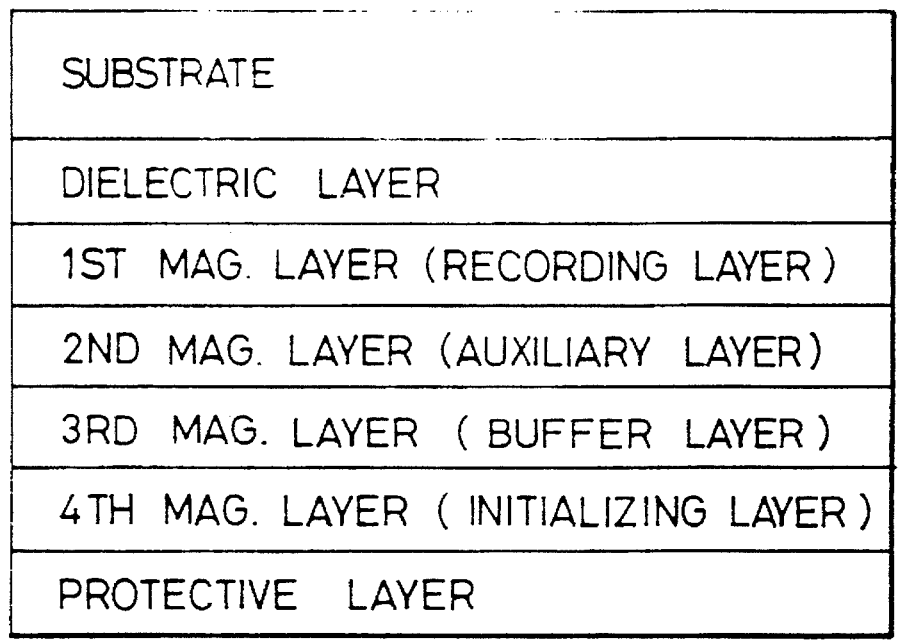
FIG. 106 shows a magneto-optic disk of another embodiment of the invention.

FIG. 106 shows a structure of a magneto-optic recording medium of another embodiment of the invention.

This recording medium comprises the following layers:

| | | |
|---|---|---|
| Dielectric layer | $SiN_x$ | 650 angstroms |
| First magnetic layer | $Tb_{22}Fe_{69}Co_9$ | 800 angstroms |
| Second magnetic layer | $Gd_8Dy_{17}Fe_{60}Co_{15}$ | 1500 angstroms |
| Third magnetic layer | $Tb_{16}Fe_{84}$ | 200 angstroms |
| Fourth magnetic layer | $Tb_{30}Co_{70}$ | 400 angstroms |
| Protective layer | $SiN_x$ | 700 angstroms |

These layers are formed on a glass substrate by sputtering or the like.

More specifically, four-element RF magnetic sputtering, apparatus is used, and an Fe target on which Tb and Co chips are disposed, an Fe target on which Gd, Dy and Co chips are disposed, an Fe target on which Tb chips are disposed, and a Co target on which Tb chips are disposed are placed in the apparatus. A glass substrate with a thickness of 1.2 mm, with a diameter of 86 mm, and with grooves of pitch of 1.6 µm having been provided in advance are set in a chamber of the apparatus.

The chamber is evacuated to $8\times10^{-7}$ Torr or a lower pressure, and Ar gas is then introduced to 3 mTorr. The sputtering was conducted at a rate of 100 angstroms/minute. In this way, a first magnetic layer of TbFeCo of 800 angstroms thick is formed. Then, with the evacuated state being maintained, a second magnetic layer of GdDyFeCo of 1500 angstroms thick, a third magnetic layer of TbFe of 200 angstroms thick, and a fourth magnetic layer of TbCo of 400 angstroms thick are formed. Each of the magnetic layers is a perpendicularly magnetized film, and the magnetic layers adjacent each other are exchange-coupled.

The first magnetic layer is a recording layer for recording information. The second magnetic layer, and the third magnetic layer do not record information in itself, but behave differently during High writing and Low writing, such that data "0" or "1" is written after the writing.

The fourth magnetic layer is an initializing layer whose sublattice magnetization is not reversed during High or Low writing. The third magnetic layer is a buffer layer for intercepting the exchange-coupling between the second magnetic layer and the fourth magnetic layer.

The operation will now be described.

[0] Initialization Process (Magnetization of the Layers at the end of Fabrication)

Figure 107:
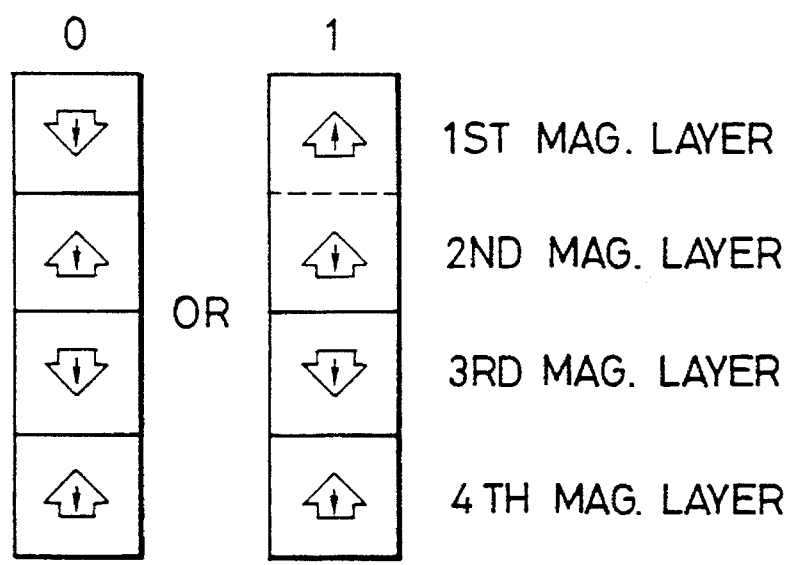

When the layers comprising the magneto-optical recording medium have been deposited, the medium is magnetized so that the transition metal sublattice magnetizations of the second magnetic layer, the third magnetic layer and the fourth magnetic layer of the recording medium are oriented downward, and that the combination of the four layers assume either of the two states out of the possible 24 states. These two states are the states in which information "1" or "0" is recorded. In FIG. 107, the blanked arrow indicates the net magnetization, and the solid line arrow indicates the transition metal sublattice magnetization, the broken line indicates presence of an interface magnetic wall between magnetic layers, and a horizontal bar indicates the state in which ferromagnetic property is lost because of a temperature rise above the Curie temperature.

As shown in FIG. 108, to orient the transition metal sublattice magnetization of the fourth magnetic layer downward, the medium is exposed to a magnetic field greater than the reversal magnetic field of the fourth magnetic layer. When the reversal magnetic field is substantially large and the magnetization of the fourth magnetic layer is difficult, the recording medium may be heated or cooled to facilitate the magnetization.

When the fourth magnetic layer is formed of a material which is TM-rich at room temperature, the medium is exposed to a downward magnetic field. When the fourth magnetic layer is formed of a material which is RE-rich at room temperature, the medium is exposed to an upward magnetic field greater than the reversal magnetic field.

Where the layers are heated above the Curie temperature of the third magnetic layer even in the case of Low writing, the third magnetic layer may be initialized to be anti-parallel with the second and fourth magnetic layers. Even so, the third magnetic layer will be magnetized to assume the state shown in FIG. 107 when either of Low writing and High writing is conducted once.

The sublattice magnetization orientation of the second magnetic layer should be the same as the sublattice magnetization orientation of the fourth magnetic layer before the recording. If the two layers are both TM rich or both RE rich, the magnetization (for initialization at the end of the fabrication) can be achieved by placing the medium in a magnetic field only once, so the magnetization is easy. Accordingly, the two layers should be both TM rich or both RE rich at room temperature. Where one of the second magnetic layer and the fourth magnetic layer is TM rich and the other of them is RE rich, the initial magnetization can achieved by placing the medium in a first magnetic field greater than the reversal field of the fourth magnetic layer and then placing a second magnetic field which is of the opposite direction and which is smaller than the reversal field of the fourth magnetic layer and greater than the reversal field of the second magnetic layer.

Reading

The operation during reading is similar to the operation described with reference to FIG. 99(*b*). That is, for the reading of information recorded in the recording layer, the recording layer is illuminated with a beam spot, and the magnetic orientation of the recording layer in the beam spot is transformed by the well-known Poler-Kerr effect to optical information, which in turn is converted to electrical signals.

Recording
[Low Writing]

Figure 110:
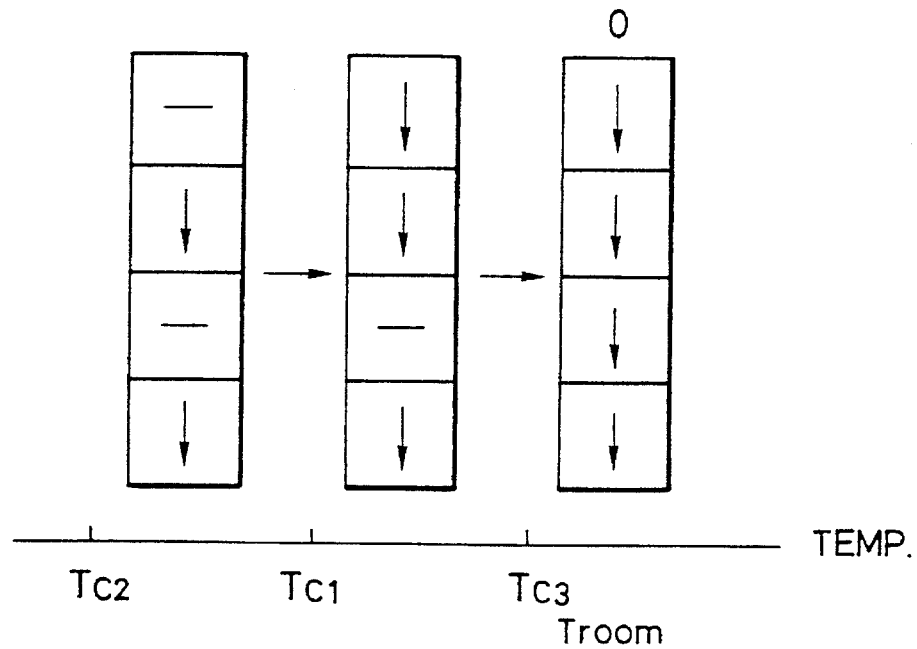
FIG. 110 explains recording operation with a low temperature.

As shown in FIG. 110, the laser beam output is higher than in reading, and the magnetic layers within the focused spot is heated to the vicinity of the Curie temperature Tc1 of the first magnetic layer, while the sublattice magnetization orientation of the second magnetic layer is not altered, and the sublattice magnetization orientation of the second magnetic layer is transferred to the first magnetic layer and the sublattice magnetization orientation of the first magnetic layer will therefore become downward.

At this time, there is no substantial contribution of the third magnetic layer and the fourth magnetic layer to the writing. Even if the magnetization of the third magnetic layer is lost once, the sublattice magnetization orientation of the fourth magnetic layer is thereafter transferred by exchange-coupling. As a result, the state "0" shown in FIG. 110 results.

Where the magnetization of the third magnetic layer is anti-parallel with the magnetization of the second magnetic layer and the fourth magnetic layer, if the layers are heated above the Curie temperature of the third magnetic layer, the magnetization of the third magnetic layer is lost during recording, so the magnetic state of the third magnetic layer just after the initialization at the end of the fabrication does not matter. This is because after the recording process is experienced once, the third magnetic layer will assume the initial state "0".

If the second magnetic layer is formed of a magnetic material having a compensation temperature lower than its Curie temperature and higher than room temperature, the direction of the bias magnetic field and the net magnetization orientation (assuming that the fourth magnetic layer is RE-rich) of the fourth magnetic layer are the same (the bias magnetic field and the TM sublattice magnetization orientation are opposite) at room temperature. If the second magnetic layer is formed of a magnetic material which does not have a compensation temperature below its Curie temperature, the direction of the bias magnetic field and the net magnetization orientation of the fourth magnetic layer are opposite (the bias magnetic field and the TM sublattice magnetization orientation are the same) at room temperature. As will be described, it has been found preferable that the second magnetic layer is formed of a magnetic material having a compensation temperature lower than its Curie temperature and higher than room temperature, and the direction of the bias magnetic field and the magnetization of the fourth magnetic layer are the same at room temperature.

[High Writing]

Figure 111:
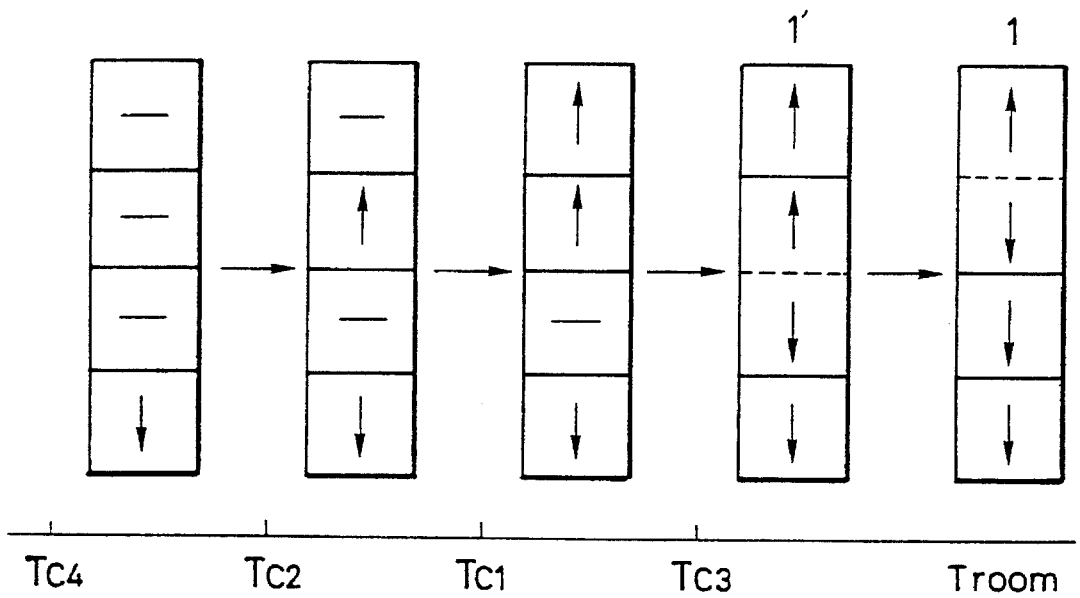
FIG. 111 explains recording operation with a high temperature.

As shown in FIG. 111, when the layers are heated to the vicinity of the Curie temperature Tc2 of the second magnetic layer, the magnetization of the first and the third magnetic layers is lost, but the RE sublattice magnetization of the fourth magnetic layer is not altered. The TM sublattice magnetization orientation of the second magnetic layer is turned upward due the bias magnetic field, without receiving the exchange-coupling from the first magnetic layer and the third magnetic layer.

When the layers are cooled below the Curie temperature Tc1 of the first magnetic layer, the magnetization of the second magnetic layer is transferred to the first magnetic layer, so its TM sublattice magnetization orientation becomes upward.

When the layers are cooled below the Curie temperature Tc3 of the third magnetic layer, the sublattice magnetization orientation of the third magnetic layer is aligned with the sublattice magnetization orientation of the fourth magnetic layer and becomes downward. When the temperature lowers further, the sublattice magnetization orientation of the second magnetic layer is aligned with the sublattice magnetization orientation of the fourth magnetic layer through the third magnetic layer and its TM sublattice magnetization orientation is turned downward to assume the initial state "1".

The fourth magnetic layer should have a high coercivity even in the vicinity of Tc2 so that reversal of magnetization will not take place even during High writing. To fulfill this requirement, the fourth magnetic layer may be formed of such a RE-rich material having a compensation temperature in the vicinity of Tc2. This is because at or near the compensation temperature, the coercivity is very high.

It is preferable that the coercivity of the second magnetic layer be small below Tc3 where the initialization takes place. In addition, it is preferable that the second magnetic layer is RE-rich below Tc3 at which the initialization occurs. This is because the condition to be satisfied is:

$$Hc2 < Hw2 + Hex$$

where the second magnetic layer is RE-rich, while the condition to be satisfied is:

$$Hc2 < Hw2 - Hex$$

where the second magnetic layer is TM-rich.

Figure 112D:
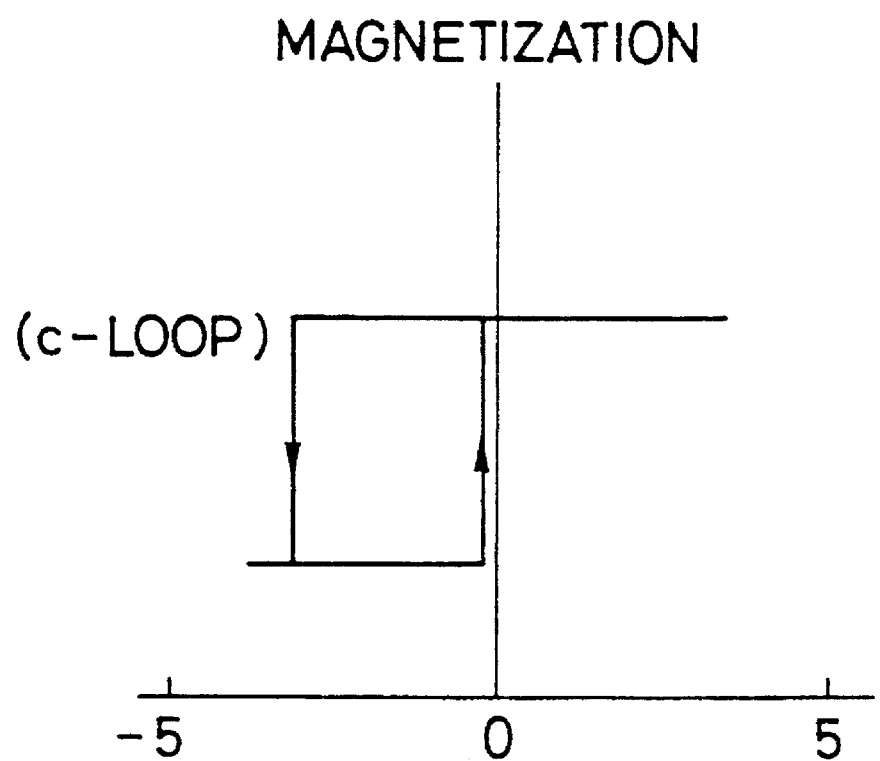
FIG. 112D shows the magnetization curve in the case of temperature in the vicinity of Tc3.

FIG. 112A shows a magnetization curve at room temperature. To facilitate the observation of the magnetization curves, FIG. 112B shows the n-loop in solid line and the c-loop in dotted line, while FIG. 112C shows the c-loop in solid line and the n-loop in dotted line. FIG. 112D shows a magnetization curve in the vicinity of Tc3.

During cooling in High writing, when the temperature falls below Tc3, the sublattice magnetization orientation of the second magnetic layer must be altered from the state "1'" to the state "1". The magnetization reversal at this time takes place where the reversal magnetic fields of the two magnetization curves (n-loop and c-loop), which relate only to the second magnetic layer, are on the same side of the bias magnetic field which is negligibly small in the scale of FIG. 112 or is substantially zero. At room temperature, c-loop is extended on both sides of the zero, while in the vicinity of Tc3 the c-loop is on one side of the zero, as shown in FIG. 112D and transition of the state from "1'" to "1" takes place.

It has been found that the coercivity of the second magnetic layer in the layered structure during initialization is smaller than the coercivity of the second magnetic layer when it is by itself (not in stack or superimposed with other layers). Since it is preferable for the initialization that the coercivity of the second magnetic layer be smaller, this phenomenon facilitates the initialization.

Figure 113:
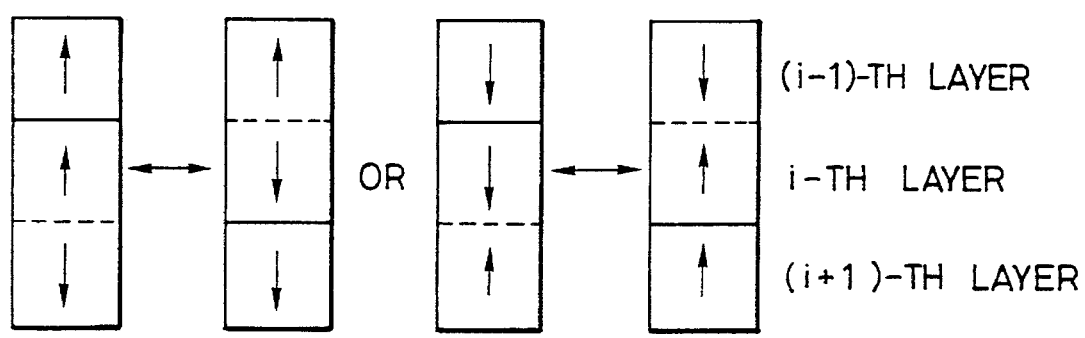
FIG. 113 explains magnetic reversal.

Let Tci be the Curie temperature of the i-th magnetic layer,

Hci be half the difference between the reversal magnetic fields (corresponding to the coercivity) of the i-th magnetic layer, and Hwi be the exchange-coupling from the neighboring magnetic layers (which equals the distance from zero applied magnetic field to the midpoint of the reversal magnetic fields: For the second magnetic layer and the third magnetic layer, it is defined as half the difference between the magnetic fields required to cause the magnetization reversals shown in FIG. 113.)

The magnetic characteristics of this embodiment are described as follows:

$$Tc4 > Tcomp4 > Tc2 > Tc1 > Tc3 > \text{room temperature} \qquad (1)$$

With respect to the first magnetic layer:

$Hw1 < Hc1$ at about room temperature (2)

$Hw1 > Hc1$ at about Tc1 (3)

With respect to the second magnetic layer:

$Hw2 > Hc2$ at about Tc3 (4)

$Hw2 < Hc2$ at about Tc1 (5)

With respect to the third magnetic layer:

$Hw3 > Hc3$ at about Tc3 (6)

With respect to the fourth magnetic layer:

$Hw4 < Hc4$ within all the operating temperature range (7)

The condition (2) is a requirement that the magnetization of the first magnetic layer is not reversed because of the reversal of the magnetization of the second magnetic layer at room temperature. The conditions (4), (6) to (7) indicate that the sublattice magnetizations of the second magnetic layer, the third magnetic layer and the fourth magnetic layer are all downward.

With the operations described above, direct overwriting is achieved by modulating the laser beam strength. A magneto-optic recording medium with a substrate having grooves at 1.6 µm intervals and having the above dielectric layer, magnetic layers and protective layer provided thereon was tested by writing signals with a bit length of 0.76 µm over signals with a bit length of 2 µm at a linear velocity of 11 m/sec., an applied magnetic field 350 oersteds and the laser beam power of 13 mW for the peak power and 5 mW for the bottom power. As a result, no unerased signals were observed, and the CN ratio of 47 dB was obtained.

The composition and the thickness of each magnetic layer in the above embodiment are determined to improve the overwritability, although overwriting is achieved if the Curie temperature and the coercivity of each layer are defined properly. It has been found that the following factors are important in improving the characteristics.

(1) The thickness t1 of the first magnetic layer.

Figure 114:
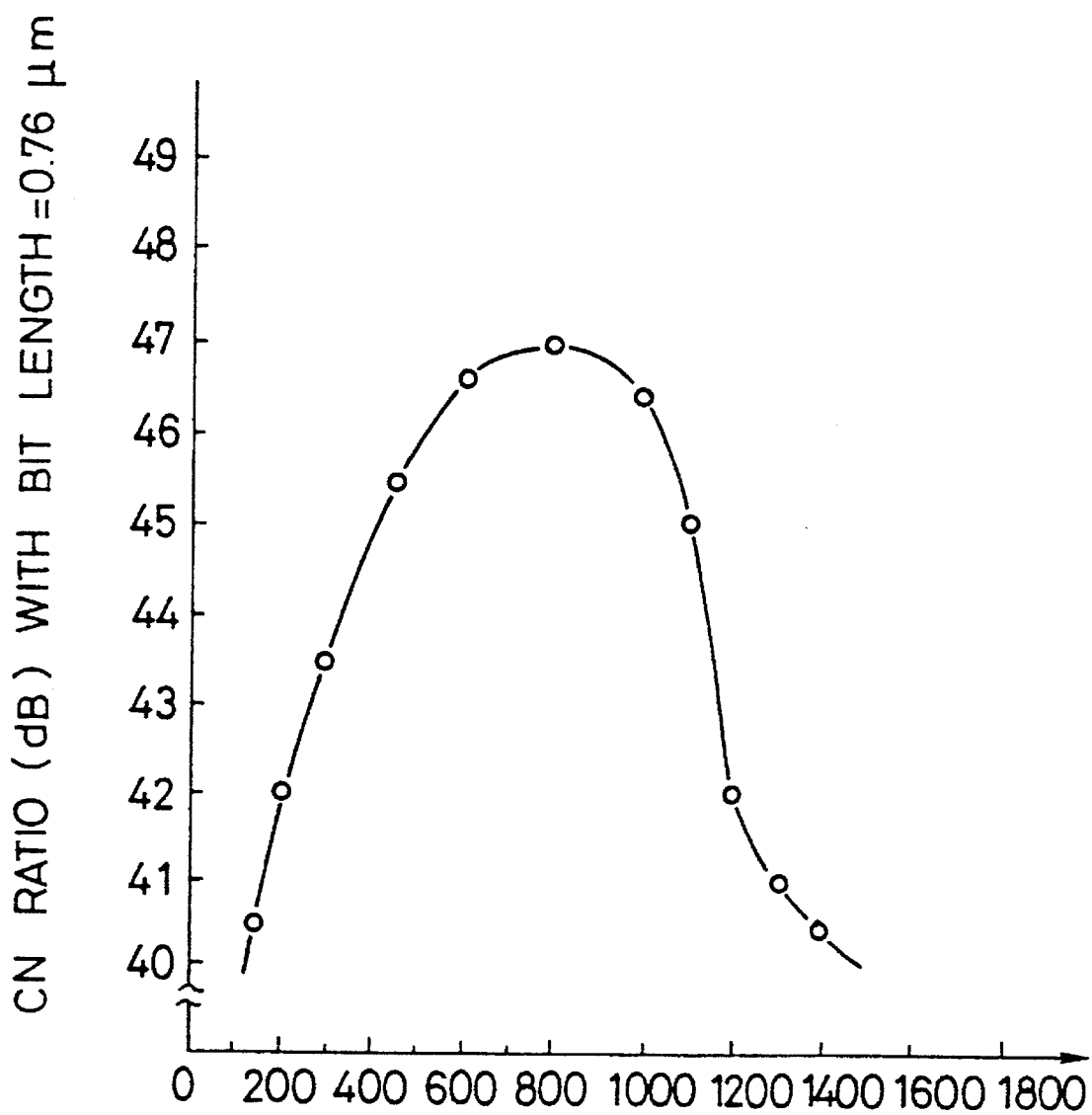
FIG. 114 shows the relationship between the film thickness of the first magnetic layer and the CN ratio.

Various recording media having the same configuration as that of the Embodiment B1 above except for the thickness of the first magnetic layer were formed with the thickness of the first magnetic layer being varied. The CN ratio was measured after writing signals with the bit length of 0.76 µm over signals with the bit length of 2 µm at a linear speed of 11 m/sec., an applied magnetic field of 300 oersteds, and the results were as shown in FIG. 114.

It is seen that the range of thickness over which the CN ratio is more than 42 dB is between 200 angstroms and 1200 angstroms. The laser beam penetrates to the depth of about 200 angstroms or more so when the thickness is below 200 angstroms, the laser beams reaches the surface of the second magnetic layer. When the thickness is above 1200 angstroms, the upper limit of the permissible bias magnetic field range is small.

(2) The thickness t1 of the first magnetic layer should be smaller than the thickness t2 of the second magnetic layer. In Table 1 of Embodiment 2 of Japanese Patent Application Kokai Publication No. 268103/1988, an example is shown in which the first magnetic layer is 500 angstroms thick and the second magnetic layer is 300 angstroms thick to enable initialization at room temperature. In the invention, the exchange-coupling from the fourth magnetic layer to the second magnetic layer is interrupted by the third magnetic layer and does not act above the Curie temperature Tc3 of third magnetic layer. Accordingly, the magnetization of the first magnetic layer is aligned with the magnetization of the second magnetic layer both during Low writing and High writing. It is therefore necessary that the following relationship be satisfied. With respect to the first magnetic layer:

$Hw1 > Hc1$ at about Tc1 (3)

With respect to the second magnetic layer:

$Hw2 < Hc2$ at about Tc1 (5)

Figure 115:
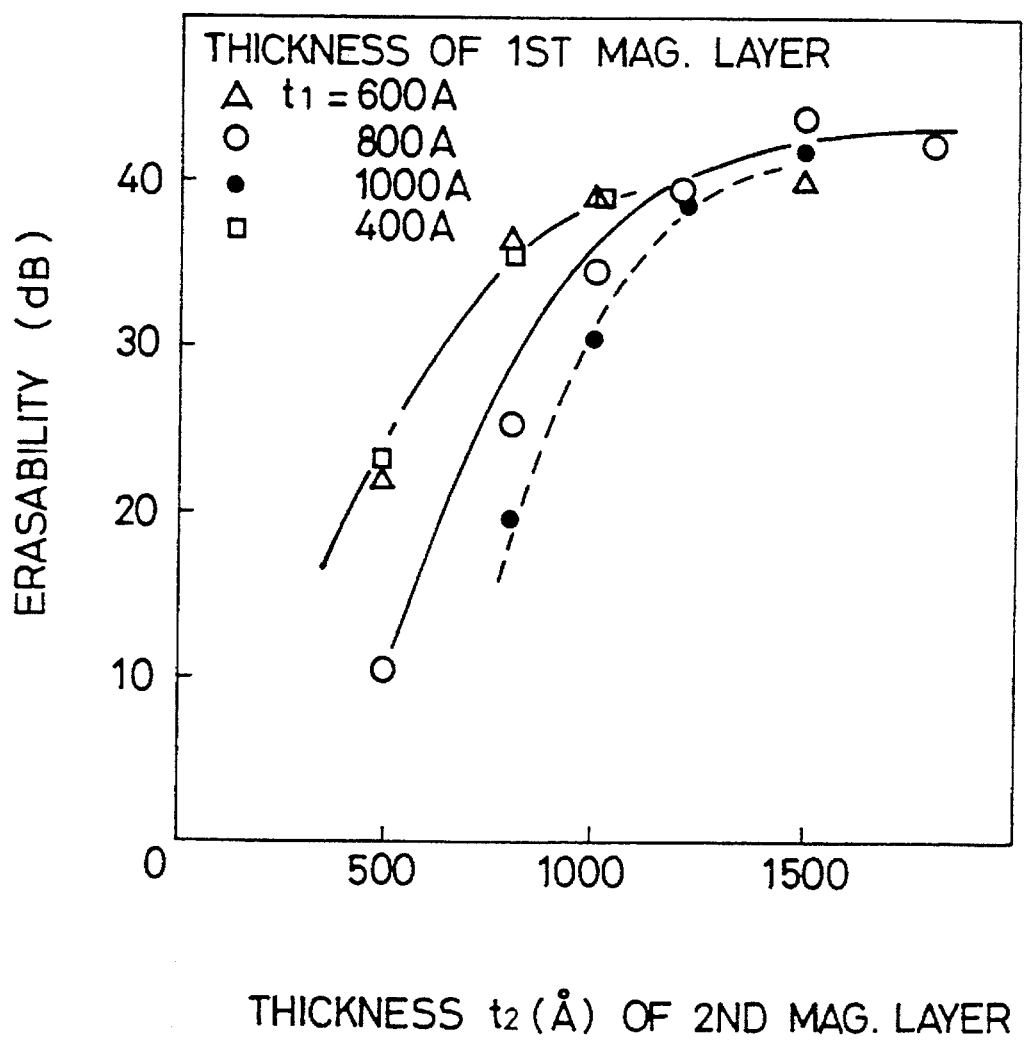
FIG. 115 shows the relationship between the film thickness of the second magnetic layer and the erasability.

Because the exchange-coupling acting on each layer is inversely proportional to the thickness, it is preferable that the first magnetic layer is thin and the second magnetic layer is thick. To ensure that the magnetization of the first magnetic layer is aligned with the magnetization of the second magnetic layer during the above operation, the second magnetic layer should preferably be thicker than the first magnetic layer. FIG. 115 shows the results of measurements of the erasability for varying thicknesses of the first magnetic layer and the second magnetic layer. When the thickness t1 of the first magnetic layer is varied to 600, 800 and 1000 angstroms, the erasability of more than 30 dB was obtained when the thickness t2 of the second magnetic layer is greater than the thickness t1 of the first magnetic layer. When the thickness t1 of the first magnetic layer is further reduced to 400 angstroms, t2 must be not smaller than 600 angstroms to obtain the erasability of more than 30 dB.

When an intermediate layer (a magnetic layer or a dielectric layer of 50 angstroms thick) for controlling the exchange-coupling is provided, the thickness of the second magnetic layer may be about the same as or smaller than the thickness of the first magnetic layer.

(3) For the second magnetic layer: $Co/(Fe+Co) < 0.5$.
In the configuration set forth below:

| Dielectric layer | $SiN_x$ | 650 angstroms |
|---|---|---|
| First magnetic layer | $Tb_{22}Fe_{69}Co_9$ | 800 angstroms |
| Second magnetic layer | $Gd_\beta Dy_{25-\beta}(Fe_{1-\alpha}Co_\alpha)_{75}$ ($\beta = 8$ or 15) | 1500 angstroms |
| Third magnetic layer | $Tb_{18}Fe_{84}$ | 200 angstroms |
| Fourth magnetic layer | $Tb_{30}Co_{70}$ | 400 angstroms |
| Protective layer | $SiN_x$ | 700 angstroms | the relationship between $\alpha$ and the erasability is as shown in FIG. 116. When the Co content is increased the perpendicular magnetic anisotropy of the second magnetic layer is increased and the initialization of the second magnetic layer becomes difficult, so the erasability is degraded. When Gd content is increased, the perpendicular magnetic anisotropy is decreased, and the Co content can therefore be increased. However, as shown in FIG. 116, for $\alpha=0.5$, it is difficult to obtain the erasability which is acceptable for practical application.

(4) RE-TM amorphous magnetic film containing Gd and Dy should be used for the second magnetic layer.

As described earlier, ferrimagnetic amorphous alloys containing rare-earth metal (RE) and transition metal (TM) are generally employed in the magneto-optical recording film. For the rare-earth metal, Tb, Gd, Dy and the like are often employed. It has been found that a recording film in which Gd and Dy are major components of RE is most suitable for the second magnetic layer. This is for the following reason.

(i) Initialization of the second magnetic layer takes place at about 100° C. Accordingly, the perpendicular magnetic anisotropy coefficient Ku2 of the second magnetic layer should be low at that temperature. A magnetic layer containing Gd and Dy has a lower perpendicular magnetic anisotropy coefficient than a magnetic layer containing Tb.

(ii) Gd has a high Curie temperature, whereas Dy has a low Curie temperature. It is therefore possible that, by varying the proportion of Gd and Dy, the temperature dependence of the magnetic characteristics can be controlled over a wide range. Because the second magnetic layer has various functions at respective temperatures, the controllability of the temperature dependence of the magnetic characteristic is important.

(5) The third magnetic layer has perpendicular magnetic anisotropy.

The exchange-coupling Hw to the neighboring layer is correlated with the perpendicular magnetic anisotropy Ku. That is, the exchange-coupling is proportional to the interface wall energy σw, and Ku and σw are related as follows:

$$\sigma w \propto \sqrt{Ku}$$

The exchange-coupling is given from the saturation magnetization Ms and the film thickness as follow:

$$Hw = \sigma w / (2 \cdot Ms \cdot t)$$

Accordingly, when a film with an in-plane easy axis is employed as the third magnetic layer, σw is lowered and the exchange-coupling Hw2 and Hw3 from the fourth magnetic layer to the second magnetic layer are reduced, so it becomes difficult to satisfy the following relationships:
For the second magnetic layer:

$$Hw2 > Hc2 \text{ at about } Tc3 \tag{4}$$

for the third magnetic layer:

$$Hw3 > Hc3 \text{ at about } Tc3 \tag{6}$$

For this reason, it is desirable to employ a magnetic film having a perpendicular magnetic anisotropy for the third magnetic layer.

(6) The third magnetic layer should be TM rich.
To satisfy the relationship:

$$Hw3 > Hc3 \tag{6}$$

at or below the Curie temperature Tc3 of the third magnetic layer, the third magnetic layer should preferably be formed of an RE-TM film which does not have the compensation temperature above room temperature. That is, the exchange-coupling acting on the third magnetic layer is given by:

$$Hw3 = (-\sigma w23 + \sigma w34)/(2 \cdot Ms3 \cdot t3)$$

where Ms3 represents the saturation magnetization, t3 represents the thickness, and σw23 and σw34 represent the magnetic wall energies of the interfaces with the second magnetic layer and the fourth magnetic layer, respectively.

In the vicinity of the compensation temperature, the coercivity Hc3 is increased and equation (6) is therefore not satisfied. For this reason, the third magnetic layer should preferably be formed of a TM-rich RE-TM film which does not have a compensation temperature above room temperature.

There are RE-TM alloy films which are RE-rich and do not have a compensation temperature above room temperature temperature. However, compared with TM-rich RE-TM films, these films have smaller interface magnetic wall energy and hence smaller perpendicular magnetic anisotropy, so exchange-coupling is small and the characteristics are poor. Accordingly, it is preferable that the third magnetic layer be formed of a TM-rich RE-TM alloy film.

The range of composition which satisfies the characteristics required of the third magnetic layer, i.e., the perpendicular magnetic anisotropy and TM-rich property is wide, so meeting this requirement in production is not difficult.

(7) When the third magnetic layer is formed of RE ($Fe_{1-x}Co_x$), x should be within the range of from 0 to 0.3, i.e., $0 \leq x \leq 0.3$.

Figure 117:
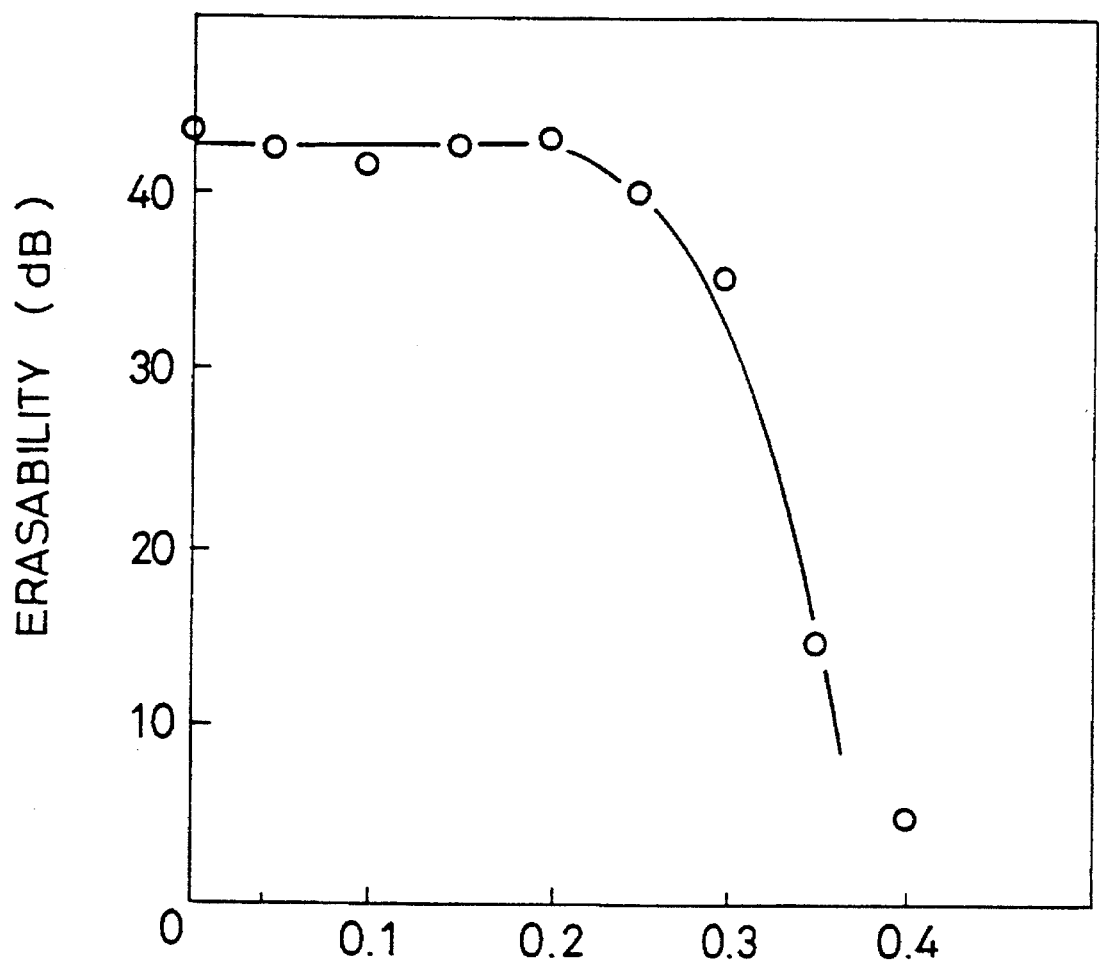
FIG. 117 shows the composition ratio of iron and cobalt in the third magnetic layer, and the erasability.

Erasability of the magneto-optic recording medium of the Embodiment B1 is shown in FIG. 117 with varying Co content x (=Co/FeCo, i.e., the Co content in the transition metal (ratio of Co content to the total amount of Co and Fe) of the third magnetic layer. From the figure, it is seen that erasability of 30 dB or more is obtained when $x \leq 0.3$. It is therefore preferable that the following relationship:

$$0 \leq x \leq 0.3$$

is satisfied if the third magnetic layer contains RE ($Fe_{1-x}Co_x$).

(8) The thickness t3 of the third magnetic layer should be between 100 angstroms and 800 angstroms.

The thickness t3 of the third magnetic layer should be not less than 100 angstroms to adequately interrupt the exchange-coupling from the fourth magnetic layer to the second magnetic layer during High writing, to ensure a good overwriting. This is the thickness with which the film is present not at isolated islands or as a mesh-like structure, but as a continuous layer. When the thickness of the third magnetic layer was varied in the Embodiment B3 which will later be described, the overwriting was confirmed up to 800 angstroms. When the thickness exceeds 800 angstroms, Hw3 may become smaller than Hc3, and initialization is interfered.

(9) With respect to the fourth magnetic layer $$Co/(Fe+Co) > 50 \text{ at } \%.$$

Figure 118:
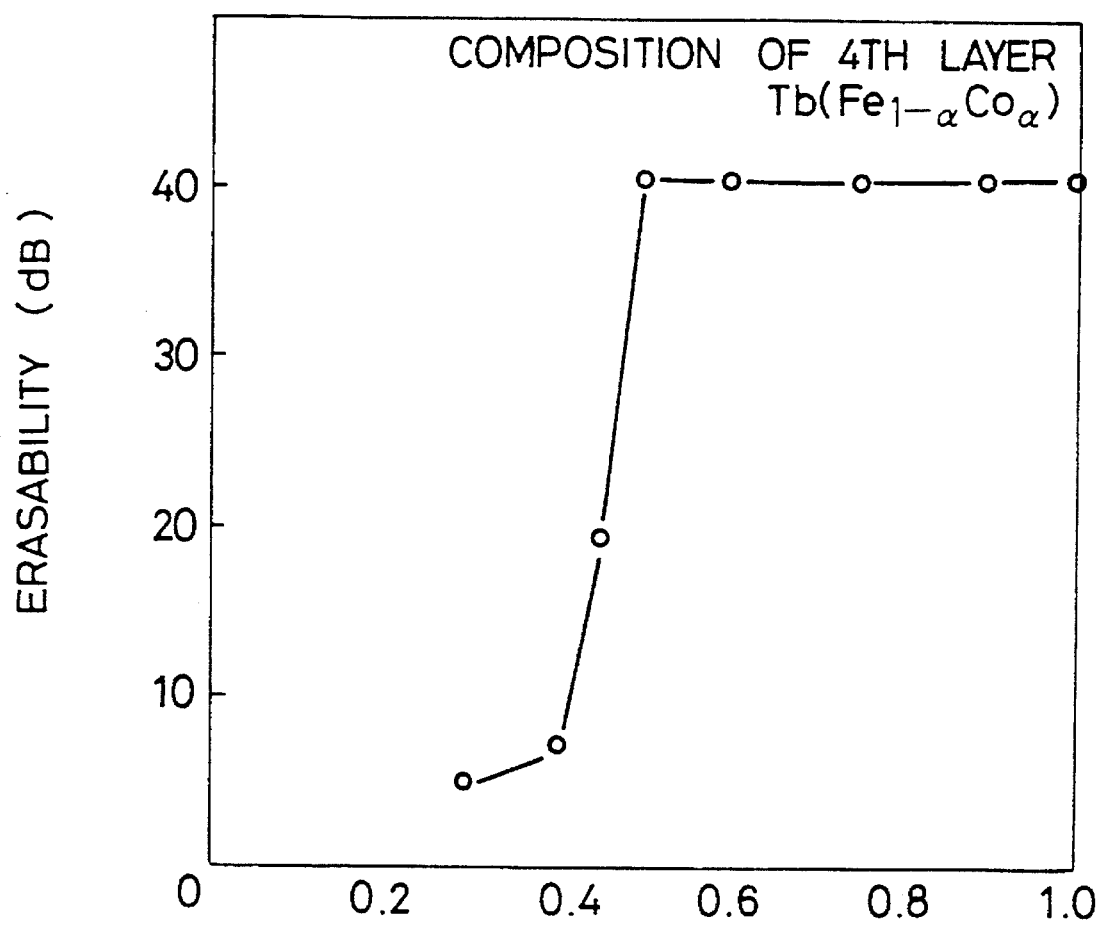
FIG. 118 shows the composition ratio of iron and cobalt in the fourth magnetic layer, and the erasability.

Recording media having the same configuration as the recording medium of Embodiment B1 except for the composition of the fourth magnetic layer were prepared. Erasability with varying composition of the fourth magnetic layer is shown in FIG. 118. When Co/(Fe+Co) is smaller than 50 at %, the erasability was poor and overwriting is impossible. Co content should therefore be greater than 50 at %.

(10) The thickness of the fourth magnetic layer

Figure 119:
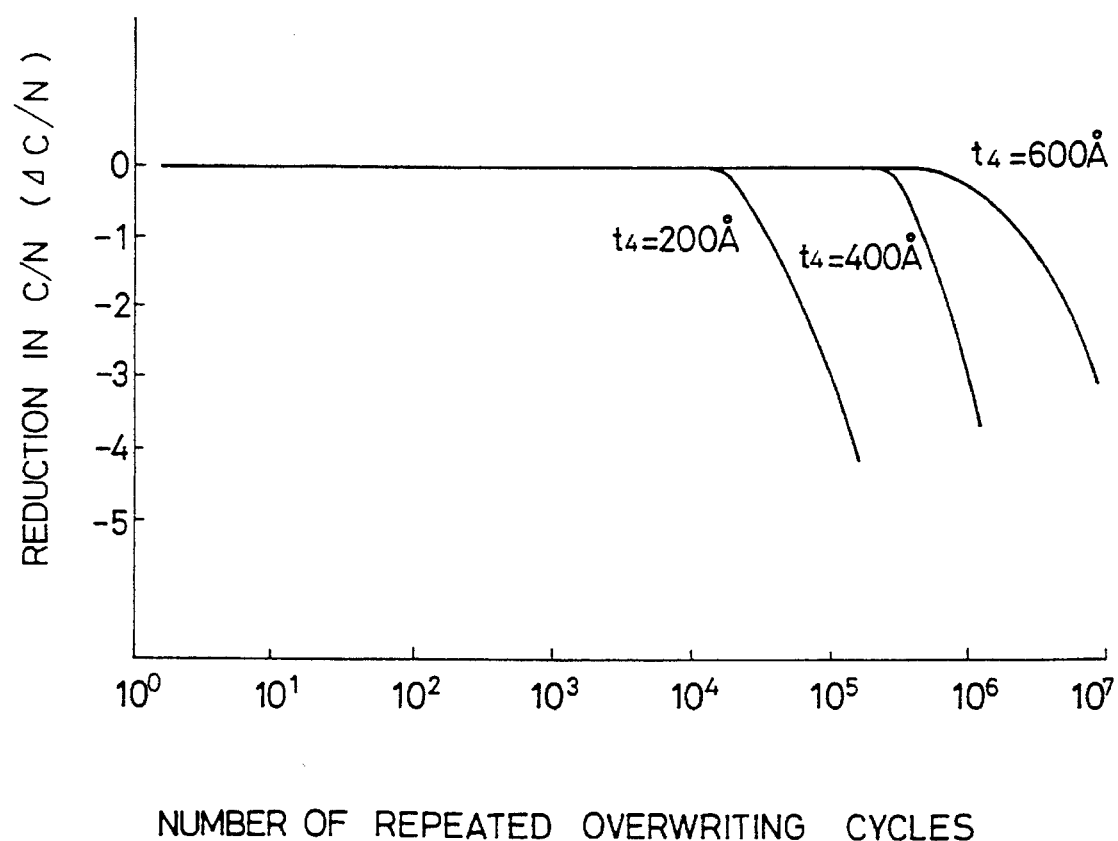
FIG. 119 shows the relationship between the number of repeated overwriting operations and the reduction of the CN as compared with the initial value.

Recording media having the same configuration as the recording medium of Embodiment B1 except for the thickness of the fourth magnetic layer were prepared, with the thickness of the fourth magnetic layer being varied. Repeated overwriting was conducted with each cycle consisting of overwriting signals with a bit length of 0.76 μm over signals with a bit length of 2 μm (and writing signals with a bit length of 2.0 μm over the signals with a bit length of 0.76 μm. The results are shown in FIG. 119. If the time over which the CN ratio falls 3 dB from the initial CN ratio is defined as the lifetime, it is seen from FIG. 119 that the thickness of the fourth magnetic layer should be not less than 200 angstroms to obtain the lifetime of more than $10^5$ repeated overwriting cycles. To obtain the lifetime of more than $10^6$ repeated overwriting cycles, the thickness of the fourth magnetic layer should be not less than 400 angstroms.

(11) Rare-earth metal of the RE-TM alloy films used for the third magnetic layer and the fourth magnetic layer should contain Tb.

The third magnetic layer and the fourth magnetic layer should have a large exchange-coupling between the layers in order to ensure initialization for aligning the orientation after each writing operation. The exchange-coupling Hw is given by:

$$Hw = \sigma w/(2 \cdot Ms1 \cdot t)$$

where Ms represents saturation magnetization, t represents the thickness, and

σ w represents interface magnetic wall energy.

The interface magnetic wall energy σ w and the perpendicular magnetic anisotropy Ku are related as follows:

$$\sigma w \alpha \sqrt{Ku}$$

To obtain a larger exchange-coupling Hw, a material having a greater perpendicular magnetic anisotropy should be employed. RE-TM alloy films employing Tb as the rare-earth metal of the magnetic layer are known to have a greater perpendicular magnetic anisotropy. To obtain a good overwriting characteristics, the third magnetic layer and the fourth magnetic layer should contain Tb. TbFeCo is suitable for the third magnetic layer. On the other hand, TbCo is suitable for the fourth magnetic layer. This is because, for the fourth magnetic layer, it is important that the sublattice magnetization orientation is unchanged at any temperature within the range of operating temperature, and for this purpose a great perpendicular magnetic anisotropy and a high Curie temperature are necessary. It is also possible to add a small amount of one or more of Eu, Gd, Dy, and Ho.

Japanese Patent Application Kokai Publication shows, at its Embodiment B2, TbFeCo having a Curie temperature of 150° C. being employed for the third magnetic layer (bottom, initializing layer which corresponds to the fourth magnetic layer of the invention) whose orientation of the sublattice magnetization is unchanged. The temperature at which the magnetization of the second magnetic layer is reversed (the second temperature T2, which corresponds to the High writing temperature in the description of the embodiment in this specification) is stated to be 250° C. However, with such a temperature, the third magnetic layer is at above its Curie temperature, so its magnetization is reversed because of the biasing magnetic field.

For this reason, to maintain the orientation of the sublattice magnetization, the Curie temperature should be high. TbCo has a high Curie temperature as well has a high anisotropy.

(12) Condition for achieving the minimum bit diameter of 500 angstroms

Figure 120:
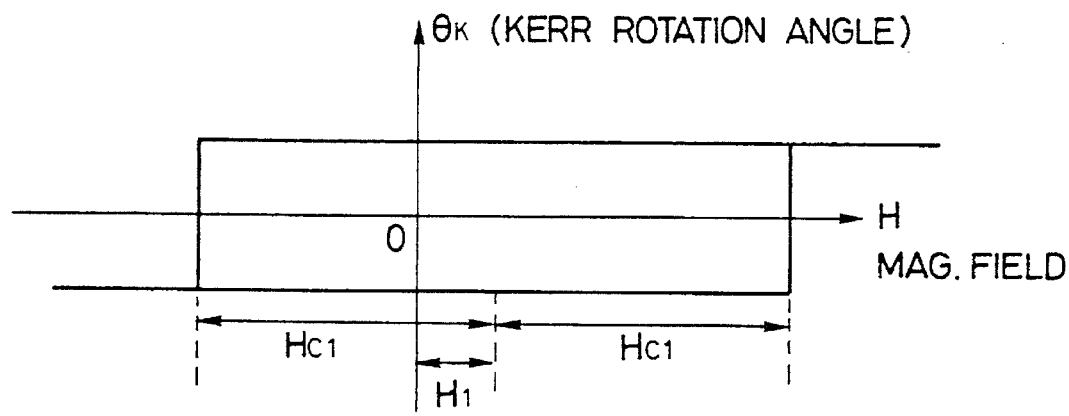
FIG. 120 shows the hysteresis loop of the magneto-optic recording medium according to the invention.
Figure 121:
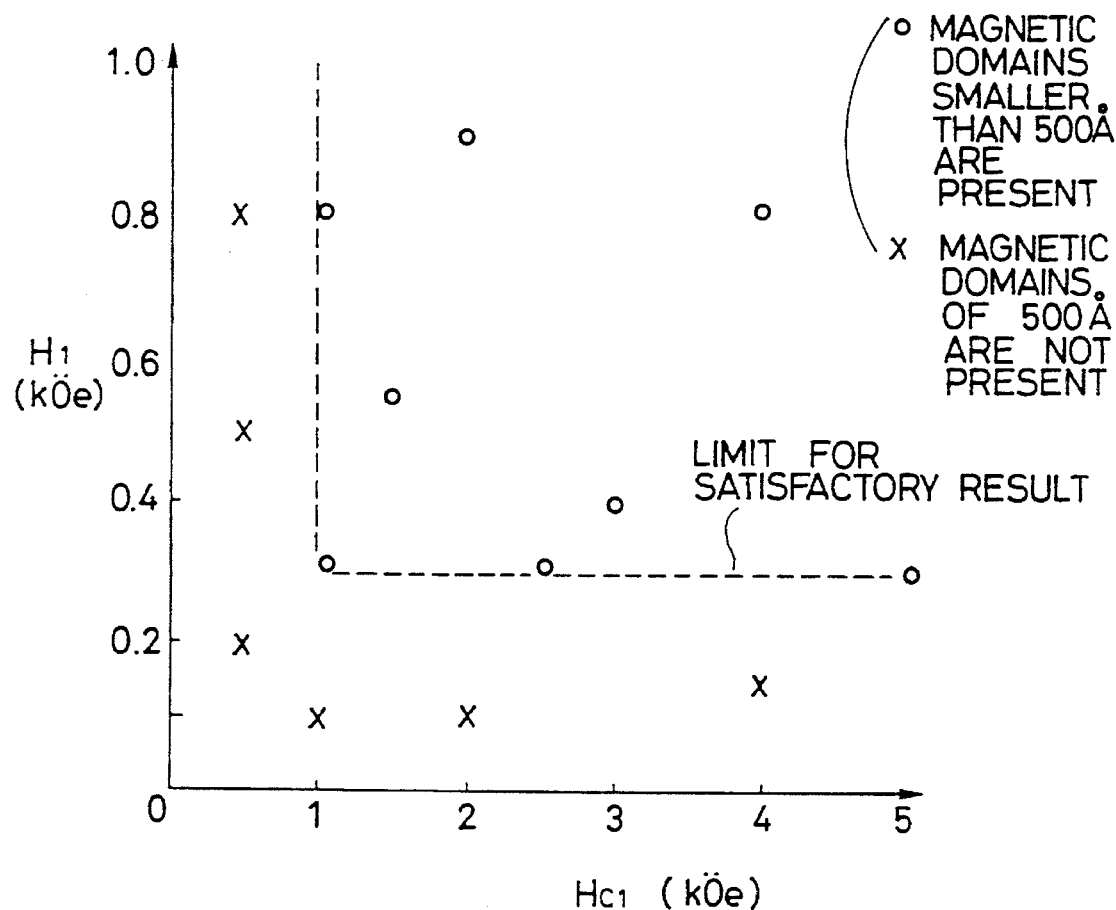
FIG. 121 shows the characteristics of the first magnetic layer necessary to have a minimum bit diameter of 500 angstroms.

The relationship between Hc1 of the first magnetic layer and the shift Hw1 (in the reversal magnetic field due to exchange coupling), and the minimum bit diameter were studied. Hc1 and Hw1 of the first magnetic layer were measured from the hysteresis loops due to Poler-Kerr effects. FIG. 120 shows an example thereof. The minimum bit diameter was determined by observation of the demagnetized state by use of a polarizing microscope. The results were shown in FIG. 121. In order for the minimum bit diameter of 500 angstroms to be present, it is necessary that:

Hc1 ≧ 1 kilo-oersteds, and

Hw1 > 0.3 kilo-oersteds.

Figure 122:
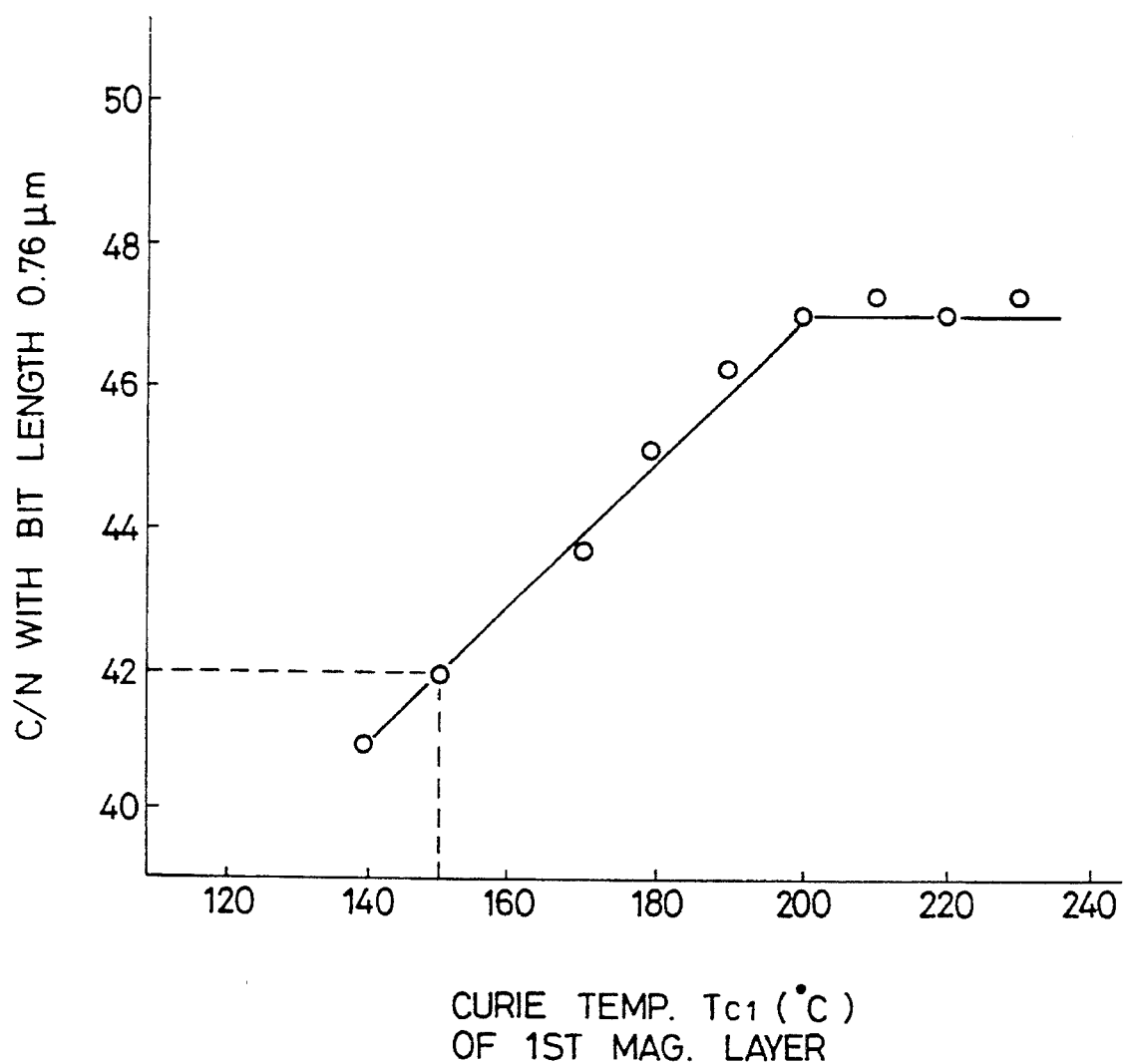
FIG. 122 shows the relationship between the Curie temperature of the first magnetic layer and the C/N.

(13) The relationship between the Curie temperature of the first magnetic layer and the CN ratio Recording media having the same configuration as the Embodiment B1 except for the first magnetic layer were prepared, with the Curie temperature of the first magnetic layer being varied by varying the composition. The relationship between the Curie temperature of the first magnetic layer and the CN ratio with the bit length of 0.76 μm is shown in FIG. 122. To obtain the CN ratio of not less than 42 dB, the Curie temperature of the first magnetic layer should be not lower than 150° C. When the CN ratio is not less than 42 dB jitter is 5 nsec. or shorter and errors are reduced.

When one or more the conditions (1) to (13) are satisfied, the overwriting characteristics are improved. The Embodiments B2 to B9 which are described later satisfy some of the above conditions.

In the Embodiment B1, the condition for the initialization of the second magnetic layer shown in relationship (4), i.e., Hw2 > Hc2 is satisfied at about Tc3 and not at room temperature.

However, in some embodiments, the relationship (4) is satisfied at room temperature. For instance, the following two examples satisfy the relationship (4) at room temperature.

| (a) | |
|---|---|
| $SiN_x$ | 650 angstroms |
| $Tb_{22}Fe_{69}Co_9$ | 800 angstroms |
| $Gd_8Dy_{17}Fe_{60}Co_{15}$ | 800 angstroms |
| $Tb_{16}Fe_{84}$ | 200 angstroms |
| $Tb_{30}Co_{70}$ | 400 angstroms |
| $SiN_x$ | 700 angstroms |
| (b) | |
| $SiN_x$ | 650 angstroms |
| $Gd_{10}Tb_{12}Fe_{69}Co_9$ | 800 angstroms |
| $Gd_8Dy_{17}Fe_{60}Co_{15}$ | 1500 angstroms |
| $Tb_{16}Fe_{84}$ | 200 angstroms |
| $Tb_{30}Co_{70}$ | 400 angstroms |
| $SiN_x$ | 700 angstroms |

The results of the experiments are shown below.

| Embodiment | Peak power (mW) | Bottom power (mW) | Bias field (oersteds) | CN ratio (dB) |
|---|---|---|---|---|
| B1 | 13.0 | 5.0 | 300 ± 150 | 47.0 |
| (a) | 11.5 | 4.5 | 200 ± 50 | 40.8 |
| (b) | 13.5 | 8.0 | 250 ± 100 | 41.3 |

It is seen from the above, that compared with the Embodiment B1, the CN ratios of (a) and (b) are lower, and the bias magnetic field margin of (a) and (b) is smaller.

With the example (a), the thickness of the second magnetic layer is reduced (from 1500 angstroms to 800 angstroms) so the relationship (4) is satisfied at room temperature. However, because of the reduced thickness of the second magnetic layer, the transfer process from the second magnetic layer to the first magnetic layer is unstable, and the CN ratio is therefore degraded and the bias magnetic field margin is reduced.

With the example (b), Gd is added to the first magnetic layer to reduce σ w12, so that the relationship (4) is satisfied at room temperature but because of the increase of the Curie temperature of the first magnetic layer, the bottom power is increased and the separation between the bottom power and the peak power is not good and the CN ratio is thereby lowered.

As has been made clear, it has been observed that when the medium is designed to satisfy the relationship (4) at room temperature, there will be adverse effects on other process and recording and reproducing characteristics are degraded.

Figure 123:
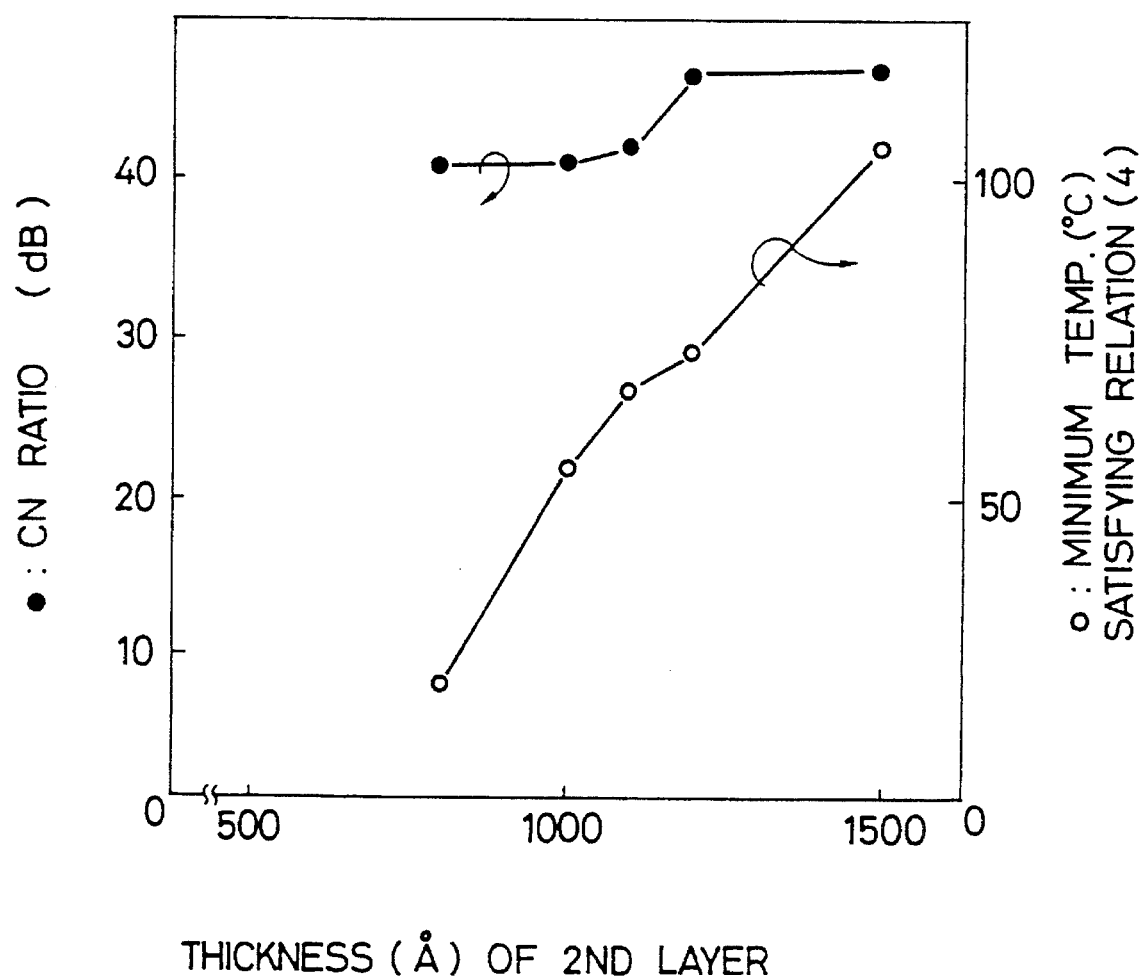
FIG. 123 shows the relationship between the film thickness of the second magnetic layer and the CN ratio.

For this reason, experiments were made to determine the thickness of the second magnetic layer at which the CN ratio drops. In addition, the lowest temperature at which the relation (4) is satisfied was measured for each thickness by use of a vibrating sample magnetometer. The results are shown in FIG. 123.

It is seen from these data that where the minimum temperature at which the relation (4) is satisfied is 70° C., the CN ratio is rapidly lowered. It is seen that the CN ratio is good when the temperature at which the relation (4) is satisfied is a little above room temperature, i.e., about 70° C. or higher.

Embodiment B2

A recording medium of this embodiment has the following configuration:

| Dielectric layer | $SiN_x$ | 650 angstroms |
|---|---|---|
| First magnetic layer | $Tb_{22}Fe_{69}Co_9$ | 800 angstroms |
| Second magnetic layer | $Gd_{12}Dy_{13}Fe_{60}Co_{15}$ | 1200 angstroms |
| Third magnetic layer | $Tb_{16}Fe_{84}$ | 200 angstroms |
| Fourth magnetic layer | $Tb_{30}Co_{70}$ | 400 angstroms |
| Protective layer | $SiN_x$ | 700 angstroms |

These layers are formed on a glass substrate by sputtering or the like. The magnetic layers adjacent each other are exchange-coupled.

Figure 124:
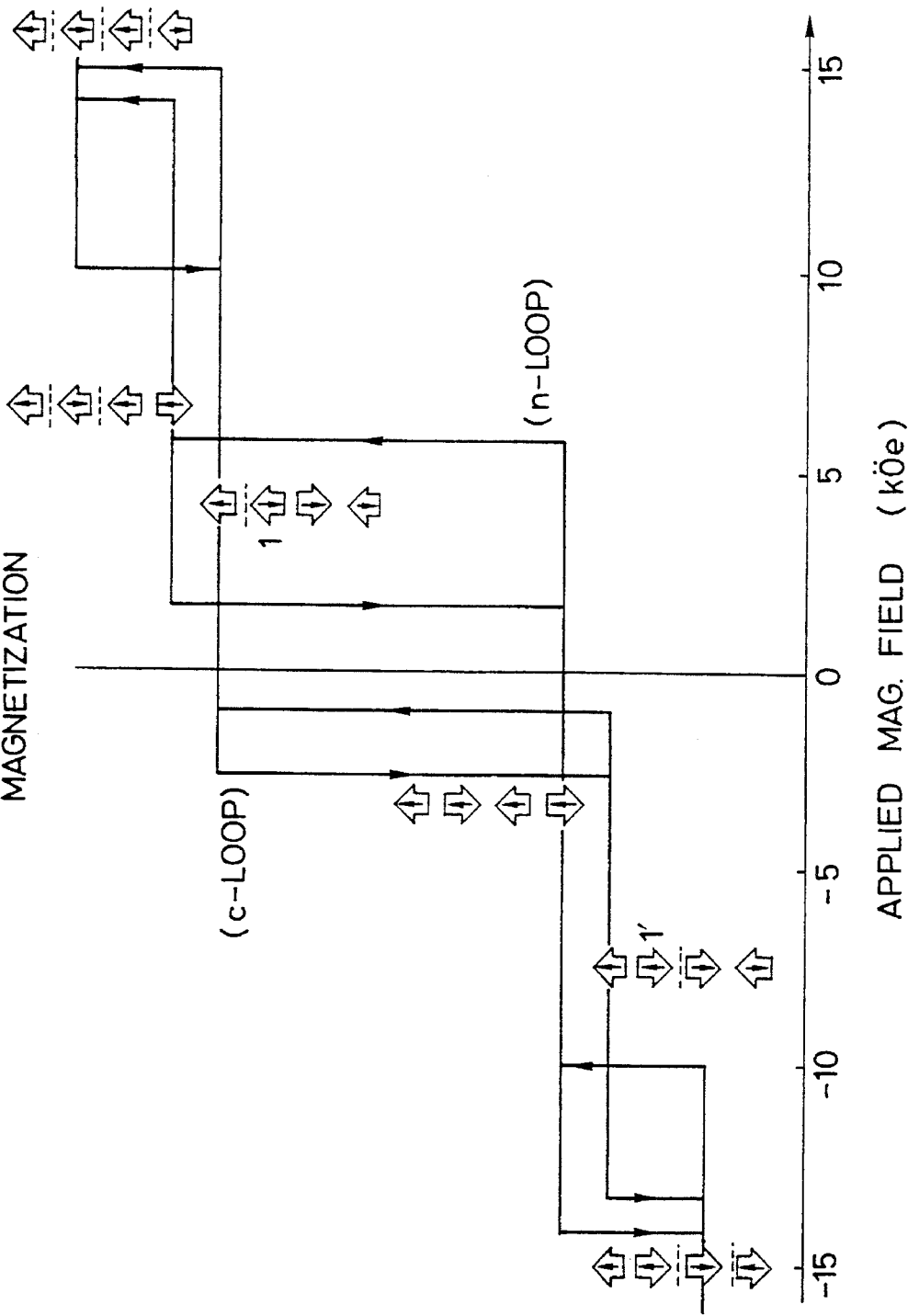
FIG. 124 is a schematic diagram showing the magnetization curves at room temperature.

FIG. 124 shows the magnetization curves at room temperature. The two magnetization curves which relates solely at the second magnetic layer, the transition from the state "1" to the state "1'" takes place when the two reversal magnetic fields of the c-loop is present on the same side of the zero. It is seen that the curve does not extends over both side of the zero and the transition from the state "1" to the state "1'" can take place.

The magnetic characteristics of the present embodiment is as follows:

$$Tc4 > Tc2 > Tc1 > Tc3 > \text{room temperature} \quad (1)$$

For the first magnetic layer:

$$Hw1 < Hc1 \text{ at about room temperature} \quad (2)$$

$$Hw1 > Hc1 \text{ at about } Tc1 \quad (3)$$

For the second magnetic layer:

$$Hw2 > Hc2 \text{ at about room temperature} \quad (4)$$

For the third magnetic layer:

$$Hw3 > Hc3 \text{ below } Tc3 \quad (4)$$

For the fourth magnetic layer:

$$Hw4 < Hc4 \text{ within operating temperature range} \quad (6)$$

The relationship (2) indicates that the magnetization of the first magnetic layer is not reversed by the reversal of the magnetization of the second magnetic layer, and the relationships (4) to (6) indicate that the magnetizations of the second magnetic layer, the third magnetic layer and the fourth magnetic layer after the recording are all downward.

A magneto-optic recording medium with a substrate having grooves at 1.6 μm intervals and having a dielectric layer, magnetic layers and a protective layer provided thereon were tested by writing signals with a bit length of 0.76 μm over signals with a bit length of 2 μm at a linear velocity of 11 m/sec., an applied magnetic field 350 oersteds and the laser beam power of 15 mW for the peak power and 6 mW for the bottom power. As a result, no unerased signals were observed, and the CN ratio of 46 dB was obtained.

Embodiments B3 to B9

Embodiments B3 to B9 are shown in Table 7 and Table 8. Magnetic media of these embodiments are formed in the same way as described with reference to the Embodiment B1. Table 8 shows recording and reproducing characteristics when signals with a bit length of 0.76 μm were written over signals with a bit length of 2 μm at a linear velocity of 11 m/sec. with varying number of chips on the target and the sputtering time. No unerased signals were observed, and direct overwriting was confirmed.

TABLE 7

| No. | 1st Layer | 2nd Layer | 3rd Layer | 4th Layer |
|---|---|---|---|---|
| 3 | $Tb_{23}Fe_{72}Co_5$ 800Å | $Gd_5Dy_{22}Fe_{65}Co_8$ 2000Å | $Tb_{20}Fe_{80}$ 800Å | $Tb_{24}Co_{76}$ 2000Å |
| 4 | $Tb_{23}Fe_{72}Co_5$ 800Å | $Gd_5Dy_{22}Fe_{65}Co_8$ 1500Å | $Tb_{20}Fe_{80}$ 100Å | $Tb_{24}Co_{76}$ 1000Å |
| 5 | $Tb_{23}Fe_{72}Co_5$ 800Å | $Gd_5Dy_{22}Fe_{65}Co_8$ 1200Å | $Tb_{20}Fe_{80}$ 100Å | $Gd_8Tb_{16}Co_{76}$ 700Å |
| 6 | $Tb_{23}Fe_{72}Co_5$ 800Å | $Gd_5Dy_{22}Fe_{65}Co_8$ 1200Å | $Tb_{20}Fe_{80}$ 100Å | $Tb_{22}Co_{78}$ 400Å |
| 7 | $Tb_{23}Fe_{77}$ 1000Å | $Gd_5Dy_{22}Fe_{65}Co_8$ 1200Å | $Tb_{15}Dy_5Fe_{80}$ 100Å | $Tb_{28}Co_{72}$ 400Å |
| 8 | $Tb_{23}Fe_{72}Co_5$ 1000Å | $Gd_5Dy_{22}Fe_{65}Co_8$ 1200Å | $Tb_{20}Fe_{76}Co_4$ 100Å | $Tb_{28}Co_{72}$ 400Å |
| 9 | $Tb_{23}Fe_{72}Co_5$ 1000Å | $Gd_5Dy_{22}Fe_{65}Co_8$ 1200Å | $Tb_{20}Fe_{76}Co_4$ 100Å | $Tb_{20}Co_{80}$ 600Å |

TABLE 8

| No. | Peak Power (mW) | Bottom Power (MW) | Bias Field (oersteds) | CN Ratio (dB) |
|---|---|---|---|---|
| 3 | 16.0 | 7.0 | 500 | 42.1 |
| 4 | 14.0 | 6.5 | 350 | 43.0 |
| 5 | 13.0 | 4.5 | 700 | 45.1 |
| 6 | 11.5 | 4.5 | 350 | 46.2 |
| 7 | 10.0 | 4.0 | 250 | 41.1 |
| 8 | 13.0 | 5.0 | 300 | 47.0 |

TABLE 8-continued

| No. | Peak Power (mW) | Bottom Power (MW) | Bias Field (oersteds) | CN Ratio (dB) |
|---|---|---|---|---|
| 9 | 13.0 | 5.0 | 100 | 45.1 |

Each of the magnetic layers may be formed of multilayer film. An additional magnetic layer exhibiting greater magneto-optic effects may be formed before the formation of the first magnetic layer. When

| Dielectric layer | $SiN_x$ | 650 angstroms |
|---|---|---|
| Reproducing layer | $Tb_{15}Fe_{70}Co_{15}$ | 100 angstroms |
| First magnetic layer | $Tb_{22}Fe_{69}Co_9$ | 800 angstroms |
| Second magnetic layer | $Gd_8Dy_{17}Fe_{60}Co_{15}$ | 1500 angstroms |
| Third magnetic layer | $Tb_{16}Fe_{84}$ | 200 angstroms |
| Fourth magnetic layer | $Tb_{30}Co_{70}$ | 400 angstroms |
| Protective layer | $SiN_x$ | 700 angstroms | were formed by sputtering on a glass substrate, an improvement in CN ratio of 1 dB was observed.

It is also possible to form a magnetic layer, a dielectric layer, an oxide layer or the like between magnetic layers to control the exchange-coupling. Each magnetic layer may be formed of a ferrimagnetic material, such as GdFe, GdTbFeCo, TbDyFeCo, NdDyFeCo, DyCo, TbHoFeCo, and DyHoCo.

The recording medium in the above embodiments is single-sided, i.e., it consists of a single recording plate comprising the first to fourth magnetic layers, with or without the control layers being interposed described above. But the recording medium may alternatively be double-sided, i.e., it may comprise two recording plates each comprising the first to the fourth magnetic layers, with or without the control layers described above, with the two recording plates being joined together by means of epoxy resin, thermo-plastic resin, thermo-setting resin or the like. The recording medium may be other than disk-shaped, may be in the form of a rectangular card.

Embodiment B10

Figure 125:
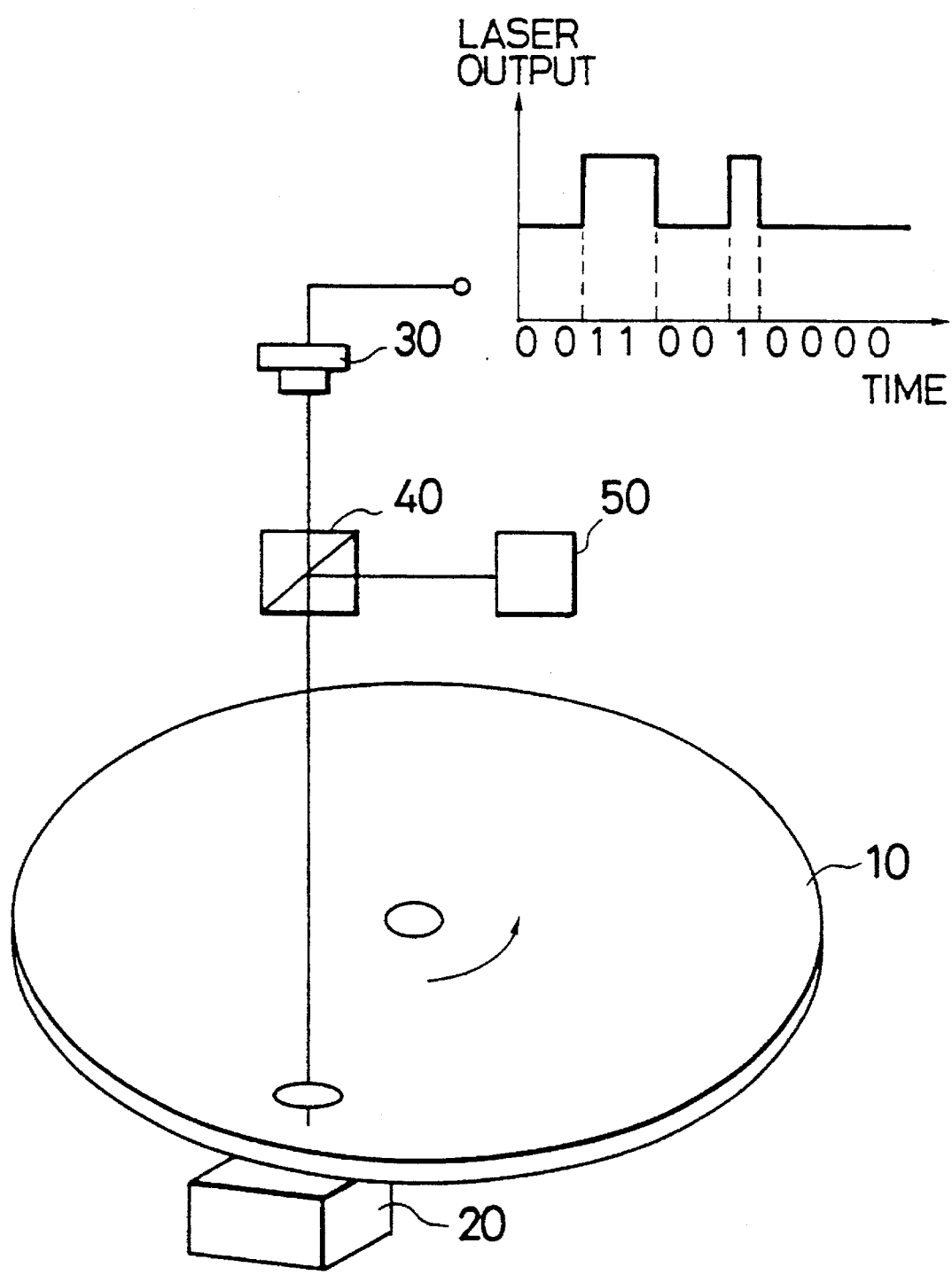
FIGS. 125 to 129 show magneto-optic disk device employing the magneto-optic disk medium of FIG. 105.

FIG. 125 shows the configuration of a magneto-optic recording apparatus. In the figure, reference numeral 10 denotes a magneto-optic recording medium, 20 denotes a bias magnetic field generating device, 30 denotes a semiconductor laser, 40 denotes a polarizing beam splitter, and 50 denotes a reproducing device. The semiconductor laser is so constructed that its output laser beam during according can be modulated between two levels which are higher than the level of the laser beam during reproducing. The bias magnetic field generating device is a permanent magnet applying a magnetic field of 350 oersteds on the surface of the magneto-optic recording medium. An electromagnet may alternatively be employed. The magneto-optic recording medium of Embodiment B1 was used, and the signals with the bit length of 0.76 μm were written over the signals with the bit length of 2.0 μm at a linear velocity of 11 m/sec., with the applied magnetic field of 350 oersteds, and with the laser beam being modulated between peak power of 15 mW, and the bottom power of 6 mW. No unerased signals were observed, and the CN ratio of 46 dB was obtained.

Embodiment B11

Figure 126:
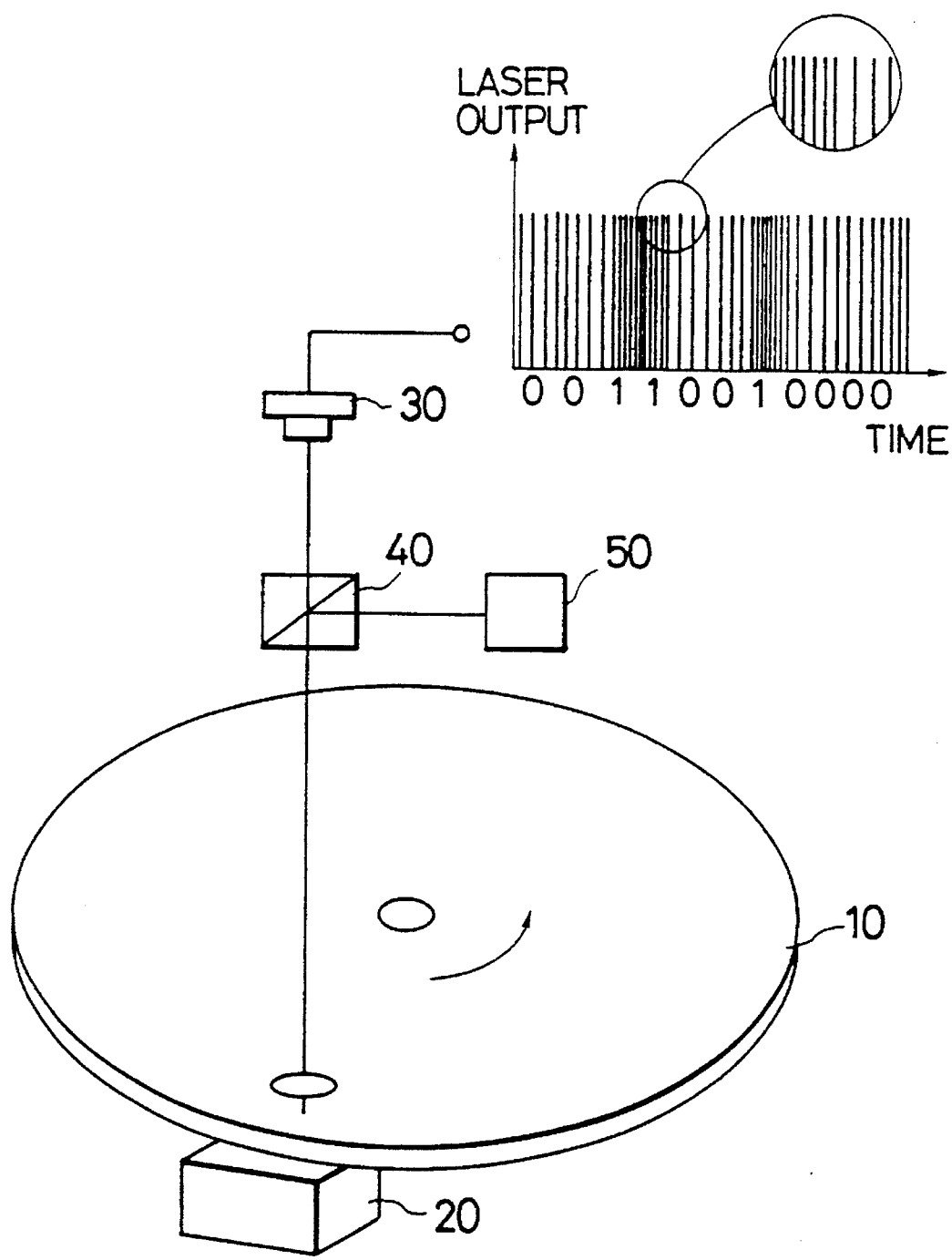

FIG. 126 shows the configuration of a magneto-optic recording apparatus. In the figure, reference numeral 10 denotes a magneto-optic recording medium, 20 denotes a bias magnetic field generating device, 30 denotes a semiconductor laser, 40 denotes a polarizing beam splitter, and 50 denotes a reproducing device. The semiconductor laser is so constructed that its output laser beam is frequency modulated. That is, the output laser beam consist of a series of pulses whose frequency is much higher than the maximum frequency of the recorded signals (signal bits). The frequency of the pulses is varied depending on whether High writing or Low writing is to be made. For instance, for High writing, the frequency of the pulses is 20 times the maximum frequency of the recorded signals, and, for Low writing, the frequency of the signals is 10 times the maximum frequency of the recorded signals. The pulse width is kept unchanged. When the magneto-optic recording medium of Embodiment B1 was used, and the signals with the bit length of 0.76 μm were written over the signals with the bit length of 2.0 μm at a linear velocity of 11 m/sec., with the applied magnetic field of 350 oersteds, and with the laser beam being modulated at 15 mW for the peak power. Recording was achieved with no unerased signals being observed.

Embodiment B12

Figure 127:
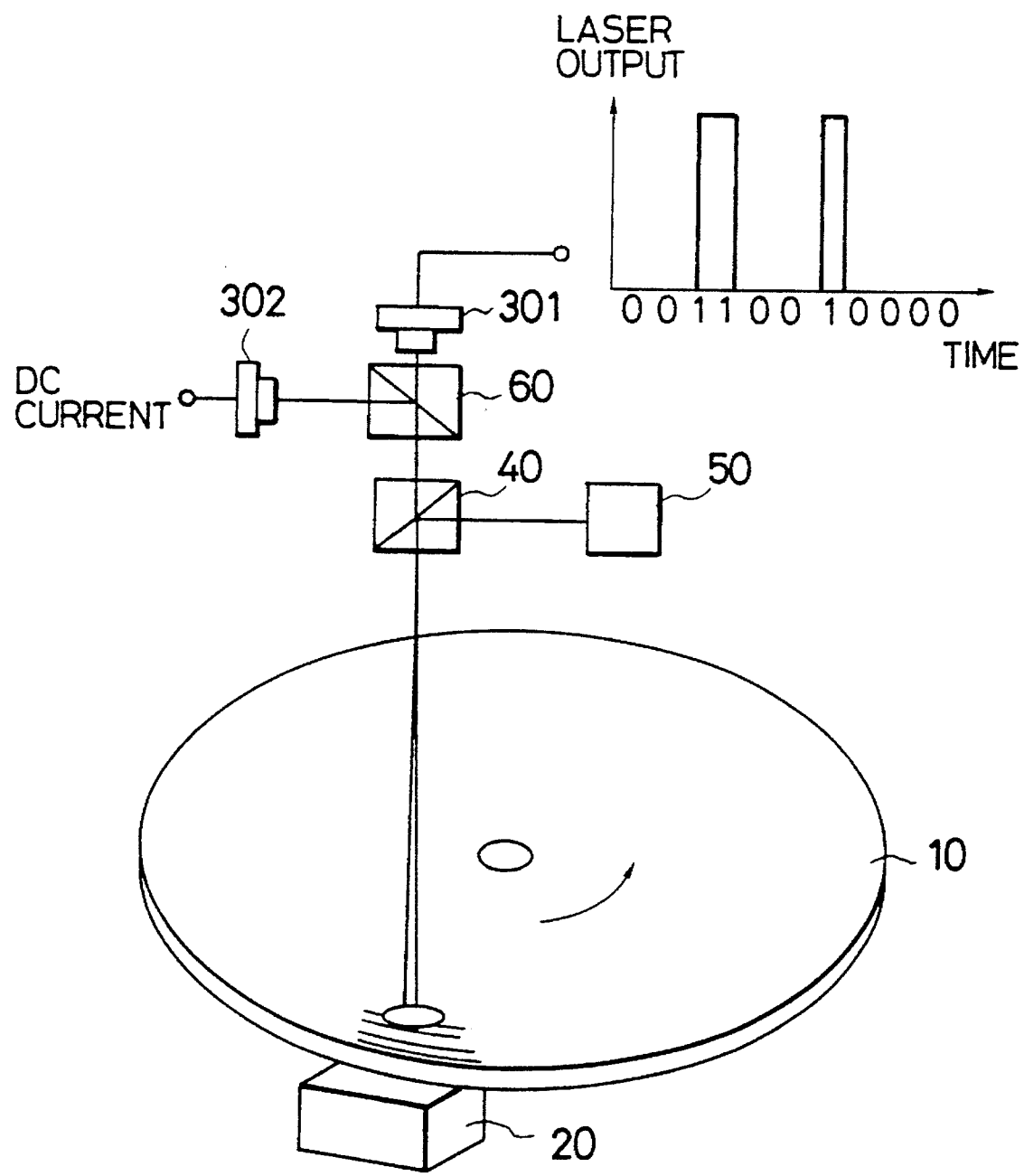

FIG. 127 shows the configuration of a magneto-optic recording apparatus. In the figure, reference numeral 10 denotes a magneto-optic recording medium, 20 denotes a bias magnetic field generating device, 301 and 302 denote semiconductor lasers, 40 denotes a polarizing beam splitter, 50 denotes a reproducing device, 60 denotes a beam splitter. The semiconductor lasers 301 and 302 have a wavelength of 830 nm and a maximum continuous emission output of 16 mW and their output beams are focused at locations close to each other. One laser keeps emitting a laser output corresponding to Low writing, while the other laser emits a laser output necessary to attain the temperature for the High writing only when the information "1" is to be written. When the magneto-optic recording medium of Embodiment B1 was used, maximum laser output was 10 mW, reduced by 3 mW, and overwriting was achieved.

Embodiment B13

Figure 128:
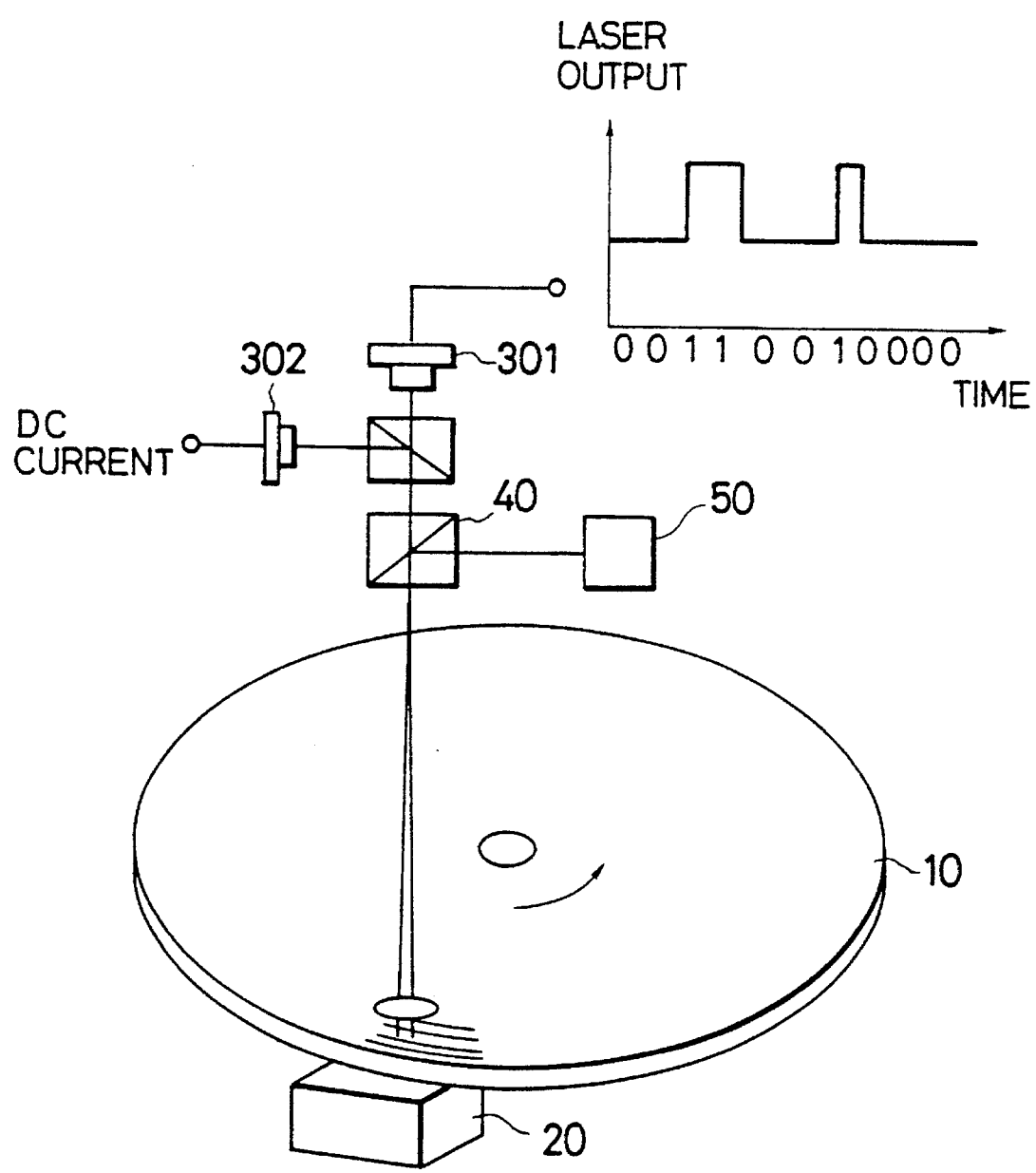

FIG. 128 shows the configuration of a magneto-optic recording apparatus. In the figure, reference numeral 10 denotes a magneto-optic recording medium, 20 denotes a bias magnetic field generating device, 301 and 302 denote semiconductor lasers, 40 denotes a polarizing beam splitter, 50 denotes a reproducing device, and 60 denotes a beam splitter. The semiconductor laser 301 is for recording with a wavelength of 830 nm and with a maximum continuous emission output of 20 mW. The semiconductor laser 302 is for reproducing with a wavelength of 780 nm and with a maximum continuous emission output of 4 mW. It can follow the laser spot of the laser 301 and can make verification at the same time as the overwriting. The data transfer rate during recording is about the same as the data transfer rate during reproducing.

Embodiment B14

Figure 129:
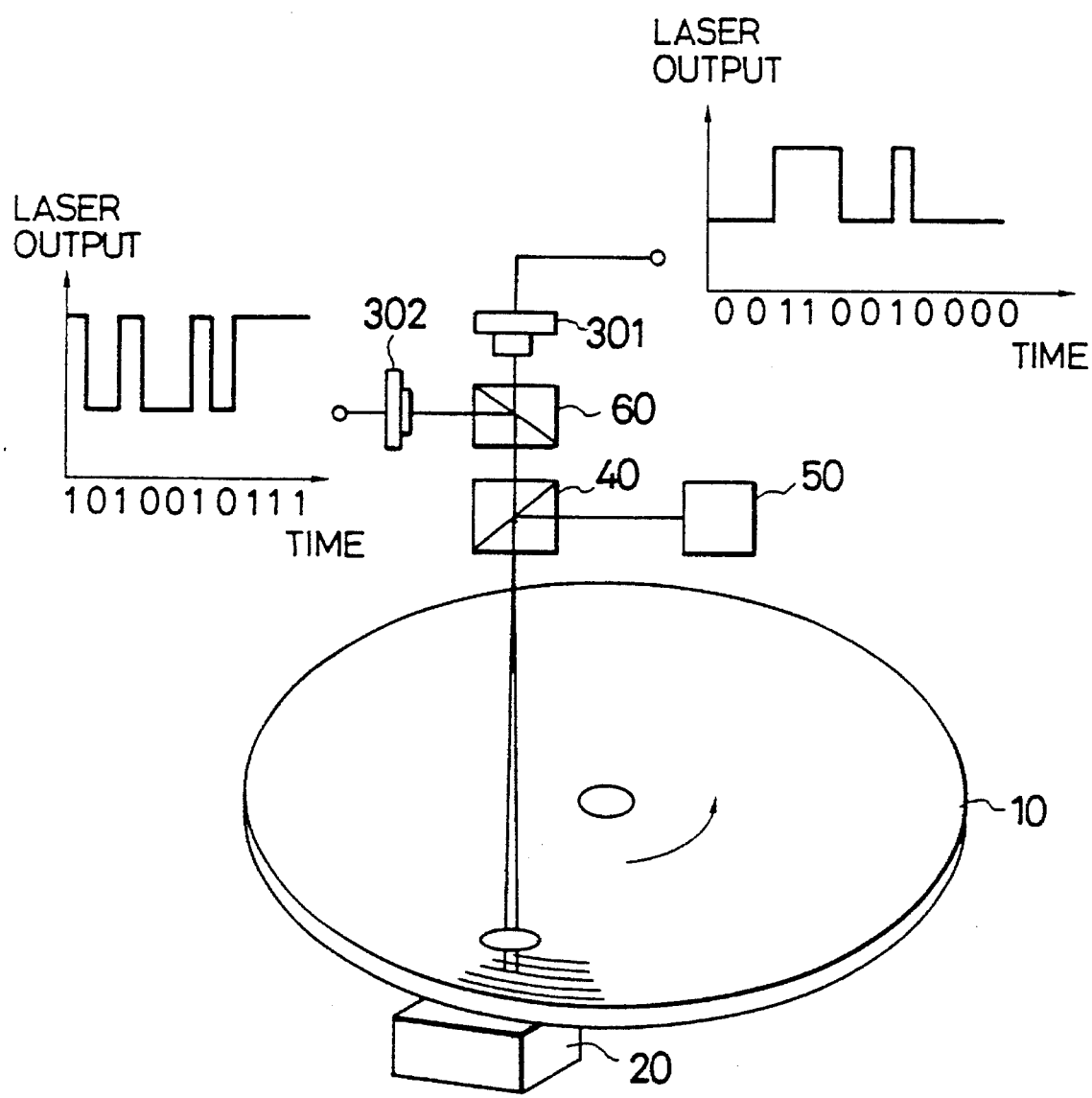

FIG. 129 shows the configuration of a magneto-optic recording apparatus. In the figure, reference numeral 10 denotes a magneto-optic recording medium, 20 denotes a bias magnetic field generating device, 301 and 302 denote semiconductor lasers with the same wavelength of 830 nm and with the maximum continuous emission output of 20 mW, 40 denotes a polarizing beam splitter, 50 denotes a reproducing device, and 60 denotes a beam splitter. The laser beam are focused on adjacent tracks on a magneto-optic recording medium, and simultaneous recording can be made.

In each of the embodiments, the magneto-optic recording medium was moved. But alternatively the laser may be in the form of an array or a matrix and recording and reproducing can be made without the magneto-optic recording medium being moved.

It is also possible to dispose an optical element, such as a liquid crystal panel, whose transmittance varies over space, on the path of the laser beam.

As has been described according to the invention, the initializing magnet is eliminated so that the size and weight of the device are reduced. Moreover, it is now possible to conduct overwriting by means of laser beam modulation.

The magneto-optic recording media and manufacturing methods of this invention can be widely applied to enable high-density, high-speed recording of audio information, visual information, and computer data.

What is claimed is:

1. A magneto-optic recording medium comprising a first magnetic layer having perpendicular magnetic anisotropy, a second magnetic layer provided on this first magnetic layer and coupled to said first magnetic layer by an exchange force, and a third magnetic layer provided on this second magnetic layer and coupled to said second magnetic layer by an exchange force, wherein the following relationships are satisfied $$Tc1<Tc2<Tc3$$

where, Tc1: Curie temperature of first magnetic layer
Tc2: Curie temperature of second magnetic layer
Tc3: Curie temperature of third magnetic layer,
the following relationships are additionally satisfied at room temperature $$Hc1>Hw1(2) \text{ and } Hc3>Hw3(2),$$

and there exists a temperature between room temperature and Tc1 at which the following relationship is satisfied $$Hc2<Hw2(3)-Hw2(1),$$

where, Hc1: coercivity of first magnetic layer
Hc2: coercivity of second magnetic layer
Hc3: coercivity of third magnetic layer
Hwi(j): reversal field shift in i-th layer due to exchange coupling force between j-th layer and i-th layer.

2. The magneto-optic recording medium of claim 1, having an interface control layer disposed at an interface between magnetic layers, for exchange force control.

3. A magneto-optic recording medium comprising:
a first magnetic layer having perpendicular magnetic anisotropy;
a second magnetic layer provided on this first magnetic layer and coupled to said first magnetic layer by an exchange force;
a third magnetic layer provided on this second magnetic layer and coupled to said second magnetic layer by an exchange force; and
a fourth magnetic layer provided on this third magnetic layer and coupled to said third magnetic layer by an exchange force;
wherein the following relationships are satisfied:

$$Tc1<Tc2, Tc3<Tc2, Tc1<Tc4, \text{ and } Tc3<Tc4,$$

where, Tc1: Curie temperature of first magnetic layer
Tc2: Curie temperature of second magnetic layer
Tc3: Curie temperature of third magnetic layer
Tc4: Curie temperature of fourth magnetic layer; and
the magnetization of said first magnetic layer is not reversed due to the reversal of the magnetization of said second magnetic layer at room temperature;
wherein the following relationships are additionally satisfied at room temperature $$Hc1>Hw1(2) \text{ and } Hc4>Hw4(3),$$

and there exists a temperature between room temperature and Tc1 or Tc3, whichever is lower, at which the following relationships are satisfied $$Hc2<Hw2(3)-Hw2(1) \text{ and } Hc3<Hw3(4)-Hw3(2),$$

where, Hc1: coercivity of first magnetic layer
Hc2: coercivity of second magnetic layer
Hc3: coercivity of third magnetic layer
Hc4: coercivity of fourth magnetic layer
Hwi(j): reversal field shift in i-th layer due to exchange coupling force between j-th layer and i-th layer.

4. The magneto-optic recording medium according to claim 3, wherein said second magnetic layer is a rare earth metal sublattice dominant film;
the directions of the sublattice magnetization of said second magnetic layer, said third magnetic layer and said fourth magnetic layer are parallel with each other at room temperature after recording operation; and
there is a temperature between room temperature and the lower one of the Curie temperature of said first magnetic layer and the Curie temperature of said third magnetic layer at which the relationship $$Hc2<Hw2$$

is satisfied,
wherein
Hc2 represents the coercivity of said second magnetic layer that is obtained when said four layers are stacked with each other and the sublattice magnetizations of said first magnetic layer and said third magnetic layer are antiparallel with each other, and
Hw2 represents the exchange coupling which said second magnetic layer receives from said first magnetic layer and said third magnetic layer when said four layers are stacked with each other and the sublattice magnetizations of said first magnetic layer and said third magnetic layer are antiparallel with each other.

5. The magneto-optic recording medium of claim 3, having an interface control layer disposed at an interface between magnetic layers, for exchange force control.

6. The magneto-optic recording medium as recited in claim 4, wherein the Curie temperature of said fourth magnetic layer is higher than the Curie temperature of said second magnetic layer.

7. The magneto-optic recording medium as recited in claim 4, wherein the thickness of said first magnetic layer is not less than 200 angstroms and not more than 1200 angstroms.

8. The magneto-optic recording medium as recited in claim 4, wherein the thickness of said second magnetic layer is greater than the thickness of said first magnetic layer.

9. The magneto-optic recording medium as recited in claim 4, wherein said second magnet layer contains iron and cobalt and the ratio of cobalt to the sum of iron and cobalt is smaller than 0.5.

10. The magneto-optic recording medium as recited in claim 4, wherein said second magnetic layer is an amorphous magnetic film of a transition metal and a rare-earth metal containing gadolinium (Gd) and dysprosium (Dy).

11. The magneto-optic recording medium as recited in claim 4, wherein said third magnetic layer has a perpendicular magnetic anisotropy.

12. The magneto-optic recording medium as recited in claim 4, wherein said third magnetic layer is a transition metal sublattice dominant film.

13. The magneto-optic recording medium as recited in claim 4, wherein said third magnetic layer is an amorphous magnetic film consisting of a rare-earth metal and a transition metal, wherein the transition metal has a composition $Fe_{1-x}Co_x$, with $0 \leq x \leq 0.3$.

14. The magneto-optic recording medium as recited in claim 4, wherein said third magnetic layer has a thickness which is greater than 100 angstroms and smaller than 800 angstroms.

15. The magneto-optic recording medium as recited in claim 4, wherein said fourth magnetic layer contains iron and cobalt, and the ratio of cobalt to the sum of iron and cobalt is larger than 0.5.

16. The magneto-optic recording medium as recited in claim 4, wherein said third magnetic layer and said fourth magnetic layer contain terbium (Tb).

17. A magneto-optic recording medium comprising a first magnetic layer having perpendicular magnetic anisotropy, a second magnetic layer provided on this first magnetic layer and coupled to said first magnetic layer by an exchange force, and a third magnetic layer provided on this second magnetic layer and coupled to said second magnetic layer by an exchange force, wherein the following relationships are satisfied $Tc1 < Tc2$ and $Tc3 < Tc2$, where, Tc1: Curie temperature of first magnetic layer Tc2: Curie temperature of second magnetic layer Tc3: Curie temperature of third magnetic layer, the following relationships are additionally satisfied at room temperature $Hc1 > Hw1(2)$ and $Hc3 > [Hw3(2)$, and there exists a temperature between room temperature and Tc3 at which the following relationship is satisfied $Hc2 < Hw2(3) - Hw2(1)$, where, Hc1: coercivity of the first magnetic layer Hc2: coercivity of the second magnetic layer Hc3: coercivity of the third magnetic layer Hwi(j): reversal field shift in i-th layer due to exchange coupling force between j-th layer and i-th layer.

18. The magneto-optic recording medium of claim 17, wherein $Tc3 < Tc2$.

19. The magneto-optic recording medium of claim 17, further comprising a fourth magnetic layer disposed between the second magnetic layer and the third magnetic layer and coupled to said second magnetic layer and said third magnetic layer by respective exchange forces, wherein the following relationships are satisfied $Tc4 < Tc3 < Tc2$ and $Tc1 < Tc2$, where, Tc4: Curie temperature of the fourth magnetic layer, the following relationships are additionally satisfied at room temperature $Hc1 > Hw1(2)$ and $Hc3 > Hw3(4)$, and there exists a temperature between room temperature and Tc4 at which the following relationships are satisfied $Hc2 < Hw2(4) - Hw2(1)$ and $Hc4 < Hw4(3) - Hw4(2)$.

20. The magneto-optic recording medium of claim 17, having an interface control layer disposed at an interface between magnetic layers, for exchange force control.

* * * * *